(12) United States Patent
Anselm et al.

(10) Patent No.: US 12,048,058 B2
(45) Date of Patent: Jul. 23, 2024

(54) AUTOMATIC ADJUSTMENT OF A DISCOVERY RANGE FOR DISCOVERING WIRELESS CONTROL DEVICES

(71) Applicant: Lutron Technology Company LLC, Coopersburg, PA (US)

(72) Inventors: Maxwell Anselm, Bethlehem, PA (US); Ryan S. Bedell, West Palm Beach, FL (US)

(73) Assignee: Lutron Technology Company LLC, Coopersburg, PA (US)

( * ) Notice: Subject to any disclaimer, the term of this patent is extended or adjusted under 35 U.S.C. 154(b) by 116 days.

(21) Appl. No.: 17/245,815

(22) Filed: Apr. 30, 2021

(65) Prior Publication Data

US 2021/0345085 A1 Nov. 4, 2021

Related U.S. Application Data

(60) Provisional application No. 63/071,183, filed on Aug. 27, 2020, provisional application No. 63/019,049, filed on May 1, 2020.

(51) Int. Cl.
| | |
|---|---|
| *G05B 15/02* | (2006.01) |
| *H04Q 5/22* | (2006.01) |
| *H04W 8/00* | (2009.01) |
| *H04W 40/24* | (2009.01) |

(52) U.S. Cl.
CPC .................. *H04W 8/005* (2013.01)

(58) Field of Classification Search
CPC ...... H05B 47/19; H05B 47/10; H05B 47/175; H04L 12/4625; H04L 41/0677; H04L 43/10; H04L 45/026; H04L 12/2809; H04L 67/12; G05B 19/4185; G05B 15/02; G05B 19/4186; H02J 13/00; H04W 8/005;

(Continued)

(56) References Cited

U.S. PATENT DOCUMENTS

| | | | |
|---|---|---|---|
| 8,009,042 B2* | 8/2011 | Steiner | H05B 47/13 |
| | | | 315/159 |
| 8,190,096 B2* | 5/2012 | Rutjes | H04L 12/282 |
| | | | 455/67.11 |

(Continued)

FOREIGN PATENT DOCUMENTS

| | | |
|---|---|---|
| WO | 2008078245 A2 | 7/2008 |
| WO | 2017075542 A2 | 5/2017 |

*Primary Examiner* — Edan Orgad
*Assistant Examiner* — Vanneilian Lalchinthang
(74) *Attorney, Agent, or Firm* — Flaster Greenberg P.C.

(57) ABSTRACT

A load control system may be commissioned using beacon messages. The load control system may include control devices that each include a beacon transmitting circuit configured to transmit a beacon message that comprises an identifier associated with the control device. A network device, such as a mobile device, may discover a control device based on the beacon message received from the control device. In response to discovery of the control device, the control device may be added to a temporary group of control devices for being collectively configured and/or controlled. Control devices may be discovered based on the signal strength at which the beacon messages are received. A mobile device may adjust a discovery threshold for discovering a target number of control devices in the load control system.

35 Claims, 15 Drawing Sheets

(58) Field of Classification Search
CPC ....... H04W 24/04; Y02D 30/70; Y02B 20/40; G08C 17/02; G06K 7/10366; G08B 13/1427
USPC .......................................................... 370/310
See application file for complete search history.

(56) References Cited

U.S. PATENT DOCUMENTS

| | | | | |
|---|---|---|---|---|
| 8,199,010 | B2* | 6/2012 | Sloan | H05B 47/19 340/552 |
| 8,228,184 | B2* | 7/2012 | Blakeley | G08B 29/181 340/541 |
| 10,757,741 | B1* | 8/2020 | Oroskar | H04W 24/00 |
| 2011/0140864 | A1* | 6/2011 | Bucci | H05B 47/19 340/10.42 |
| 2014/0115149 | A1* | 4/2014 | Kim | H04W 4/08 709/224 |
| 2015/0350027 | A1* | 12/2015 | Raissinia | H04W 4/023 455/517 |
| 2017/0026929 | A1* | 1/2017 | Grischy | H04W 24/10 |
| 2017/0038787 | A1* | 2/2017 | Baker | H04B 17/318 |
| 2017/0123390 | A1* | 5/2017 | Barco | H05B 47/19 |
| 2018/0063927 | A1* | 3/2018 | Abraham | H05B 47/19 |
| 2020/0186415 | A1* | 6/2020 | Cardozo | H04L 41/0677 |

* cited by examiner

AUTOMATIC ADJUSTMENT OF A DISCOVERY RANGE FOR DISCOVERING WIRELESS CONTROL DEVICES

CROSS-REFERENCE TO RELATED APPLICATIONS

This application claims the benefit of U.S. Provisional Patent Application No. 63/019,049, filed May 1, 2020, and U.S. Provisional Patent Application No. 63/071,183, filed Aug. 27, 2020, the contents of which are incorporated herein by reference in their entirety.

BACKGROUND

Load control systems may include electrical loads (e.g., lighting loads, etc.) and load control devices (e.g., ballasts, light emitting diode (LED) drivers, etc.) for controlling electrical power to the lighting loads. The load control devices may be controlled by messages from remote control devices or sensors (e.g., occupancy sensors, etc.) capable of sending instructions via messages to the load control devices for controlling the electrical loads. The load control devices may receive communications for performing load control from a system controller, which may be programmed with configuration information for controlling the load control devices in the system. After the devices are installed in the load control systems, the load control systems may be commissioned to enable the proper configuration and communication of devices to control the electrical loads.

Typically, after the load control system is installed in a location, such as a residence, an office, or the like, the system controller may assign link addresses to lighting control devices that the system controller controls. The link addresses may be used for sending instructions to the load control devices for controlling the electrical loads. This assignment may be done at random. For example, a system controller may be capable of controlling a plurality of lighting control devices, such as lighting ballasts or LED drivers, and may randomly assign a different link address to each lighting control device.

It is difficult to determine what link address was assigned to a load control device at a specific location after installation to enable control of the electrical loads at a location from other devices, such as the remote-control devices, occupancy sensors, or the system controller. For example, a floor plan may identify a load control device and its corresponding location in a room or building, while the system controller may have a list of the assigned link addresses stored thereon with the location of the load control device that is assigned a link address being unknown.

In order to control the load control devices at a desired location, during the commissioning procedure users may have to identify a lighting load that is controlled by a lighting control device having an assigned link address and associate a link address with the identified location in the building. As a building may include many lighting control devices (e.g., in different rooms, floors, etc.) with unknown link addresses, users may have to provide power to a lighting load using a known link address and search for the location of the lighting load that is being controlled (e.g., on, flashing, etc.) in the building in order to associate the physical location of the lighting control device with the assigned link address of the lighting control device. The lights that are being controlled may be in different rooms than the user configuring the system is currently occupying, which may cause the user to have to move around the building to different rooms to commission the system.

Similar time-consuming processes may be implemented for configuring other devices in the load control system. The process of identifying the location of the control devices in the system and associating the devices during commissioning of the system to enable appropriate load control can be time consuming and costly.

SUMMARY

A load control system may be commissioned as described herein for controlling one or more electrical loads. During commissioning of a load control system, one or more control devices may be discovered and/or selected for collective configuration and/or control. The selected control devices may be included in a temporary group of control-target devices for configuration and/or control. For example, a load control system may include lighting control devices capable of being selected and/or grouped for collective control in a location or zone. Control devices may be added to and/or removed from the temporary group for collective configuration and/or control. The temporary group may also include at least one control-source device, such as an occupancy sensor or a remote-control device, for enabling control of the temporary group of control devices based on messages received from the control-source device.

The load control system may be commissioned using beacon messages. For example, the load control system may include lighting control devices that each include a beacon (e.g., a control device beacon) transmitting circuit configured to transmit a respective beacon message that comprises an identifier associated with the lighting control device. A network device may discover a lighting control device based on the beacon message received from the lighting control device. In response to discovery of the lighting control device, the lighting control device may be added to a temporary group of lighting control devices for being collectively configured and/or controlled.

The beacon message may be transmitted periodically and/or in response to a triggering event. For example, the beacon message may be transmitted in response to a message, an actuation of a button on the control device, or in response to an occupancy condition detected by an occupancy sensor. A lighting control device in the load control system may be in direct communication with an occupancy sensor (e.g., installed in the same fixture) and the lighting control device may transmit beacon messages (e.g., each beacon message or begin periodic transmission of beacon messages) in response to the occupancy condition detected by the occupancy sensor.

A lighting control device may transmit a control device beacon message (e.g., enter a configuration mode) upon reception of a mobile device beacon message transmitted by a mobile device (e.g., a network device). The mobile device beacon message may include a discovery threshold. The lighting control device may receive the mobile device beacon message and may determine a received signal strength indicator (RSSI) at which the mobile device beacon message was received. The lighting control device may transmit the control device beacon message if the received signal strength indicator at which the mobile device beacon message was received is greater than or equal to the discovery threshold. The lighting device may stop transmitting the control device beacon message if the received signal strength indicator at which mobile device beacon message is received is less than the discovery threshold (e.g., the mobile device is out of the discovery range of the lighting control device).

Control devices may be discovered based on the signal strength at which the respective beacon messages are received. For example, a lighting control device may be discovered when the signal strength at which the respective beacon message of the lighting control device is received is above a discovery threshold. The discovery threshold may be adjusted to discover other control devices within a broader or more limited discovery range. For example, the discovery threshold may be adjusted (e.g., by the mobile device) such that the number of control devices that are receiving the mobile device beacon message above the discovery threshold (e.g., and are transmitting the respective control device beacon message) is within a target range. The target range may have a low-side threshold value and a high-side threshold value. For example, the target range may be 15 to 25 devices. The discovery threshold may be increased if the number of control devices that are receiving the mobile device beacon message is greater than the target range, and decreased if the number of control devices that are receiving the mobile device beacon message is lower than the target range. The amount by which the discovery threshold is adjusted may depend on the number of control devices that are receiving the mobile device beacon message.

For example, a mobile device may transmit a mobile device beacon message that includes a discovery threshold. A given control device may respond to the mobile device beacon message by transmitting a control device beacon message if the control device receives the mobile device beacon message at a signal strength above the discovery threshold. The mobile device may count a number of control devices that respond to the mobile device beacon message within a predefined period of time (e.g., a number of discovered control devices). If the number of discovered control devices is within the target range, the mobile device may not change the discovery threshold. If the number of discovered control devices is lower than the defined range, the mobile device may transmit a second mobile device beacon message with a decreased discovery threshold. Conversely, if the number of discovered control devices is higher than the target range, the mobile device may transmit a mobile device beacon message with an increased discovery threshold. The mobile device may increase or decrease the discovery threshold by a relatively lower amount if the number of discovered control devices is closer to the target range, and by a relatively higher amount if the number of control devices is further from the target range.

A control device may continue to transmit a control device beacon message for a discovery period after receiving a mobile device beacon message at a signal strength above the discovery threshold (e.g., even if the control device receives a second mobile device beacon message that includes a second discovery threshold at a signal strength below the second discovery threshold). The mobile device may start an adjustment timer when the mobile device increases the discovery threshold, and may maintain the discovery threshold (e.g., not increase the discovery threshold) until the adjustment timer has expired in an attempt to improve the accuracy of the count of the number of discovered control devices.

The control device may implement hysteresis for entering and exiting the discovery range (e.g., the configuration mode) based on the discovery threshold. Implementing hysteresis may be used to make it more likely that the control device will remain in its current state (e.g., in or out of the configuration mode) despite minor fluctuations in the signal strength at which successive mobile device beacon messages are received. For example, the discovery range may be based on the discovery threshold and a first offset for entering the discovery range (e.g., entering the configuration mode) and based on the discovery threshold and a second offset (e.g., the same and/or different than the first offset) for exiting the discovery range (e.g., exiting the configuration mode). The mobile device may include one or more offsets in the mobile device beacon message. The offsets may be pre-stored in a memory of the control device. Alternatively, the mobile device may include an enter discovery threshold and/or an exit discovery threshold in the mobile device beacon message. The enter discovery threshold may be greater than the discovery threshold, and the exit discovery threshold may be lower than the discovery threshold. The control device may use the offset(s), the enter discovery threshold, and/or the exit discovery threshold to determine whether to transmit a control device beacon message (e.g., whether to enter, remain in, or leave a configuration mode). For example, if the control device is not currently in the configuration mode for transmitting a control device beacon message, the control device may add the first offset to the discovery threshold such that the discovery threshold is increased. The control device may then compare the received signal strength magnitude, such as a received signal strength indicator (RSSI), at which the mobile device beacon message was received to the increased discovery threshold or the enter discovery threshold in order to determine whether to transmit the control device beacon message. If the control device is currently in the configuration mode for transmitting the control device beacon message, the control device may subtract the second offset from the discovery threshold such that the discovery threshold is decreased. The control device may then compare the received signal strength magnitude at which the mobile device beacon message was received to the decreased discovery threshold or the exit discovery threshold in order to determine whether to continue transmitting the control device beacon message. The offsets and/or the enter and exit discovery thresholds may be used in addition to and/or as an alternative to the discovery period.

DETAILED DESCRIPTION

Figure 1:
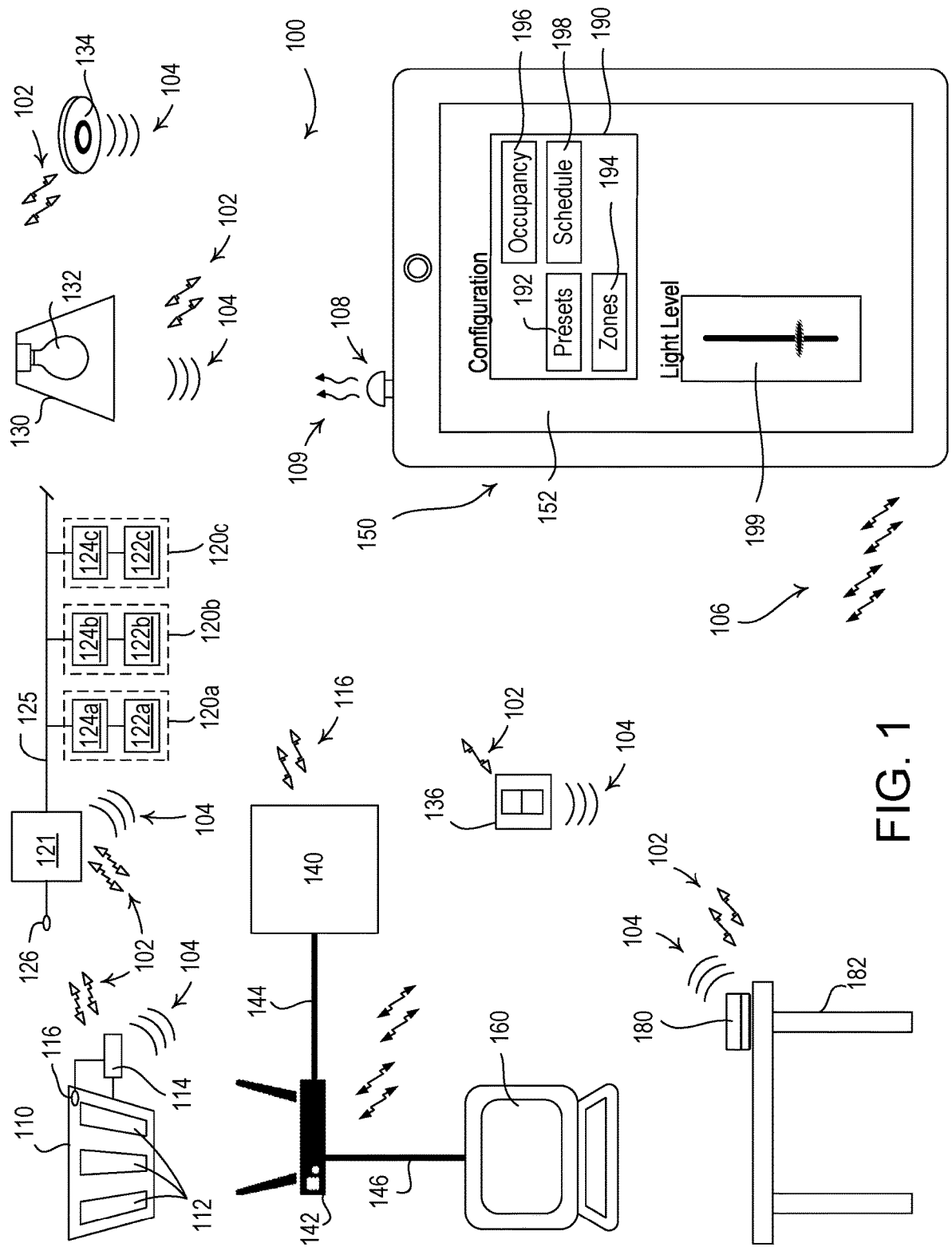
FIG. 1 illustrates a representative load control system for configuring and/or controlling one or more control devices using beacon messages.

To commission a load control system, one or more control devices may be identified and/or selected for collective configuration and/or control for enabling load control. The control devices may include at least one control-target device (e.g., load control device) and at least one control-source device. The control-target devices may control an electrical load based on messages received from associated control-source devices. A single control device of the load control system may be both a control-target and a control-source device. For example, a load control device may operate as a control-target device to receive messages for controlling an electrical load, and may operate as a control-source device to transmit messages to another load control device for controlling an electrical load.

Commissioning of a load control system may include identification and/or association of control-source devices and/or control-target devices for individual and/or collective control. Devices may be associated with one another by storing identifiers of the devices together in memory. The control devices may be associated in a temporary group to allow for control of the devices in the group. Devices may be associated with a temporary group by storing the identifiers of the devices in memory with a temporary group identifier. The associations may be stored at the control devices or other devices in the load control system and referenced to respond appropriately to enable load control between associated devices in the system.

Control devices may be identified and/or selected for collective configuration and/or control using beacon messages (e.g., control device beacon messages). The selected control devices may be temporarily grouped for enabling configuration and/or control. The control device beacon messages may include unique identifying information that may be used to identify and/or select control devices for collective configuration and/or control in a load control environment. The control device beacon messages may indicate or be used to indicate the proximity or location of a device and/or the current state of the device. The control device beacon messages may include a major identifier and a minor identifier for a control device (e.g., a load control device). The major identifier may include the unique identifier of the corresponding control device and the minor identifier may include the unique identifier for the control device type, or vice versa. The major and minor identifiers may be used in combination to identify the unique identifier of the control device.

A network device (e.g., a mobile device) may also transmit a beacon message (e.g., a mobile device beacon message). The mobile device beacon message may include unique identifying information that may be used to identify the network device and/or a discovery threshold. In addition, a beacon transmitting device may transmit a beacon message (e.g., a location beacon message). The location beacon message may include unique identifying information that may be used to identify a location of the beacon transmitting device and/or a discovery threshold. The beacon transmitting device may be a control device, or the beacon transmitting device may be a device that is independent from a control device.

The beacon messages (e.g., the control device beacon messages, a location beacon message, and/or the mobile device beacon message) may be transmitted as radio frequency (RF) communication signals or other types of signals that may be received by another control device, a network device, and/or a beacon transmitting device within close proximity to the device that transmitted the beacon message. The beacon messages may be transmitted as short-range RF communication signals. For example, the beacon messages may be RF signals that are communicated periodically using a short-range wireless communication protocol (e.g., such as the BLUETOOTH and/or BLUETOOTH LOW ENERGY (BLE) protocols). When the beacon message is transmitted using an RF communication signal, the beacon message may be identified by a device to indicate that the device is within the proximity or location of the device that transmitted the beacon message. The proximity of the device to a beacon transmitting device may be determined by the signal strength at which the RF communication signal of the beacon message is received.

A load control system may be commissioned by setting up or configuring control devices for performing load control using beacon messages. The control devices may be associated with one another and/or a location using beacon messages, as described herein. Control devices associated with a location may be implemented for performing load control at the location.

FIG. 1 illustrates a representative load control system 100 for configuring and/or controlling one or more control devices using beacon messages. The load control system 100 may include a lighting fixture 110 (e.g., a panel fixture) having one or more lighting loads 112 (e.g., light-emitting diode (LED) light sources 208). The lighting fixture 110 may also include a lighting control device 114 (e.g., an LED driver) for controlling an amount of power provided to the lighting loads 112 of the lighting fixture 110. The lighting control device 114 may be installed inside of the lighting fixture 110, to an outside surface of the lighting fixture 110, and/or adjacent to (e.g., external to) the lighting fixture 110. The lighting control device 114 of the lighting fixture 110 may operate as a control-target device for controlling the amount of power provided to the lighting loads 112 to control an intensity level of the lighting fixture 110 in response to the received messages from control-source devices.

The load control system 100 may include lighting fixtures 120a-120c controlled by a load controller 121. Each of the lighting fixtures 120a-120c may have a respective lighting load(s) 122a-122c (e.g., LED light sources) and a respective lighting control device 124a-124c (e.g., an LED driver) for controlling an amount of power provided to the respective lighting load(s) of the lighting fixture. The load controller 121 may be coupled to the lighting control devices 124a-124c via a communication link 125 (e.g., a wired digital communication link). The load controller 121 may be configured to individually control the lighting control devices 124a-124c to thus individually control the lighting loads 122a-122c. The load controller 121 may operate as a control-target device for controlling the lighting control devices 124a-124c to control the power provided to the lighting loads 122a-122c to control intensity levels of the lighting fixtures 120a-120c in response to the received messages from control-source devices. In addition, the load control system 100 may include a lighting fixture having multiple controllable light sources that may be controlled by a single load controller, such as the load controller 121.

The load control system 100 may also include a lighting fixture 130 (e.g., a downlight fixture) having a controllable light source 132 (e.g., a controllable LED lamp). The controllable light source 132 may include an integral lighting control device (e.g., an LED driver) for controlling an amount of power provided to an internal lighting load of the controllable light source 132. For example, the controllable light source 132 may be screwed into a standard Edison socket of the lighting fixture 130. The controllable light source 132 of the lighting fixture 130 may operate as a control-target device for controlling an intensity level of the lighting load of the controllable light source 132 in response to the received messages from control-source devices. Though the lighting control device 114, the lighting control devices 124a-124c, and the controllable light source 132 may be provided as example control-target devices, the load control system 100 may include other control-target devices, such as a motorized window treatment, a temperature control device, and/or a plug-in load control device, for example.

The lighting level of the lighting fixture 110, the lighting control devices 124a-124c, and/or the controllable light source 132 may be controlled according to lighting control instructions received from a control-source device. A control-source device may be capable of communicating messages to a control-target device (e.g., a load control device such as, a lighting control device) via wired and/or wireless signals for controlling an electrical load (e.g., lighting load). Example control-source devices in the load control system 100 may include an occupancy sensor 134, a remote control device 136, and/or another control-source device capable of communicating messages to the lighting control device 114, the lighting control devices 124a-124c, and/or the controllable light source 122 for performing control. The load control system 100 may also comprise a system controller 140 and a network device, such as a mobile device 150, which may also operate as a control-source device. For example, the mobile device 150 may comprise a smart phone and/or a tablet.

The amount of power delivered to the lighting loads 112 of the lighting fixture 110, the lighting loads 122a-122c of the lighting control devices 124a-124c, and/or the controllable light source 132 may be controlled in response to lighting control instructions received from a control-source device (e.g., the occupancy sensor 134, the remote control device 136, the system controller 140, the mobile device 150, and/or another control-source device). The lighting level may be controlled according to lighting control configuration information, such as preset configuration, zone configurations, occupancy configuration, and/or timing schedule configuration information that may be stored at the lighting control device 114, the lighting control devices 124a-124c, the controllable light source 132, and/or at the system controller 140 or the mobile device 150. The lighting control instructions may be transmitted on a wireless communication network via radio-frequency (RF) signals 102.

The occupancy sensor 134 may be a control-source device configured to detect occupancy and/or vacancy conditions in the space in which the load control system 100 is installed. The occupancy sensor 134 may transmit messages via the RF communication signals 102 in response to detecting the occupancy or vacancy conditions. Though FIG. 1 shows the occupancy sensor 134 communicating messages via the RF communication signals 102, the occupancy sensor 134 may communicate via a wired communication. The system controller 140 may be configured to turn the lighting loads of one or more lighting fixtures (e.g., the lighting loads 112, 122a-122c and/or the controllable light source 122) on and off in response to receiving an occupied signal and a vacant signal, respectively. The occupancy sensor 134 may operate as a vacancy sensor, such that the lighting loads may be manually turned on by a user and/or automatically turned off in response to detecting a vacancy signal from the sensor (e.g., the lighting load is not turned on in response to detecting an occupancy condition). Examples of load control systems having occupancy and vacancy sensors are described in greater detail in commonly-assigned U.S. Pat. No. 8,009,042, issued Aug. 30, 2011, entitled RADIO-FREQUENCY LIGHTING CONTROL SYSTEM WITH OCCUPANCY SENSING; U.S. Pat. No. 8,199,010, issued Jun. 12, 2012, entitled METHOD AND APPARATUS FOR CONFIGURING A WIRELESS SENSOR; and U.S. Pat. No. 8,228,184, issued Jul. 24, 2012, entitled BATTERY-POWERED OCCUPANCY SENSOR, the entire disclosures of which are hereby incorporated by reference.

Though the occupancy sensor 134 may be shown as being external to the lighting fixture 110, a sensor 116 may be incorporated in the lighting fixture 110 and/or in direct communication (e.g., wired or wireless) with the lighting control device 114 of the lighting fixture 110 for controlling the lighting loads 112. In addition, the load controller 121 may be connected to a sensor 126. The sensors 116, 126 may be used for controlling the lighting fixture 110 and/or the lighting control devices 124a-124c, respectively. The sensors 116, 126 may be occupancy sensors, visible light sensors (e.g., cameras), daylight sensors, optical sensors, and/or any other type of sensor. The sensors 116, 126 may be occupancy sensors capable of detecting occupancy/vacancy conditions (e.g., using infrared signals). The sensors 116, 126 may be visible light sensors (e.g., camera) capable of detecting changes within the visible space of the sensors 116, 126.

The sensors 116, 126 may be configured to operate similarly to the occupancy sensor 134, but may be in direct communication with the lighting control device 114 of the lighting fixture 110 and the load controller 121, respectively. For example, the lighting control device 114 of the lighting fixture 110 may turn on and off the lighting loads 112 in response to receiving an occupied signal and a vacant signal, respectively, from the sensor 116. Similarly, the load controller 121 may turn on and off the lighting loads 122a-122c in response to receiving an occupied signal and a vacant signal, respectively, from the sensor 126.

The remote-control device 136 may be a control-source device configured to transmit messages to the system controller 140 and/or directly to the lighting control device 114, the load controller 121, and/or the controllable light source 122 via the RF communication signals 102 in response to an actuation of one or more buttons of the remote-control device 136. Though FIG. 1 shows the remote-control device 136 communicating messages via the RF communication signals 102, the remote-control device 136 may communicate via a wired communication. The remote-control device 136 may be a wall switch, a dimmer switch, or another remote-control device for controlling an electrical load. The system controller 140 may also originate one or more messages.

The system controller 140 may be configured to transmit one or more messages to the lighting control device 114 of the lighting fixture 110, the load controller 121, and/or the controllable light source 132 in response to the messages received from associated control-source devices, such as the occupancy sensor 134, the remote-control device 136, the mobile device 150, and/or another control-source device. The system controller 140 may communicate with the lighting control device 114 in the lighting fixture 110, the load controller 121, and/or the controllable light source 132 via a wired and/or wireless communication. For example, the system controller 140 may communicate with the lighting control device 114 of the lighting fixture 110, the load controller 121, and/or the controllable light source 132 via RF communication signals 102. The system controller 140 may communicate with other lighting control devices of lighting fixtures (e.g., a group of lighting control devices, etc.) in the load control system 100.

The system controller 140 may communicate with the mobile device 150 directly via wired and/or wireless communications. The system controller 140 may communicate with the mobile device 140 via a network communication device 142. The network communication device 142 may be a wireless access point, such as a wireless router and/or a modem for example. The network communication device 142 may communicate with the mobile device 150 via network communication signals 106 (e.g., network communication signals using the WI-FI protocol, WI-MAX protocol, etc.) to allow the mobile device 150 to communicate with other computing devices and/or networks (e.g., via the Internet). The system controller 140 may communicate with the network communication device 142 via a communication link 144, which may be a wired and/or wireless communication link. Though the system controller 140 and the network communication device 142 are shown as separate devices in FIG. 1, the network communication device 142 may be included in the system controller 140. The network communication device 142 may also be configured to communicate with a network device, such as, a processing device 160 (e.g., a personal computer and/or laptop), via a communication link 146, which may be a wired and/or wireless communication link.

The mobile device 150 may be implemented to configure the load control system 100. For example, the mobile device 150 may be used to discover and/or associate load control devices (e.g., control-source devices and/or control-target devices) for performing load control. The mobile device 150 may be a cellular phone (e.g., smart phone), a tablet, a personal digital assistant, a personal computer, a laptop computer, a wearable computing device (e.g., glasses, a watch, a wristband, etc.), or other mobile computing device.

The mobile device 150 may transmit a beacon message (e.g., a mobile device beacon message). The mobile device beacon message may include, for example, a beacon message identifier. For example, the beacon message identifier may be a unique identifier that identifies the mobile device 150 (e.g., or an application executed on the mobile device 150) and/or a non-unique identifier, such as an identifier of a group, area, building, load control system, and/or manufacturer of the mobile device and/or the control devices of the load control system 100. The mobile device beacon message may also include a discovery threshold $TH_{RSSI}$. The control devices may receive the mobile device beacon message and may compare a received signal strength magnitude, such as a received signal strength indicator (RSSI), at which the mobile device beacon message was received to the discovery threshold $TH_{RSSI}$. A control device may enter a configuration mode if the signal strength at which the mobile device beacon message was received is greater than or equal to the discovery threshold $TH_{RSSI}$ (e.g., the control device is within discovery range of the mobile device 150). The control device may transmit a control device beacon message upon entering the configuration mode. The control device may continue transmitting the control device beacon message while the control device is receiving the mobile device beacon message above the received single strength discovery threshold $TH_{RSSI}$ (e.g., until the control device has completed control and/or configuration). If the control device stops receiving the mobile device beacon message, the control device may continue transmitting the control device beacon message for a given period (e.g., 4 seconds), and may stop transmitting the control device beacon message after the period has ended.

The mobile device 150 may discover control devices (e.g., control-source devices and/or control-target devices) upon receipt of control device beacon messages transmitted from the control devices. The control device beacon messages may be beacon messages transmitted from the control devices and include a unique identifier that identifies the corresponding control devices (e.g., control-source devices and/or control-target devices). For example, a control device beacon message may include a serial number or another unique identifier that corresponds to a respective load control device. The unique identifier may be a unique network identifier (e.g., a routing locator). The beacon message may include an address (e.g., a network address), a joiner identifier (e.g., a joiner ID), and/or any other kind of device identification data. The control device beacon messages may also, or alternatively, include a unique identifier of the device type for the corresponding control device. For example, the control device beacon messages may include an identifier for lighting control devices, sensors (e.g., occupancy sensors, etc.), remote control devices, and/or other types of control devices.

The mobile device 150 may adjust the discovery threshold $TH_{RSSI}$ based on the number of control device beacon messages that the mobile device 150 receives from the control devices (e.g., the number of discovered control devices). The mobile device 150 may adjust the discovery threshold $TH_{RSSI}$ such that the number of discovered control devices is within a target range (e.g., between 15 and 25 devices). The target range of discovered control devices may have a low-side threshold value and a high-side threshold value that define the number of control devices in the discovery range. The target range of discovered control devices may be predefined and/or defined by a user of the mobile device 150. The target range of discovered control devices may be modified based on, for example, the size of the load control system (e.g., the number of control devices in the load control system 100 and/or the physical size of the area in which the load control system 100 is located), the type of the load control system 100 (e.g., residential or commercial), and/or the type of control devices in the load control system 100 (e.g., lighting fixtures or sensors). The mobile device 150 may adjust the discovery threshold $TH_{RSSI}$ that is transmitted in the mobile device beacon in an attempt to control the number of control devices that are transmitting control device beacon messages in a given area. For example, the mobile device 150 may determine whether the number of discovered control devices is within the target range and adjust the discovery threshold $TH_{RSSI}$ to adjust the discovery range (e.g., the radius of the discovery range) and thus the number of discovered control devices transmitting control device beacon messages.

If the number of discovered control devices is within the target range, the mobile device 150 may maintain the discovery threshold $TH_{RSSI}$. If the number of discovered control devices is lower than the target range (e.g., fewer than 15 devices), the mobile device 150 may decrease the discovery threshold $TH_{RSSI}$ (e.g., to increase the radius of the discovery range). If the number of discovered control devices is greater than the target range (e.g., more than 25 devices), the mobile device 150 may increase the discovery threshold $TH_{RSSI}$ (e.g., the decrease the radius of the discovery range). The amount by which the mobile device 150 increases or decreases the discovery threshold $TH_{RSSI}$ may be dependent on the number of discovered control devices. For example, the mobile device 150 may increase the discovery threshold $TH_{RSSI}$ by a smaller amount when the number of discovered devices is closer to the target range (e.g., the number of discovered control devices is between 26 and 40 control devices), and by a greater amount when the number of discovered devices is farther away from the target range (e.g., the number of discovered control devices is more than 40 devices).

The mobile device 150 may start an adjustment timer when the mobile device 150 increases the discovery threshold $TH_{RSSI}$. If the mobile device 150 again determines that the number of discovered control devices is higher than the target range, the mobile device 150 may determine whether the adjustment timer has expired. If the adjustment timer has expired, the mobile device 150 may increase the discovery threshold $TH_{RSSI}$ and start the adjustment timer. If the adjustment timer has not expired, the mobile device 150 may maintain the discovery threshold $TH_{RSSI}$ for the period of the adjustment timer. Using an adjustment timer may ensure that the mobile device accurately counts the number of discovered control devices and may prevent the mobile device from adjusting the discovery threshold $TH_{RSSI}$ too often when increasing the discovery threshold $TH_{RSSI}$ (e.g., prevent the mobile device from overcorrecting the discovery threshold $TH_{RSSI}$).

The mobile device 150 may adjust (e.g., increase or decrease) the discovery threshold $TH_{RSSI}$ by a predefined amount. The predefined amount may depend on, for example, the difference between the number of discovered control devices and the target range, and/or whether the mobile device 150 is increasing or decreasing the discovery threshold $TH_{RSSI}$ (e.g., whether the number of discovered control devices is greater than or less than the target range). The predefined amount may be greater when the mobile device 150 decreases the discovery threshold $TH_{RSSI}$ as compared to when the mobile device 150 increases the discovery threshold $TH_{RSSI}$. For example, the target range may be 15 to 25 devices. If the number of discovered control devices is 10, the mobile device 150 may decrease the discovery threshold $TH_{RSSI}$ by approximately 2 dBm, while if the number of discovered control devices is 30, the mobile device 150 may increase the discovery threshold $TH_{RSSI}$ by approximately 1 dBm.

To prevent a control device from fluctuating between identifying itself as being within the discovery range and outside of the discovery range over a period of time, the control device may start a timer (e.g., a discovery timer) after determining that the control device is within the discovery range. The discovery timer may define a discovery period that expires when the timer reaches a predefined value (e.g., when the discovery period has ended). The discovery period may be a period of time (e.g., 2 seconds, 4 seconds, 8 seconds, etc.) that begins when the control device receives a mobile device beacon message at a received signal strength magnitude (e.g., RSSI) that is greater than the discovery threshold $TH_{RSSI}$ and allows the control device to continue to maintain its status as a discovered device (e.g., by maintaining the status of an IN-RANGE flag) for the discovery period. For example, after the control device receives a mobile device beacon message at a received signal strength magnitude (e.g., RSSI) that is less than the discovery threshold $TH_{RSSI}$, the control device may determine whether it was in the discovery range during the discovery period. The control device may determine that it is within the discovery range during the discovery period if the control device has received a mobile device beacon message at a received signal strength magnitude greater than the discovery threshold within the discovery period.

For example, a control device may receive a first mobile device beacon message that includes a first discovery threshold $TH_{RSSI1}$ at a first time instance $T_1$. The control device may measure a received signal strength magnitude at which the control device received the first mobile device beacon message. If the received signal strength magnitude is greater than or equal to the first discovery threshold $TH_{RSSI1}$, the control device may determine that it is within the discovery range, enter a configuration mode, and/or transmit a first control device beacon message. The control device may start a discovery timer. The discovery timer may run for a discovery period (e.g., 2, 4, or 8 seconds). The control device may reset the discovery timer each time the control device receives a mobile device beacon message above a discovery threshold included in the mobile device beacon message. The control device may then receive a second mobile device beacon message that includes a second discovery threshold $TH_{RSSI2}$ at a second time instance $T_2$. The first discovery threshold $TH_{RSSI1}$ and the second discovery threshold $TH_{RSSI2}$ may have the same value or different values. The control device may measure a received signal strength magnitude at which the control device received the second mobile device beacon message. If the received signal strength magnitude is less than the second discovery threshold $TH_{RSSI2}$, the control device may determine whether the discovery period has elapsed (e.g., whether the discovery timer is running). If the discovery period has not elapsed, the control device may remain in the configuration mode and may transmit a second control device beacon message. If the discovery period has elapsed, the control device may determine that it is not within the discovery range and may exit the configuration mode.

The control devices may implement hysteresis for entering and exiting the discovery range (e.g., the configuration mode) based on the discovery threshold $TH_{RSSI}$. For example, the discovery range may be based on an enter discovery threshold $TH_{ENTER}$ (e.g., the discovery threshold $TH_{RSSI}$ plus a first threshold offset $TH_{OFFSET1}$) for entering the discovery range (e.g., entering the configuration mode) and based on an exit discovery threshold $TH_{EXIT}$ (e.g., the discovery threshold $TH_{RSSI}$ minus a second threshold offset $TH_{OFFSET2}$) for exiting the discovery range (e.g., exiting the configuration mode). The mobile device 150 may include one or more threshold offsets in the beacon message. For example, the beacon message may include the first threshold offset $TH_{OFFSET1}$ and the second threshold offset $TH_{OFFSET2}$. Alternatively, the first threshold offset $TH_{OFFSET1}$ and the second threshold offset $TH_{OFFSET2}$ may be pre-stored in a memory of the control device. The first threshold offset $TH_{OFFSET1}$ and/or the second threshold offset $TH_{OFFSET2}$ may have the same value, or the first threshold offset $TH_{OFFSET1}$ and/or the second threshold offset $TH_{OFFSET2}$ may have different values. The control device may use the first threshold offset $TH_{OFFSET1}$ and/or the second threshold offset $TH_{OFFSET2}$ to determine whether to enter or leave the configuration mode. For example, as described herein, the control device may receive a beacon message, and may determine the received signal strength magnitude (e.g., RSSI) at which the beacon message was received. The control device may enter the configuration mode if the control device determines that the RSSI is greater than or equal to the enter discovery threshold $TH_{ENTER}$. The control device may add the first threshold offset $TH_{OFFSET1}$ to the discovery threshold $TH_{RSSI}$, which may result in the enter discovery threshold $TH_{ENTER}$ (e.g., an increased discovery threshold). For example, a beacon message may indicate a value of the discovery threshold $TH_{RSSI}$ of approximately −60 dBm, and the first threshold offset $TH_{OFFSET1}$ may be 5 dBm. Thus, the control device may enter the configuration mode if the control device receives the beacon message at an RSSI greater than or equal to −55 dBm. Alternatively, the beacon message may include the enter discovery threshold $TH_{ENTER}$.

After the control device has entered the configuration mode, the control device may receive a second beacon message from the mobile device 150. The control device may determine whether to leave the configuration mode based on the received signal strength magnitude (e.g., RSSI) at which the second beacon message was received, a value of the discovery threshold $TH_{RSSI}$ indicated in the second beacon message, and/or one or more threshold offsets (e.g., the first threshold offset $TH_{OFFSET1}$ and/or the second threshold offset $TH_{OFFSET2}$). For example, the control device may subtract the second threshold offset $TH_{OFFSET2}$ from the discovery threshold $TH_{RSSI}$, which may result in the exit discovery threshold $TH_{EXIT}$ (e.g., a decreased discovery threshold). For example, a beacon message may indicate a value of the discovery threshold $TH_{RSSI}$ of be approximately −60 dBm, and the second threshold offset $TH_{OFFSET2}$ may be 5 dBm. Thus, the control device may remain in the configuration mode if the control device receives the second beacon message at an RSSI greater than or equal to −65 dBm and leave the configuration mode if the control device receives the second beacon message at an RSSI less than −65 dBm. Alternatively, the second beacon message may include the exit discovery threshold $TH_{ENTER}$.

Figure 8A:
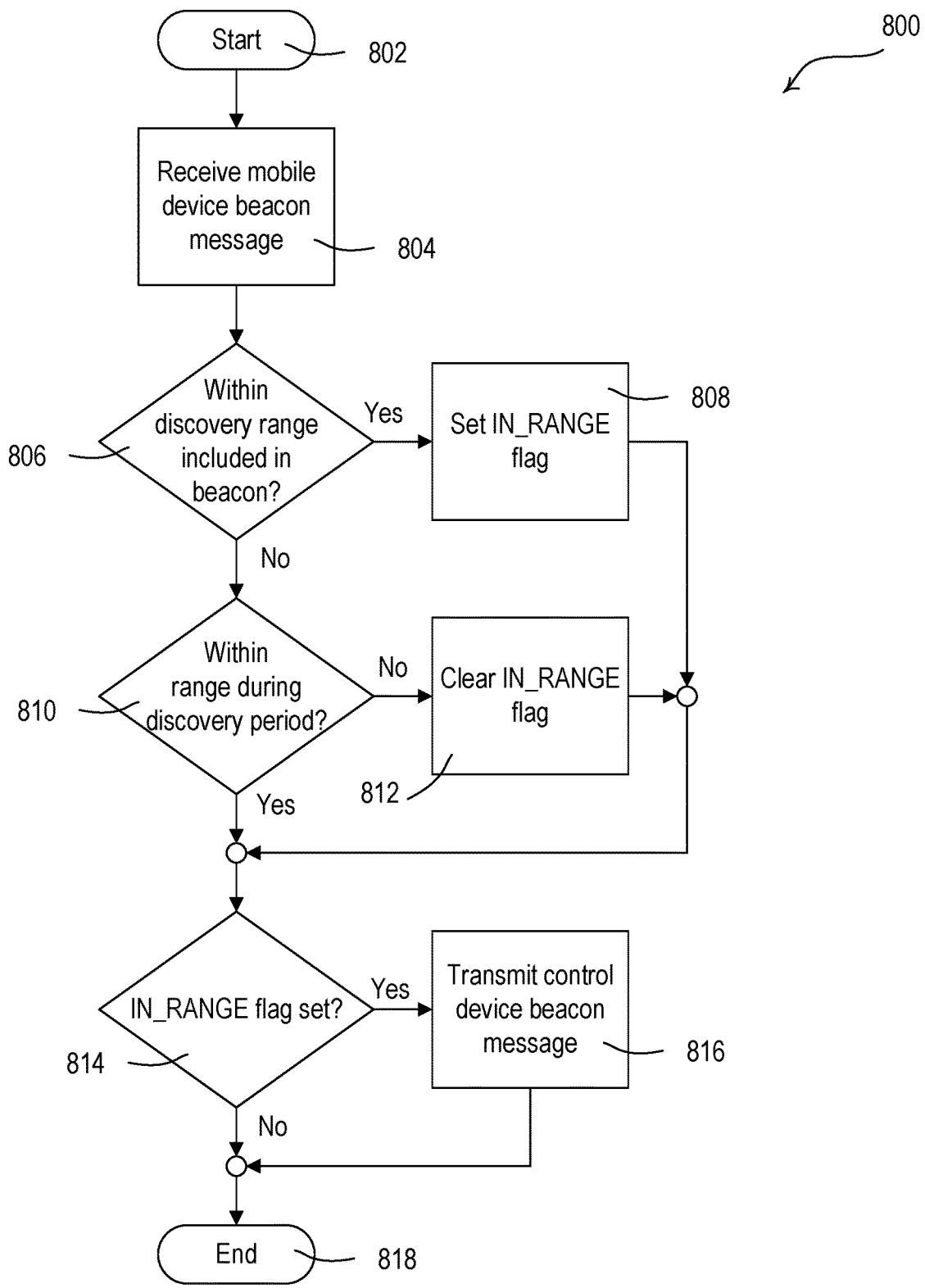
FIG. 8A is a flowchart depicting an example procedure for transmitting a control device beacon message for enabling configuration and/or control of a control device.

In addition to using the threshold offsets, the control device may use a discovery period when determining whether to leave the configuration mode. As shown in FIG. 8A, a control device may receive a first mobile device beacon message that includes a first value of the discovery threshold $TH_{RSSI}$. The first threshold offset $TH_{OFFSET1}$ may be applied to the first value of the discovery threshold $TH_{RSSI}$ such that the enter discovery threshold $TH_{ENTER}$ is greater than the received discovery threshold $TH_{RSSI}$. The control device may determine that it received the first mobile device beacon message at a received signal strength magnitude above the enter discovery threshold $TH_{ENTER}$. The control device may therefore determine that it is in the discovery range and may enter the configuration mode. The control device may start a timer or otherwise record an amount of time that has elapsed since the control device received the first mobile device beacon message. The control device may later receive a second mobile device beacon message that includes a second value of the discovery threshold $TH_{RSSI}$. The second threshold offset $TH_{OFFSET2}$ may be applied to the second value of the discovery threshold $TH_{RSSI}$ such that the exit discovery threshold $TH_{EXIT}$ is less than the discovery threshold $TH_{RSSI}$. The control device may determine that it received the second mobile device beacon message at a received signal strength magnitude below the exit discovery threshold $TH_{EXIT}$, which would indicate that the control device is out of the discovery range and should leave the configuration mode. However, the control device may remain in the configuration mode if the amount of time that has elapsed since the control device received the first mobile device beacon message is less than a discovery period.

Implementing the hysteresis (e.g., in addition to or as an alternative to the discovery period) may avoid a situation where a control device on the edge of the discovery range rapidly enters and leaves the configuration mode due to fluctuations in the received signal strength magnitude at which successive beacon messages are received. Adding the first threshold offset $TH_{OFFSET1}$ to the discovery threshold $TH_{RSSI}$ (e.g., to determine the enter discovery threshold $TH_{ENTER}$) may make it less likely that a control device that is not currently in the configuration mode enters the configuration mode. However, once the control device has entered the configuration mode, subtracting the second threshold offset $TH_{OFFSET2}$ from the discovery threshold $TH_{RSSI}$ (e.g., to determine the exit discovery threshold $TH_{EXIT}$) may make it less likely that the control device will leave the configuration mode due to relatively smaller fluctuations in signal strength at which beacon messages are received. In addition, as described herein, the mobile device 150 may adjust the discovery threshold $TH_{RSSI}$ based on the number of control devices in the configuration mode (e.g., the number of control devices from which the mobile device 150 is receiving a control device beacon message) at a given time. If a control device rapidly alternates between entering and leaving the configuration mode, the mobile device 150 may make a relatively large number of adjustments to the value of the discovery threshold $TH_{RSSI}$. Thus, using the threshold offsets may reduce the number of unnecessary adjustments made to the value of the discovery threshold $TH_{RSSI}$.

The control device beacon messages may be transmitted via RF communication signals 104 from control devices in the load control system 100. For example, the control device beacon messages may be transmitted from the lighting control device 114 of the lighting fixture 110, the load controller 121, the controllable light source 132, the occupancy sensor 134, the remote-control device 136, and/or another type of control device. In addition, the control device beacon messages may be transmitted via RF signals 102. The RF communication signals 102 and the RF communication signals 104 may be wireless communication signals that communicate via a wireless communication protocol (e.g., via a standard protocol, such as the ZIGBEE, Z-WAVE, BLUETOOTH, BLUETOOTH LOW ENERGY (BLE), WI-FI, or THREAD protocols; a proprietary communication protocol, such as the CLEAR CONNECT protocol (e.g., the CLEAR CONNECT TYPE A protocol and/or CLEAR CONNECT TYPE X protocol) protocol, and/or any suitable communication protocol). The RF communication signals 102 and the RF communication signals 104 may be of a different signal type (e.g., protocol, bandwidth, etc.).

For example, the RF communication signals 104 may be communicated via a short-range wireless communication link using a short-range wireless communication protocol (e.g., such as the BLUETOOTH and/or BLUETOOTH LOW ENERGY (BLE) protocols). The RF communication signals 102 may be communicated via a wireless network communication link using a wireless network communication protocol (e.g., such as the CLEAR CONNECT and/or THREAD protocols), and/or any other suitable communication protocol that may be used for communications between control devices (e.g., control-target devices and control-source devices). One of the RF communication signals (e.g., RF communication signals 102) may be used for controlling electrical loads during operation of the load control system 100, and one of the RF communication signals (e.g., RF communication signals 104) may be used for discovering control devices and commissioning the load control system 100.

The RF communication signals 102, 104 may be communicated via a communication circuit (e.g., transceiver) in the respective control devices, or via a separate beacon transmitting device. The beacon transmitting devices for a control device may be included in, or nearby, the control device for indicating a relative location of the corresponding control device by transmitting control device beacon messages. The RF communication signals 102 may be communicated via the same communication circuit as the RF communication signal 104, or a different communication circuit.

The network device 150 may transmit optical signals 109 via an optical transmitter 108. The optical transmitter 108 may be, for example, a laser pointer, and may be detachable from the network device 150. For example, the optical transmitter may be capable of being inserted into a port (e.g., headphone jack, USB port, etc.) on the network device 150. The load control devices of the lighting fixtures (e.g., the load control device 114 of the lighting fixture 110, the load control devices 124a-124c of the lighting fixtures 120a-120c, and/or the internal load control device of the controllable light source 132 of the lighting fixture 130) may receive the optical signals 109 from the optical transmitter 108 (e.g., which may be attached to the network device 150 or another device). For example, the lighting loads may each comprise one or more internal detectors configured to perform optical feedback on the light emitted from the respective lighting load, and the load control devices may be configured to receive the optical signals 109 via the one or more internal detectors of the respective lighting loads. In addition, the load control devices of the lighting fixtures (e.g., the load control device 114 of the lighting fixture 110) may be configured to receive the optical signal 109 via respective sensors (e.g., the sensor 116). For example, the sensors 116 may be capable of detecting different types of optical signals in the space. The load control devices of the lighting fixtures may record a baseline ambient light level in an area in which the lighting fixtures are located. The load control devices of the lighting fixtures may be capable of detecting a strength at which an optical signal 109 is received from the network device 150, or another device capable of transmitting the optical signal 109.

The load control devices of the lighting fixtures may receive the optical signals 109 from the optical transmitter 108 (e.g., which may be attached to the network device 150 or another device). The load control devices of the lighting fixtures may determine a signal strength at which an optical signal 109 was received, and may transmit an indication of the signal strength to the network device 150 (e.g., via the system controller 114 and the load controller 121, respectively). The optical signals 109 may be used as part of configuration and/or control of the lighting fixture 110, the lighting fixtures 120a-120c, and/or the lighting fixture 130. The network device 150 may select a lighting fixture for configuration and/or control based on the indications of the signal strengths. For example, the network device 150 may select lighting fixture 110 for configuration and/or control based on a determination that the optical signal 109 was received at the internal detectors of the lighting loads 112 and/or the sensor 116 with the highest signal strength (e.g., highest normalized signal strength). The internal detectors of the lighting loads and/or the sensors 116 may be used to record baseline ambient light levels in the areas in which lighting fixture 110 and lighting fixtures 120a-120c are located, respectively. The signal strengths may be indicated as normalized signal strengths (e.g., relative to the respective baseline ambient light levels).

The load control system 100 may include one or more beacon transmitting devices that may be location beacon transmitting devices, such as a beacon transmitting device 180. The beacon transmitting device 180 (e.g., the location beacon transmitting device) may be located at a work station 182. The location beacon transmitting device may communicate a beacon message (e.g., a location beacon message) via RF communication signals 102 and/or 104. The beacon message transmitted by the location beacon transmitting device may include a beacon message that communicates a unique identifier. The beacon message may be associated with a location at which the location beacon transmitting device resides, such as the work station 182, an office, a conference room, a portion of an office or conference room, or another location.

The beacon message transmitted by the location beacon transmitting device may include a unique identifier that the mobile device 150 and/or the system controller 140 may associate with a physical location at which the location beacon transmitting device resides. If multiple location beacon messages are discovered, the user may associate the unique identifier of the beacon message with the greatest signal strength to the closest physical location. The physical location may also, or alternatively, be determined from the geolocation of the mobile device 150.

The mobile device 150 may discover the beacon message transmitted by the location beacon transmitting device for configuring and/or controlling one or more control devices in the load control system. For example, the mobile device 150 may discover the beacon message transmitted by the location beacon transmitting device and may associate the unique identifier of the beacon message with the unique identifier discovered from one or more control device beacon messages (e.g., beacon messages transmitted by control devices). The control devices that are associated with the unique identifier of the beacon message transmitted by the location beacon transmitting device may be collectively controlled when the location beacon transmitting device is discovered by mobile devices.

The beacon messages may be transmitted from the control devices and/or the location beacon transmitting device periodically, or in response to a triggering event. The triggering event may be receipt of a message. The triggering event may be sent in a message from the mobile device 150 or another device (e.g., the occupancy sensor 134, the remote control device 136, or another control-source device). The system controller 140 may automatically control the communication of the beacon messages by communicating a message based on a periodic triggering event (e.g., expiration of a timer). In response to a message, the control devices and/or the location beacon transmitting device may enter a configuration mode and begin transmitting beacon messages. The message may trigger a transmission of a beacon message or periodic transmission of beacon messages for a period of time.

The transmission of the beacon messages may be triggered by a message transmitted on the same or different RF communication signals and/or protocol and/or channels. For example, the transmission of the beacon messages may be triggered by an optical signal. For devices capable of performing two-way communications on the RF communication signals 104, the mobile device 150 may send a message to the devices on the RF communication signals 104 that cause the devices to communicate beacon messages on the RF communication signals 102. As the transmission of the beacon messages may be performed as a one-way communication from a control device, the transmission of the beacon messages may be triggered by a message sent on another communication protocol and/or using another communication signal. For example, control devices may receive a message via the RF communication signals 102 that triggers the transmission of the beacon messages from the control devices in the load control system on the RF communication signals 104.

The message that triggers the transmission of the beacon messages may be communicated to the control devices and/or the location beacon transmitting device directly or indirectly via another device. For example, the mobile device 150 may send a message to the system controller 140 to trigger the transmission of the beacon messages from the control devices in the load control system. Another message may be sent from the system controller 140 using RF communication signals 102 to trigger the transmission of the beacon messages from the control devices and/or the location beacon transmitting device. The control devices configured to receive the RF communication signals 102 may begin transmitting the beacon messages using RF communication signals 104.

The triggering event may be an actuation of a button on a device. One-way communication devices and/or two-way communication devices may transmit beacon messages in response to actuation of a button on the device.

The device identifier (e.g., device identification data) that is received in the beacon messages from a device may be used to determine the device identifier for communicating with the device on another network or network protocol. For example, the mobile device 150 may receive the beacon message from the lighting fixture 110 via RF communication signals 102 and the unique identifier in the beacon message may correspond to the unique identifier for communicating with the lighting fixture on another network using the RF communication signals 104. The unique identifier on each network or network protocol may have a different format, but may include a portion of the identifier (e.g., primary identifier) that is repurposed on each network for enabling ease of communication.

The mobile device 150 may interpret the information received in the beacon messages and perform commissioning and/or control of the load control system 100, or the mobile device 150 may send the information to another device for enabling commissioning and/or control. For example, the mobile device 150 may send the information received in the beacon messages and/or user input received on the mobile device 150 to the system controller 140 for configuring and/or controlling the load control system 100.

When commissioning the load control system 100, the mobile device 150 and/or the system controller 140 may sort the received beacon messages into a list. The mobile device 150 and/or the system controller 140 may order the list based on a ranging method. For example, the mobile device 150 and/or the system controller 140 may order the list based on the received signal strength indicator (RSSI) of each beacon message. The control device that transmitted the beacon message having the strongest RSSI may be listed first on the list.

The mobile device 150 may discover the beacon messages and determine the beacon message identifiers. The mobile device 150 and/or the system controller 140 may select the beacon message identifiers for being configured and/or controlled. Each of the discovered beacon messages may be selected for configuration and/or control, or the beacon messages that are discovered above a discovery threshold may be selected for configuration and/or control. The discovery threshold may define a discovery range (e.g., an area around the mobile device 150 and/or system controller 140 in which control devices may be discovered). The mobile device 150 and/or the system controller 140 may group control devices identified via the beacon messages and associate the devices for enabling load control in the load control system 100. The mobile device 150 and/or the system controller 140 may automatically add the identifiers of the selected beacon messages to a group of control devices to be associated for enabling load control.

One or more lighting fixtures may be configured and/or controlled using optical signals (e.g., the optical signals 109). The lighting fixtures (e.g., the lighting fixture 110, the lighting fixtures 120a-120c, and/or the lighting fixture 130) may receive the optical signals 109 from the optical transmitter 108 (e.g., which may be attached to the network device 150 or another device). For example, the lighting fixtures may be configured to receive the optical signal via the internal detectors of the lighting loads of the lighting fixtures and/or respective sensors (e.g., the sensors 116). A lighting fixture may provide feedback to indicate that the lighting fixture received the optical signals 109. For example, the lighting fixture may cause a respective lighting load to light in a first color. The lighting fixtures may measure respective signal strengths at which the optical signals 109 are received, and may transmit respective indications of the signal strengths (e.g., as part of a beacon message). For example, the signal strengths may be indicated as normalized signal strengths (e.g., relative to respective baseline ambient light levels).

The network device 150 (e.g., or the system controller 140) may select one or more of the lighting fixtures for configuration and/or control based on the indications of the signal strengths. For example, the network device 150 may select a lighting fixture that received the optical signal 109 at the highest signal strength for configuration and/or control. The selected lighting fixture may provide feedback to indicate that the lighting fixture been selected for configuration and/or control. For example, the lighting fixture may cause a respective lighting load to light in a second color. Once configuration and/or control of the selected lighting fixture has been completed, the network device 150 may select another lighting fixture (e.g., that received the optical signal 109 at the second highest signal strength) for configuration and/or control. A lighting fixture for which configuration and/or control has been completed may provide feedback to indicate that the lighting fixture has been configured and/or controlled. For example, the lighting fixtures may cause a respective lighting load to light in a third color.

The control settings for the group of control devices may be configured at the mobile device 150 and/or the system controller 140 based on input received from the user via a user interface 152 of the mobile device 150. The mobile device 150 may display lighting control configuration 190 on the user interface 152. For example, lighting control configurations 190 may include preset configurations 192, zone configurations 194, occupancy configurations 196, and/or timing schedule configurations 198 that may be configured for the group of control devices. The mobile device 150 may display dimmer 199 on the user interface 152. For example, the dimmer 199 may be used to control one or more lighting fixtures in real time and/or to set lighting levels for one or more of the preset configurations 192, zone configurations 194, occupancy configurations 196, and/or timing schedule configurations 198. For example, the dimmer may be used to decrease a lighting level for one or more lighting fixtures at a certain time of day.

The preset configurations 192 may be configured by adjusting the intensity level of one or more lighting fixtures using a virtual slider 199 (e.g., a virtual dimmer) and storing the settings. A user may select the preset configurations 192 on the user interface 152 to set an intensity level of one or more lighting fixtures to be controlled according to the preset. Different presets may be configured to set different lighting fixtures to different lighting levels for different occasions, such as a bedtime preset for when a user is going to bed, a movie preset for when a user is watching television or a movie, an away preset for when a user is away from the building, a home preset for when the user is in the building, or any other preset a user may define for an occasion.

A user may select the zone configurations 194 on the user interface 152 to define one or more zones of lighting fixtures for being controlled. The control devices that are discovered and added to a group as described herein may each be included in a zone, such that the group identifier (e.g., the temporary group identifier) is also a zone identifier, or the zone identifier may indicate a subset of the devices that have been discovered and added to a group of devices for configuration and/or control. Different zones may be separately controlled by sending lighting control instructions to a zone to set the zones to different lighting levels. The associated device identifiers of the identified lighting fixtures in a zone may be stored at the mobile device 150 and/or the system controller 140 as a defined zone configuration 194 for controlling the lighting fixtures in the defined zone. The zone configurations 194 may be sent in messages to the system controller 140 and/or the lighting fixtures in the defined zone for being stored for controlling the lighting fixtures according to the zone configurations 194.

A user may select the occupancy configurations 196 on the user interface 152 to define one or more lighting fixtures for being controlled according to the occupancy or vacancy of a space. Different lighting fixtures may be controlled to different lighting levels in response to occupancy commands and/or vacancy commands received from an occupancy sensor, such as the occupancy sensor 134.

A user may select the timing schedule configurations 198 on the user interface 152 to define a timing schedule for one or more lighting fixtures. Different lighting fixtures may be controlled to different lighting levels (e.g., on/off, a pre-defined intensity level, etc.) in accordance with a timing schedule that may be monitored by the system controller 140.

Figure 2A:
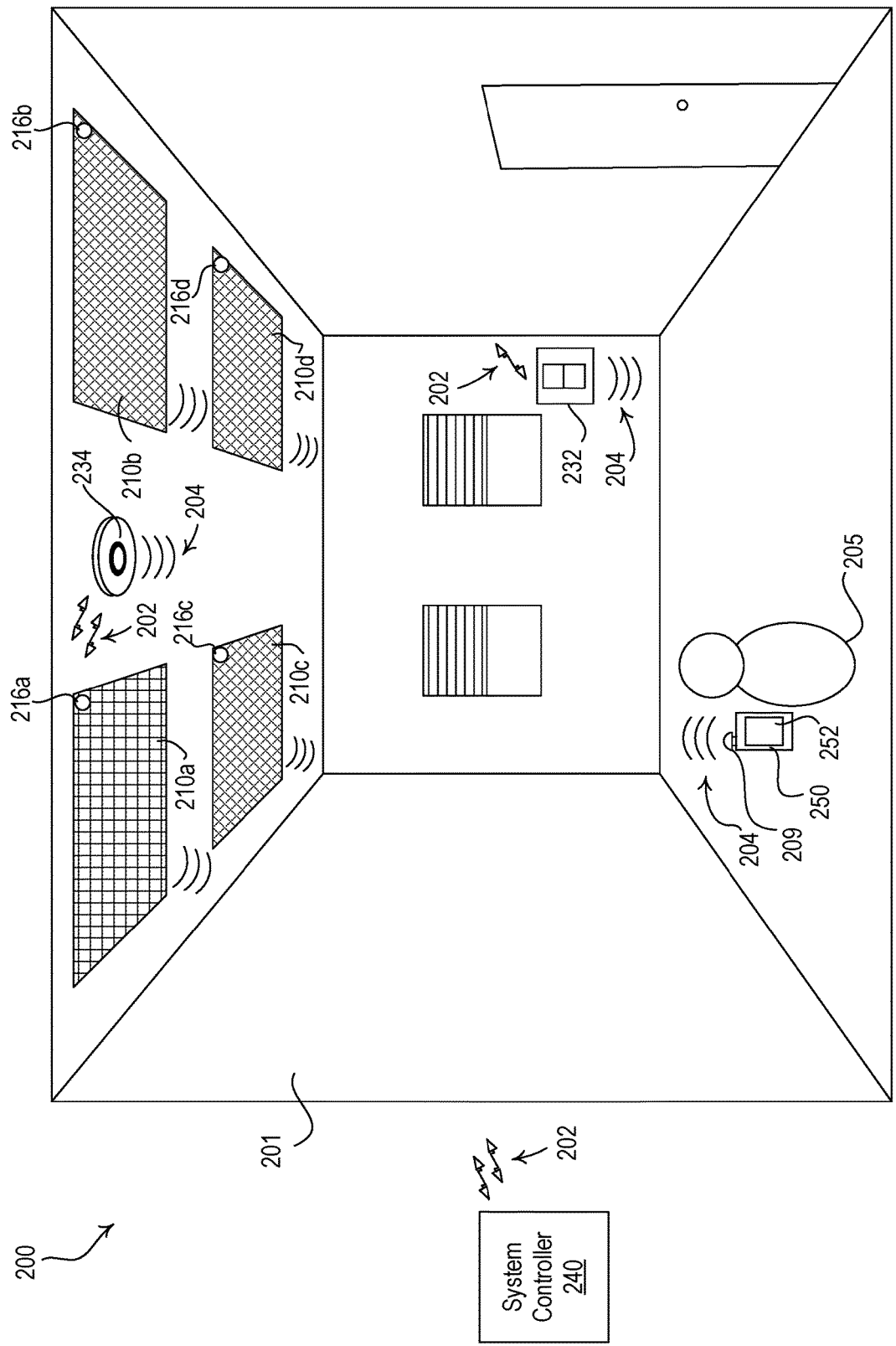
FIG. 2A illustrates a representative load control environment in which the load control system shown in FIG. 1 may be implemented for configuring and/or controlling one or more control devices using beacon messages.

FIG. 2A illustrates a representative load control environment 202 in which a load control system 200 (e.g., the load control system 100 shown in FIG. 1) may be implemented for configuring and/or controlling one or more control devices using beacon messages and/or an optical signal. The load control system 200 may include a plurality of lighting fixtures 210a-210d (e.g., the lighting fixture 110 and/or the lighting fixture 130). Each of the lighting fixtures 210a-210d may comprise one or more lighting loads (e.g., the lighting loads 112) and a lighting control device (e.g., the lighting control device 114) for controlling the intensity and/or color of the lighting loads of the respective lighting fixture. The lighting fixtures 210a-210d may also each comprise a controllable light source, such as the controllable light source 132 shown in FIG. 1. The lighting control devices of the lighting fixtures 210a-210d may operate as control-target devices for controlling the respective lighting loads in response to the received messages from control-source devices. The control-source devices of the load control system 200 may comprise an occupancy sensor 234 (e.g., the occupancy sensor 134), a remote control device 236 (e.g., the remote control device 136), and sensors 216a-216d mounted to the respective lighting fixtures 210a-210d (e.g., the sensor 116). The sensors 216a-216d may be occupancy sensors, visible light sensors (e.g., cameras), daylight sensors, optical sensors, and/or any other type of sensor. For example, one or more of the occupancy sensor 234 and/or the sensors 216a-216d may be visible light sensors (e.g., cameras). The load control system 100 may also comprise a system controller 240 (e.g., the system controller 140) and a network device, such as a mobile device 250 (e.g., the mobile device 150), which may also operate as a control-source device. For example, the mobile device 250 may comprise a smart phone and/or a tablet.

As shown in FIG. 2A, control devices (e.g., the lighting control device of the lighting fixture 210a) may be selected for being configured and/or controlled and may provide feedback to a user 205 (e.g., an installer) to identify the devices that have been selected for configuration and/or control. The control devices may be claimed and/or associated with configuration identifiers (e.g., zone or group identifiers for being joined to a network) of configuration data for enabling load control in the load control environment 201. The configuration identifier may be a fixture, group, zone, area, and/or location that may be defined by the configuration data (e.g., the lighting control configuration information) generated by the design software. For example, the feedback may be provided by a control device to indicate that the control device is ready to be claimed, has been selected for claiming, and/or has been claimed. A control device may be claimed by selecting a configuration identifier with which to associate the control device. The control device that is being claimed may transmit a unique identifier (e.g., a serial number) to the mobile device 250. The control device may be associated with the configuration identifier by creating an association between the configuration identifier and the unique identifier of the control device. The mobile device may store the unique identifier as well as information about the association between the configuration identifier and the control device in the configuration data. After a control device is claimed, it may be joined to a network, and/or may be configured and/or controlled by the user 205. For example, the user 205 may send one or more commands to a control device via the mobile device.

During the process of claiming the control devices and/or associating the control devices with the configuration identifiers of the configuration data, the control devices may be configured to communicate with the mobile device 250 via a first wireless communication medium (e.g., via RF communication signals 204 using a short-range wireless communication protocol). During normal operation of the load control system 200, the control devices may be configured to communicate with each other via a second wireless communication medium (e.g., via RF communication signals 202 transmitted on a wireless communication network). After being claimed, the control devices may be configured to join the wireless communication network. For example, the control devices may be joined to the wireless communication network by transmitting the association between the control device and the configuration identifier to a remote device. After the control devices are joined to the wireless communication network, the control devices may communicate with each other via the wireless communication network during normal operation.

The configuration data may define the operation and/or functionality of the load control system 200. The configuration data may include representations of the control devices (e.g., the lighting fixtures 210a-210d, the occupancy sensor 234, the remote control devices 236, the sensors 216a-216d, etc.) in the load control system 200, as well as configuration identifiers (e.g., fixtures, groups, zones, areas, and/or locations) of the control devices. For example, the configuration data may define the functionality of the control devices, for example, how the lighting fixtures 210a-210d respond to the occupancy sensor 234, and/or the remote-control device 236. The configuration data may be configured using a design software executed by a processing device (e.g., the processing device 160), for example, prior to claiming and/or associating the control devices with the corresponding configuration identifier of the control device in the configuration data. In addition, the configuration data may be configured, for example, by the mobile device 250 while the mobile device is claiming and/or associating the control devices with the configuration identifier of the control device in the configuration data. The configuration data may be transmitted to the control devices via the wireless communication network after the control devices have joined the wireless communication network.

The mobile device 250 may be configured to claim control devices (e.g., the lighting control devices of the lighting fixtures 210a-210d, the occupancy sensor 234, and/or the remote-control device 236) and/or associate the control devices with a configuration identifier of the control device in the configuration data. The sensors 234a-234d may be used in claiming and/or associating the control devices for configuration and/or control. The user 205 may cause the mobile device 250 to enter a configuration mode (e.g., a claiming mode and/or an association mode). For example, the user 205 may press a button on the mobile device 250 to cause the mobile device to enter the configuration mode. In the configuration mode, the mobile device 250 may discover the beacon messages of control devices in the load control environment 201. As described herein, a control device may be claimed by associating a unique identifier of the control device with a configuration identifier.

The mobile device 250 may transmit (e.g., periodically transmit) a beacon message (e.g., a mobile device beacon message) after entering the configuration mode. The mobile device 250 may transmit the mobile device beacon messages via the first wireless communication medium 204 (e.g., via a short-range wireless communication link using a short-range wireless communication protocol). The mobile device beacon message may include, for example, a beacon message identifier. For example, the beacon message identifier may be a unique identifier that identifies the mobile device 250 (e.g., or an application executed on the mobile device 250) and/or a non-unique identifier, such as an identifier of a group, area, building, load control system, and/or manufacturer of the mobile device and/or the control devices of the load control system 200. The mobile device beacon message may also include a discovery threshold. The control devices may receive the mobile device beacon message and may compare a received signal strength indicator (RSSI) of the received mobile device beacon message to the discovery threshold. For example, the received signal strength indicator may be a signal strength at which the mobile device beacon message was received. Each of the control devices may enter the configuration mode when the beacon message identifier of the mobile device matches a particular beacon message identifier and/or the received signal strength indicator is greater than or equal to the discovery threshold (e.g., the control device is within a discovery range of the mobile device 250). For example, the particular beacon message identifier may be predetermined and/or stored in memory of the control devices. The mobile device 250 may adjust the discovery threshold that is included in the mobile device beacon message to adjust the discovery range of the mobile device.

After entering the configuration mode, the control devices (e.g., lighting control devices of the lighting fixtures 210a-210d) may each transmit (e.g., periodically transmit) a control device beacon message. The control devices may transmit the control device beacon messages via the first wireless communication medium 204. Each control device beacon message may include the unique identifier of the control device that transmitted the respective beacon message. In addition, the control devices may become ready to be claimed by the mobile device 250 after entering the configuration mode. After entering the configuration mode (e.g., in response to receiving the mobile device beacon message), the control devices (e.g., the lighting fixtures 210a-210d) may provide feedback to the user 205 to indicate that the control devices are ready to be claimed. The feedback may be provided by changing a state of the lighting load in the lighting fixture 210a. For example, the lighting fixture 210a may turn a first color (e.g., orange) after entering the configuration mode (e.g., in response to receiving the mobile device beacon message) to indicate to the user that the control device is within the discovery range of the mobile device 250 and is ready to be claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the mobile device beacon message transmitted by the mobile device 250, and/or may be preprogrammed and stored at the control device (e.g., the lighting fixtures 210a-210d).

As the user 205 moves around the load control environment 201 with the mobile device 250, the control devices that are within the discovery range of the mobile device may change. When control devices (e.g., the lighting control devices of the lighting fixtures 210a-210d) begin to receive the mobile device beacon message as the user moves around, those control devices may enter configuration mode (e.g., become ready to be claimed), begin transmitting their control device beacon message, and provide feedback (e.g., turn the first color). In addition, when the control devices fall outside of the discovery range of the mobile device 250 and/or fall outside of the wireless range of the mobile device 250 (e.g., stop receiving the mobile device beacon message) as the user moves around, those control devices may exit the configuration mode after a timeout period (e.g., one minute). As a result, those control devices may stop transmitting their control device beacon message and stop providing feedback (e.g., turn off).

The mobile device 250 may receive the control device beacon messages from one or more of the control devices. For example, the mobile device 250 may receive the control device beacon message from the lighting control device of the lighting fixture 210*a* and select that lighting control device for being claimed (e.g., for joining the network). The mobile device 250 may rank the received control device beacon messages based on the received signal strength indicators of the respective control device beacon message. For example, the mobile device 250 may select the lighting control device of the lighting fixture 210*a* for being claimed if the received signal strength indicator of the control device beacon message from that lighting control device is a maximum received signal strength indicator of the received control device beacon messages.

The mobile device 250 may send a connection message to the control device having a received control device beacon message with the maximum received signal strength. For example, the mobile device 250 and the control device may be configured to establish a connection (e.g., a two-way communication connection) in response to the control device receiving the connection message from the mobile device 250. In addition, the connection message may indicate to the control device that the control device has been discovered and selected for claiming. For example, the connection message may be sent via the RF communication signals 204 (e.g., directly from the mobile device 250). For example, the mobile device 250 may connect to a single control device at a time (e.g., to select a single control device at a time to be claimed).

In response to receiving the connection message, the control device (e.g., the lighting fixture 210*a*) may provide feedback to the user 205 to indicate that the lighting fixture 210*a* has been selected for claiming. The feedback may be provided by changing a state of the lighting load in the lighting fixture 210*a*. For example, the lighting fixture 210*a* may turn a second color (e.g., blue) after entering the configuration mode (e.g., in response to receiving the mobile device beacon message) to indicate to the user than the control device is selected to be claimed. As shown in FIG. 2A, the lighting fixture 210*a* may be illuminated to the second color, while the other lighting fixtures 210*b*-210*d* may be illuminated to the first color. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the connection message from the mobile device 250, and/or may be preprogrammed and stored at the control device (e.g., the lighting fixtures 210*a*-210*d*).

As the user 205 moves around the load control environment 102 with the mobile device 250, the received signal strength indicators of the received control device beacon messages received by the mobile device may change. As a result, the control device beacon message having the maximum received signal strength indicator of the received control device beacon messages provides the feedback (e.g., by turning the second color). The mobile device 250 may be configured to break the connection with the previous control device (e.g., by sending a message to the previous control device), which may stop providing the feedback (e.g., change from the second color to the first color, since the control device may still be within discovery range of the mobile device). In addition, the mobile device 250 may transmit a connection message to the new control device having a received control device beacon message with the maximum received signal strength. Thus, that control device may be selected for claiming and start providing feedback (e.g., turn the second color).

The mobile device 250 may transmit (e.g., periodically transmit) optical signals (e.g., the optical signals 109) after entering the configuration mode. The mobile device 250 may transmit the optical signal via an attached optical transmitter (not shown). The control devices may receive the optical signal via internal detectors of the lighting loads of the lighting fixtures 210*a*-210*b* and/or sensors (e.g., sensors 216*a*-216*d*), and may measure a signal strength of the received optical signal. Each of the control devices may enter the configuration mode when the control device receives the optical signal, or the control devices may enter the configuration mode prior to receiving the optical signal.

After entering the configuration mode, the control devices (e.g., the lighting fixtures 210*a*-210*d*) may provide feedback to the user 205 to indicate that the control devices are ready to be claimed. The feedback may be provided by changing a state of the lighting load in the lighting fixture 210*a*. For example, the lighting fixture 210*a* may turn a first color (e.g., orange) after entering the configuration mode (e.g., in response to receiving the optical signals) to indicate to the user that the control device has received the optical signals and is ready to be claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be may be preprogrammed and stored at the control device (e.g., the lighting fixtures 210*a*-210*d*).

After entering the configuration mode, the control devices (e.g., lighting control devices of the lighting fixtures 210*a*-210*d*) may each transmit (e.g., periodically transmit) an indication of the signal strength at which one or more of the optical signals was received. The control devices may transmit the indications via the first wireless communication medium 204. Each indication may include the unique identifier of the control device that transmitted the optical signals. In addition, the control devices may become ready to be claimed by the mobile device 250 after entering the configuration mode.

As the user 205 moves around the load control environment 201 with the mobile device 250, the control devices that are receiving the optical signals may change. One or more control devices that are not receiving the optical signals may be in the configuration mode. When control devices (e.g., the lighting control devices of the lighting fixtures 210*a*-210*d*) that are in the configuration mode begin to receive the optical signals as the user moves around, those control devices may begin transmitting their signal strength indication, and provide feedback (e.g., turn the first color). In addition, when the control devices stop receiving the optical signal as the user moves around, those control devices may stop transmitting their signal strength indications and stop providing feedback (e.g., turn off) after a timeout period (e.g., one minute).

The mobile device 250 may receive the signal strength indications from one or more of the control devices. For example, the mobile device 250 may receive the signal strength indications from the lighting control device of the lighting fixture 210a and select that lighting control device for being claimed (e.g., for joining the network). The mobile device 250 (e.g., and/or the system controller 240) may select a lighting control device for being claimed based on the signal strength indications. For example, the mobile device 250 may select the lighting control device of the lighting fixture 210a for being claimed if the lighting fixture 210a received the optical signal at the highest signal strength.

The mobile device 250 may send a connection message to the selected control device. For example, the mobile device 250 and the control device may be configured to establish a connection (e.g., a two-way communication connection) in response to the control device receiving the connection message from the mobile device 250. In addition, the connection message may indicate to the control device that the control device has been discovered and selected for claiming. For example, the connection message may be sent via the RF communication signals 204 (e.g., directly from the mobile device 250). For example, the mobile device 250 may connect to a single control device at a time (e.g., to select a single control device at a time to be claimed).

In response to receiving the connection message, the control device (e.g., the lighting fixture 210a) may provide feedback to the user 205 to indicate that the lighting fixture 210a has been selected for claiming. The feedback may be provided by changing a state of the lighting load in the lighting fixture 210a. For example, the lighting fixture 210a may turn a second color (e.g., blue) after entering the configuration mode (e.g., in response to receiving the connection message) to indicate to the user than the control device is selected to be claimed. As shown in FIG. 2A, the lighting fixture 210a may be illuminated to the second color, while the other lighting fixtures 210b-210d may be illuminated to the first color. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the connection message from the mobile device 250, and/or may be preprogrammed and stored at the control device (e.g., the lighting fixtures 210a-210d). A lighting fixture for which configuration and/or control has been completed may provide feedback to indicate that the lighting fixture has been configured and/or controlled. For example, the lighting fixtures may cause a respective lighting load to light in a third color.

When the desired control device (e.g., the lighting control device of the lighting fixture 210a) is selected for claiming (e.g., the mobile device 250 is connected to the lighting control device and the lighting fixture is the second color), the user 205 may actuate a button (e.g., a soft or virtual button displayed on a user interface 252 of the mobile device 250) on the mobile device 250 to claim (e.g., and/or associate) the selected lighting control device. For example, the user 205 may select a zone or group (e.g., that is displayed on the mobile device 250) to associate with the selected lighting control device to claim that lighting control device. Thus, claiming and association may occur at the same time. The mobile device 250 may transmit a claiming message to the selected lighting control device in response to the selection of the zone or group on the mobile device to indicate that that the control device has been claimed and/or associated. In addition, the selected lighting control device may transmit a confirmation message (e.g., a claim confirmation message) to the mobile device 250 in response to receiving the claiming message. The claim confirmation message may include a unique identifier (e.g., a serial number) of the selected lighting control device.

In response to being claimed (e.g., in response to receiving the claiming message), the control device (e.g., the lighting fixture 210a) may provide feedback to the user 205 to indicate that the lighting fixture 210a has been claimed (e.g., for joining the network). The feedback may be provided by changing a state of the lighting load in the lighting fixture 210a. For example, the lighting fixture 210a may turn a third color (e.g., green) after being claimed. In addition, the feedback may be provided by flashing the lighting load on and off, increasing and/or decreasing the intensity level of the lighting load, increasing and/or decreasing the color temperature of the lighting load, and/or providing other visual feedback to the user 205. The feedback type may be indicated in the claiming message from the mobile device 250, or may be preprogrammed and stored at the control device (e.g., the lighting fixtures 210a-210d).

In response to being claimed, the control device may exit the configuration mode and enter a joining mode. In the joining mode, the control device may stop transmitting (e.g., periodically transmitting) the control device beacon message continuously on the first wireless communication medium 204. For example, the control device may periodically switch between the first wireless communication medium 204 and the second wireless communication medium 204 (e.g., the wireless communication network). The control device may listen on the wireless communication network 202 to determine if a request to join the wireless communication network is being transmitted on the wireless communication network. The control device may continue to periodically transmit the control device beacon message via the first wireless communication medium (e.g., at a slower rate than in the configuration mode) in case the mobile device 250 needs to reconnect to the control device while the mobile device is in the configuration mode. After the control devices have joined the wireless communication network 202, the configuration data may be transmitted to the control devices via the wireless communication network.

Figure 2B:
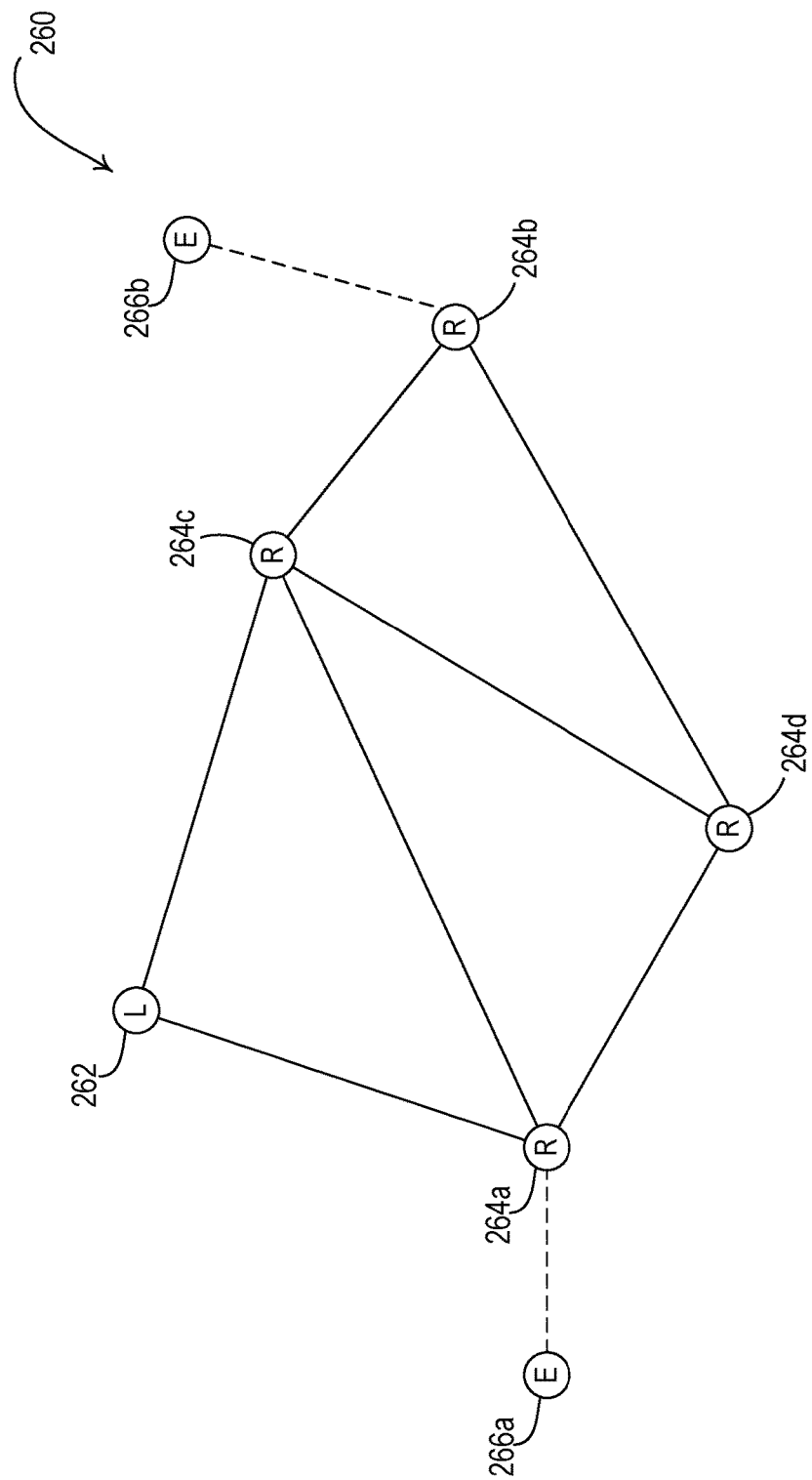
FIG. 2B is a diagram of an example network for communication within the load control system of FIG. 1.

FIG. 2B is an illustration of an example network 260 that may allow for communication between devices in a load control system (e.g., the load control system 100 and/or the load control system 200). The network 260 may include any suitable network to facilitate communications in a load control system or an Internet of Things (IoT) environment. The various control devices of the load control system 200 may communicate with each other via the network 260. As shown in FIG. 2B, the network 260 may comprise a single network partition. In addition, the network 260 may be an example of a network partition (e.g., a subnetwork or subnet) within a larger network. For example, the network 260 may be an example of a network partition within a larger network composed of a plurality of network partitions. The network 260 is an example network and the techniques described herein may be applied to other networks, for example, that include more devices or fewer devices than the network 260.

The circled nodes of FIG. 2B may represent devices that are joined to the network 260 and are attached to other devices the network 260 (e.g. the various control devices of the load control system 100 and/or load control system 200). A device that is attached to at least one other device on the network 260 may communicate with the other devices (e.g., that are attached to another device on the network 260). Communication within the network 260 may be facilitated by the links (e.g., attachments) established within the network 260. Referring to FIG. 2B, the links between the devices may be indicated by lines (e.g., solid and dashed lines) that connect the respective devices.

One or more of the devices shown in FIG. 2B may be joined to the network 260 via a joining procedure. The network 260 may be a mesh network, and each device may exchange network credentials with a commissioning device (e.g., the system controller or the mobile device) that may allow the device to join the network 260 and enable the device to communicate on the network 260. A device may be able to communicate with other devices using another wireless protocol, but may be unable to communicate with or attach to other devices on the network 260 without the network credentials. The network credentials may include a joinder identifier (e.g., or any other identifier) that the device may use to join the network 260 and communicate with another device.

A device may be claimed (e.g., via a claiming procedure) before being joined to the network 260. For example, the claiming procedure may be used to identify devices (e.g., individual devices and/or groups of devices) for being joined to the network 260. As part of the claiming procedure, a device may exchange credentials with a commissioning device to enable the device to communicate on the network 260. Without this exchange of credentials, the device may not get the joiner ID and may be unable to communicate on the network 260.

The devices attached to at least one other device on the network 260 may take on and/or be assigned a respective role in the network. For example, the roles may include: a leader device (e.g., leader device 262), a router device (e.g., router devices 264a-264d), and/or an end device (e.g., end devices 266a and 266b). The role of a device may indicate the functions and/or capabilities of the device with respect to the network 260.

As illustrated in FIG. 2B, the network 260 may include a leader device 262. The leader device 262 may manage other devices attached to the network 260. For example, the leader device 262 may assign and maintain router identifiers (e.g., router IDs) for each of the router devices 264a-264d. For example, each of the router devices 264a-264d may be assigned a unique router identifier. The leader device 262 may assign and maintain the roles of other devices. The leader device 262 may be configured as the gateway for the network 260. For example, the leader device may a device that facilitates communication (e.g., routes and receives messages to and from) between the network 260 and other networks or network partitions. Referring to FIG. 2A, a system controller (e.g., the system controller 240 shown in FIG. 2A) may be an example of a leader device 262. In addition, a device within a load control system that is capable of being assigned to the role of a router device may be assigned to the role of the leader device (e.g., a control device).

The network 260 may include one or more router devices 264a-264d. The leader device 262 may support and be attached to multiple router devices (e.g., more than 30 router devices). The leader device 262 may operate as a router device. The router devices 264a-264d on the network 200 (e.g., attached to the leader device 262 on the network 260) may be in communication with each other, for example, to form a mesh network. The router devices 264a-264d may be in communication with one another (e.g., as indicated by the solid lines connecting the router devices 264a-264d). The router devices 264a-264d may be in communication with the leader device 262, either directly or through one or more other router devices (e.g., as indicated by the solid lines connecting the leader device 262 to the router devices 264a and 264c). The router devices 264a-264d may receive and route messages to other devices on the network 260 (e.g., the end devices 266a, 266b). For example, the router devices 264a-264d may receive/transmit messages between devices, or between each other for communicating messages received from an attached device to another device attached to another router device. Referring now to the load control system 200 shown in FIG. 2A, a device that is, for example, externally powered by an AC main (e.g., a device that is not battery powered) may be assigned to the role of a router device. For example, the system controller 240 and/or the lighting control devices of the lighting fixtures 210a-210d may be assigned to the role of router devices.

The network 260 may include one or more end devices 266a, 266b (e.g., full or minimal end devices). Each of the end devices 266a, 266b may be attached to another device (e.g., a parent device) on the network 200 and may transmit and/or receive messages via an attached router device 264a-264d. For example, the end devices 266a, 266b may each transmit an address (e.g., a network address), a joiner identifier (e.g., for network authentication), and/or other types of device identification data to one or more of the router devices 264a-264d. Though two end devices 266a, 262b are shown in FIG. 2B, and each is attached to different router devices, each router device 264a-264d may support multiple end devices (e.g., more than 500 end devices). Referring to the load control system 200 of FIG. 2A, the system controller 240, input devices (e.g., the remote control device 232 and/or the occupancy sensor 230), and/or load control devices (e.g., the lighting control devices of the lighting fixtures 210a-210d), may be examples of the end devices 266a, 266b shown in FIG. 2B.

The leader device 262 may update the roles (e.g., or confirm role updates) of the devices communicating within the network 260, for example, based on changes to the network 260. In an example, a device may be assigned to a certain role when the device attaches to the network 260, and the leader device 262 may update the role of the device based on changes in network conditions. Changes in network conditions may include: increased message traffic, attachment of other devices, changes in signal strength, etc. Updates to the assigned role of a device may be based on the capabilities of the device. The leader device 262 may update the role of a device to a router device by assigning a router identifier (ID) to the device.

The devices attached to other devices on the network 260 may further operate as parent devices and child devices. Leader device (e.g., the leader device 262) and router devices (e.g., the router devices 264a-264d) that are attached to one or more end devices (e.g., the end devices 266a, 266b) may operate as parent devices. End devices (e.g., the end devices 266a, 266b) that are attached to a leader device (e.g., the leader device 262) and/or a router device (e.g., one of the router devices 264a-264d) may operate as child devices. As parent devices, the leader device 262 and the router devices 264a-264d may each be attached to one or more child devices (e.g., one or more of the end devices 266a, 266b, as described herein). In addition, the leader device 262 and the router devices 264a-264d may store and/or relay messages that are sent by their respective attached child devices. For example, the leader device 262 and the router devices 264 may receive messages from their respective child devices and route the received messages to the intended recipient device (e.g., either directly or via the respective parent device of the intended recipient device). Similarly, the leader device 262 and the router devices 264a-264d may receive messages intended for their respective child device and route the message to the appropriate child device.

As indicated in FIG. 2B, the relationship (e.g., attachment) between a child device and a respective parent device may be indicated by dashed lines. The router device 264a may receive messages intended for the end device 266a and forward the message to the end device 266a. As the router device 264a is configured as the parent device of the end device 266a, the end device 266a may transmit messages to the router device 264a, and the router device 264a may route the message to the intended recipient. For example, when the end device 266a intends to transmit a message to the end device 266b, the end device 266a may initially transmit the message to the router device 264a. The router device 264a may route the message to the router device 264b (e.g., the parent device of the end device 266b), and the router device 264b may then forward to message to the end device 266b.

In the network 260, the router devices (e.g., leader device 262 and router devices 264a-264d) may periodically transmit advertisement messages that indicate the presence of the router devices on the network. The advertisement messages may be used for calculating cost and/or quality of communications in the network 260. Each router device may receive an advertisement message that includes an identifier of the router device transmitting the advertisement message and measure the received signal strength indicator (RSSI) of the received advertisement message. The received signal strength indicator may be used to calculate a link quality at which the advertisement message is received (e.g., link quality in (LQI)). Each router device (e.g., leader device 262 and router devices 264a-264d) may send an advertisement message as a multicast message. The advertisement messages transmitted by a router device may be received by neighboring router devices that share a single-hop communication link with the router device transmitting the advertisement messages. A single-hop communication link may be capable of communicating messages (e.g., digital messages) from a router device via a unicast and/or multicast communication directly to another router device. For example, the router devices 264a, 264c may be neighboring devices that share a single-hop communication link with the leader device 262, as the router devices 264a, 264c are capable of sending digital messages directly to and/or receiving digital messages directly from the leader device 262. The single-hop communication link may be a communication link on which router devices may be capable of directly receiving the advertisement messages above a given link quality (e.g., LQI greater than 0).

After a router device receives a periodic advertisement message from another router device, the router device may calculate the link quality (e.g., LQI) of the communication link via which the advertisement message is received. The LQI may be calculated as a predefined number that is within a range indicating different link qualities for the communication link between two devices. For example, the LQI may be indicated by values of 0, 1, 2, or 3. The different indicators of LQI may be assigned based on the RSSI of the received advertisement message and a link margin relative to a predefined receive level.

A child device may receive advertisement messages from a parent router device or a router device other than the parent device of the child device (e.g., an auxiliary parent device or a router device other than an auxiliary parent device of the child device). For example, the router device may transmit advertisement messages to enable other control devices to determine that a network has been formed and that the device hearing the advertisement message may attempt to attach to the router (e.g., to communicate via the network). Devices may receive and track the advertisement messages transmitted by routers to determine whether the device is able to communicate via the network. Also, or alternatively, the advertisement messages transmitted by a respective router may provide other routers with the ability to measure the communication signal (e.g., RSSI) between the respective routers attached to the network (e.g., which the routers may use to update their respective routing tables or routing information). As described herein, the child device may measure a received signal strength indicator (RSSI) of the received advertisement messages.

Child devices may create and maintain an auxiliary parent table. The auxiliary parent table may include a list of auxiliary parents with which a respective child device is configured to communicate (e.g., synchronized with and/or able to receive multicast messages from). In addition, the auxiliary parent table may include an indication of the received signal strength (e.g., an RSSI) for each of the auxiliary parent devices of the child device. For example, the auxiliary parent table may include a rolling average of the received signal strength indicators for each of the auxiliary parent devices of the child device. Child devices may similarly create and/or maintain a router table. The router table may include the routers that a respective child device has received messages from (e.g., advertisement messages). In addition, the router table may include an indication of the RSSI of messages received from each of the routers in the router table. Also, or alternatively, child devices may maintain a generic router table. The router table may include each of the routers that a respective child device has received advertisement messages from and a received signal strength indicator for each of the respective routers. The router table may also include an indication of whether a respective router is a parent of the child device or an auxiliary parent of the child device. As used herein, the term auxiliary parent table may refer to a separate table from the router table or a subset of the router table that include the routers that are synchronized auxiliary parents of the child device.

Each router device may send/broadcast an advertisement message that includes the path cost to one or more other router devices in the network 260. The router devices that receive the path cost information from the router device that sent the advertisement message may update their respective path cost information in their local router tables (e.g., by adding their link cost for communications with the router device that sent the advertisement message to the path cost in the received message). Each router device may use the locally-stored path cost information to identify the path through with digital messages may be communicated. Each router device may update their respective locally-stored router table with the lowest calculated path cost for communicating with the other router devices in the network 260.

Through periodically updating the link quality (e.g., LQI and/or LQO), link cost, and/or path cost, and communicating the path cost to other router devices in periodic advertisement messages, each router device may have up-to-date path cost information for communicating digital messages to other router devices in the network 260. The router device may use the best communication path (e.g., lowest cost path) for communicating digital messages to another device. This routing mechanism may allow router devices to detect when other router devices have dropped off the network 260, or a path cost between routers has changed, and calculate the next lowest cost path to maintain connectivity to other router devices in the network 260.

As described herein, the network 260 may allow for communication between devices in a load control system (e.g., the load control system 200 shown in FIG. 2A). The end devices 266a, 266b may include load control devices (e.g., control-target devices) and/or input devices (e.g., control-source devices) that communicate with other devices in the load control system. For example, the end device 266a may communicate with another end device in the load control system via RF communications.

Referring to FIG. 2B, the remote control device 232 may operate as an end device for communicating digital messages comprising indications of user input and/or control instructions for controlling another end device (e.g., the lighting control devices of the lighting fixtures 210a-210d). The remote control device 232 may communicate via one or more intermediary parent devices, such as a leader device and/or a router device, for example. The leader device and/or the router device may communicate with one or more other leader devices and/or router devices in the network to route the messages to the other end device (e.g., the lighting control devices of the lighting fixtures 210a-210d) for performing load control.

The control device beacon messages described herein as being transmitted from control devices may be advertisement messages that may indicate the presence of a control device on the network. The control device beacon messages may include a unique identifier of the control device (e.g., a network identifier) that is transmitted in the advertisement message and/or network information, such as link quality or link cost of communications between devices in the network. Other devices (e.g., other control devices, a mobile device, a system controller, etc.) may receive and track the advertisement messages transmitted by the control devices in the control device beacons to determine the presence of the control device on the network and/or whether the control device is able to communicate via the network.

Figure 3:
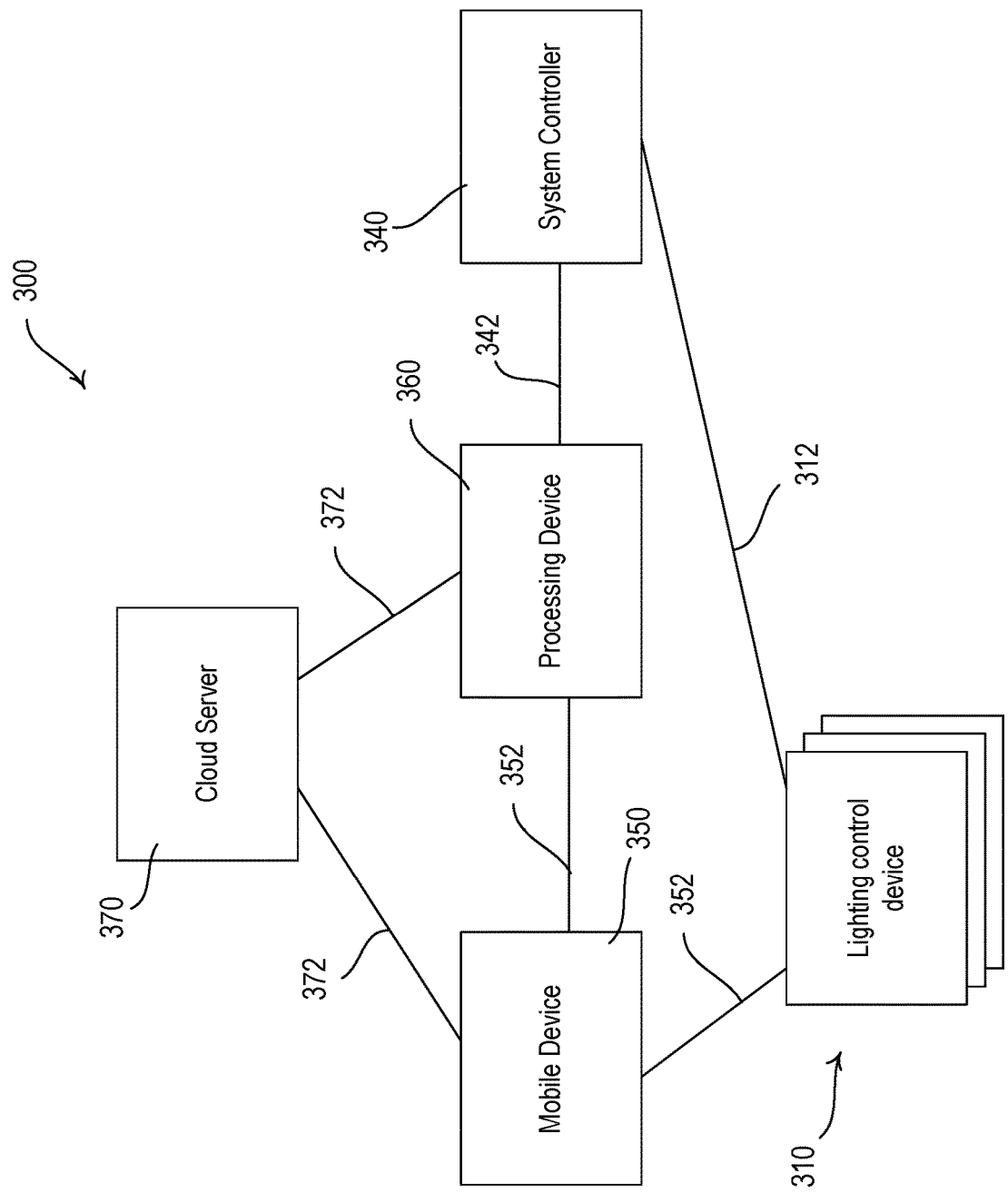
FIG. 3 is a system diagram illustrating a representative control system for configuring and/or controlling one or more control devices using beacon messages.

FIG. 3 is a system diagram illustrating an example control system 300 (e.g., the load control system 100 shown in FIG. 1 and/or the load control system 200 shown in FIG. 2). As shown in FIG. 3, the control system 300 may include load control devices, such as lighting control devices 310 (e.g., the lighting control device 114 of the lighting fixtures 110, the lighting control devices 124a-124c of the lighting fixtures 120a-120c, the controllable light source 122 of the lighting fixture, and/or the lighting control devices of the lighting fixtures 210a-210d, 220a-220d), for being commissioned. The lighting control devices 310 may be commissioned by configuring the lighting control devices 310 for lighting control. The lighting control devices 310 may be configured for lighting control by being claimed, assigned to different fixtures, groups, zones and/or locations in configuration data of the control system 300 and/or joined to a communication link 312, such as a wireless communication network. The lighting control devices 310 may be configured by defining preset scenes or other lighting control parameters by which the lighting control devices 310 may be controlled.

The control system 300 may include a system controller 340 (e.g., the system controller 140). The system controller 340 may be in communication with the lighting control devices 310 via the communication link 312 for performing lighting control according to lighting control configuration information that may be previously stored thereon (e.g., on the system controller 340) during operation. The lighting control configuration information may include preset configurations, zone configurations, occupancy configurations, and/or timing schedule configurations for controlling the lighting control devices 310.

The lighting control configuration information may be generated by a network device, such as a processing device 360 (e.g., a personal computer or a laptop). The processing device 360 may be a network device on which design software may be executed for configuring (e.g., claiming, diagnostics, association, etc.) and/or controlling the design of the load control system within a load control environment. The processing device 360 may generate a control database including the lighting control configuration information (e.g., load control parameters) based on the floorplan and design of the lighting control system. The processing device 360 may generate a project code identifier for identifying the project within which the floorplan and/or control database for controlling devices in the floorplan are stored. The lighting control configuration information of the control database may be stored at the lighting fixtures 310 or at the system controller 340 for enabling lighting control according to the information. The processing device 360 may be in communication with the system controller 340 via a communication link 342. The communication link 342 may be a wired or wireless communication link, such as an Ethernet link and/or a local network HTTPS communication link, for example.

The system controller 340 may send the lighting control configuration information to the lighting control devices 310 and/or control the lighting control devices 310 according to the lighting control configuration information. The system controller 340 may communicate with the lighting control devices 310 via the communication link 312 (e.g., the wireless communication network). The communication link 312 may include RF communication signals communicated via one or more protocols (e.g., a standard network communication protocol, a proprietary communication protocol, and/or any suitable communication protocol as previously mentioned). The communication link 312 may also include a wired network communication link.

After generating the lighting control configuration information at the processing device 360, the processing device 360 may share the lighting control configuration information with other devices for being updated and/or to assist in commissioning of the control system 300. For example, the processing device 360 may store the lighting control configuration information on a remote data source, such as a cloud server 370, for access by other devices. The processing device 360 may communicate with the cloud server 370 via a communication link 372. The communication link 372 may enable communications via wired and/or wireless signals. The lighting control configuration information may be stored at the processing device 360 and/or the cloud server 370 with a project identifier for being differentiated from other projects.

The control system 300 may include a network device, such as a mobile device 350 (e.g., a smart phone or a tablet), which may be implemented to claim (e.g., discover) control devices (e.g., the lighting control devices 310) for commissioning the control system 300. The mobile device 350 may allow a user to access a control database for a project in the control system 300 and discover the lighting control devices 310 for being configured for the project. The lighting control devices 310 may be discovered by the mobile device 350 via a wireless communication link 352 (e.g., a short-range wireless communication link). The wireless communication link 352 may allow for the communication of beacon messages or other short-range RF communications. The wireless communication link 352 may comprise RF signals that are communicated using a short-range communication protocol (e.g., BLE) communication protocol.

The mobile device 350 may access the lighting control configuration information of the control database from the cloud server 370 and/or from the processing device 360. The mobile device 350 may be in communication with the cloud server 370 via the communication link 372. The mobile device 350 may be in communication with the processing device 360 via a wireless communication link 352. The mobile device 350 may also, or alternatively, access the lighting control configuration information of the control database via a direct wired connection, such as a universal serial bus (USB) cable, and/or a computer-readable medium, such as a USB drive or other external memory.

The mobile device 350 may execute an application locally thereon to assist in commissioning the control system 300. The user may select a button on the application to synchronize the lighting control configuration information in the application with the lighting control configuration information stored for a project in the cloud server 370. A user of the mobile device 350 may access area and zone information in the lighting control configuration information for assigning lighting control devices 310 that have been discovered.

As the lighting control devices 310 are assigned to fixtures, groups, zones, and/or locations at the mobile device 350, the lighting control configuration information may be updated and sent to the cloud server 370. For example, the lighting control device identifiers and/or beacon message identifiers of each lighting control device 310 may be stored with an associated area, zone and/or position within a zone for being controlled accordingly. The lighting control configuration information may then be accessed by the processing device 360 for being sent to the system controller 340 and/or the lighting control devices 310 for enabling lighting control according to the updated assignments.

Figure 4:
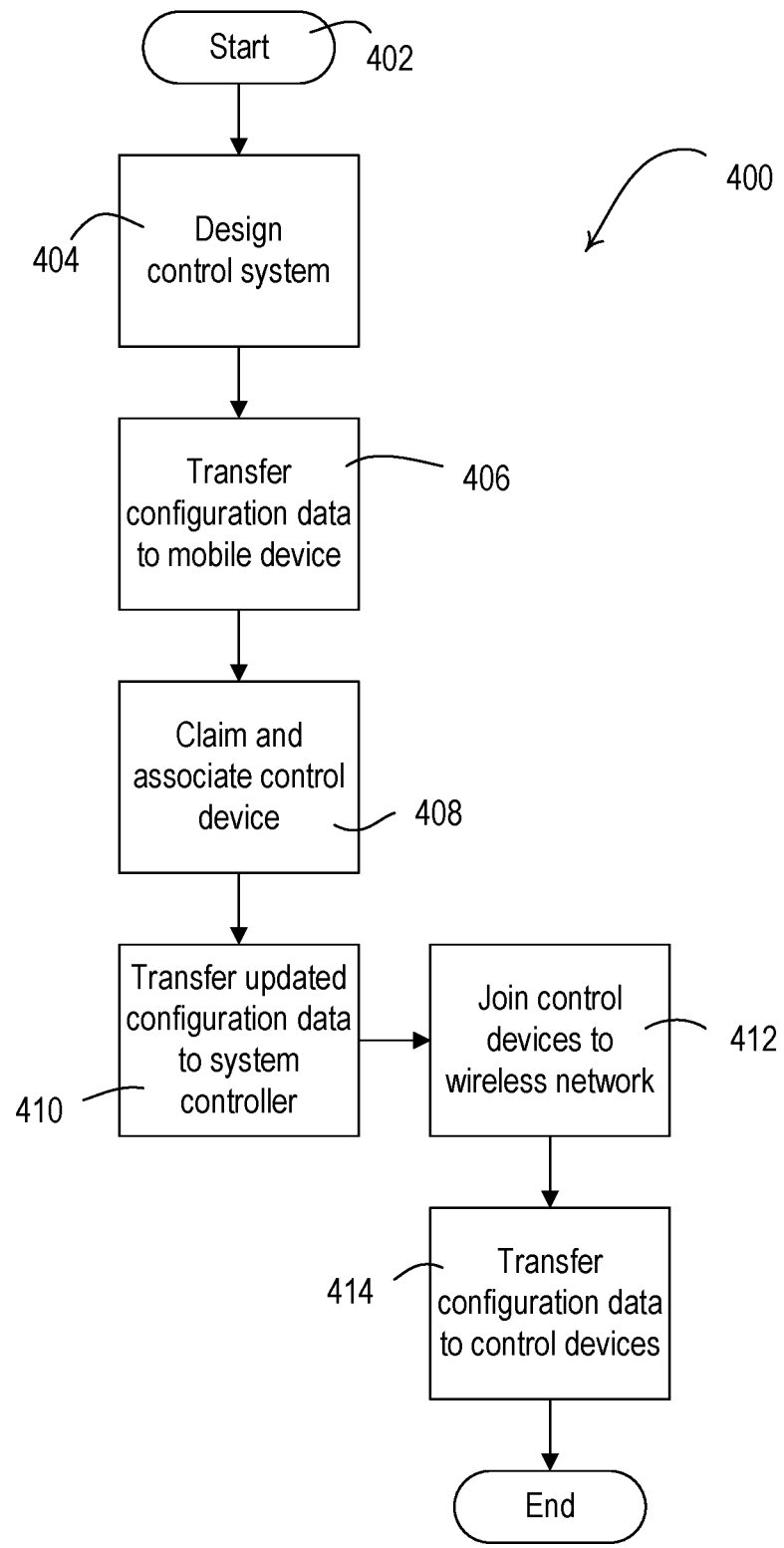
FIG. 4 is a flowchart depicting an example procedure (e.g., a commissioning procedure) for commissioning a control system.

FIG. 4 is a flowchart depicting an example procedure 400 (e.g., a commissioning procedure) for commissioning a control system, such as a load control system (e.g., the load control system 100). The procedure 400 may be implemented by one or more devices. For example, the procedure 400 may be implemented by a system controller (e.g., the system controller 140, 240, 340), a cloud server (e.g., the cloud server 170, 370), and/or a network device, such as a mobile device (e.g., the mobile device 150, 250, 350) and/or a processing device (e.g., such as the processing device 160, 360). The procedure 400 may begin at 402.

At 404, the load control system may be designed (e.g., as part of a design procedure). For example, the load control system may be designed using a design software running on the processing device. The design software may be configured to generate configuration data that may define the operation and/or functionality of the load control system. The configuration data may be stored in a configuration database (e.g., on the processing device, the cloud server, the mobile device, and/or the system controller). The processing device may store the configuration data (e.g., the configuration database) in a project (e.g., which may include other identifying information of a building in which the load control system may be installed). The configuration data may include representations of the control devices (e.g., lighting fixtures, occupancy sensors, remote control devices, etc.) in the load control system, as well as configuration identifiers (e.g., fixtures, groups, zones, areas, and/or location identifiers) of the control devices. For example, the configuration data may define functionality of the control devices (e.g., how lighting fixtures respond to the occupancy sensors and/or the remote-control devices). The configuration data may define lighting control configuration information including control parameters that may be stored in the control devices and/or the system controller (e.g., as will be described below at 414). The control parameters may be used by the control devices and/or system controller to control electrical loads during normal operation (e.g., after the procedure 400 is complete).

At 406, the configuration data (e.g., all or portions of the configuration database) may be transferred from the processing device to the mobile device (e.g., as part of a configuration data transfer procedure). For example, the processing device may be configured to transfer the configuration data to the mobile device via the cloud server. When the configuration data is ready to be transferred (e.g., when the control devices of the control system are ready to be claimed and/or associated with configuration identifiers (e.g., zone or group identifiers for being joined to a network) of the configuration data, the processing device may transmit the configuration data to the cloud server via the Internet (e.g., via the communication link 372 using IP and/or HTTP communications). The processing device may display a project code (e.g., a code unique to the project of the load control system being commissioned). For example, the project code may comprise an alphanumeric sequence. A user may enter the project code into a configuration application running on the mobile device. The mobile device may transmit the project code to the cloud server, which may transmit the configuration data to the mobile device. In addition, the processing device may display a machine-readable code, such as a barcode and/or a quick response (QR) code, and the mobile device may scan the machine-readable code to determine the project code. When the processing device and/or the mobile device do not have Internet access, the configuration data may be transferred (e.g., directly transmitted) from the processing device to the mobile device via a direct wired connection, such as a universal serial bus (USB) cable, and/or a computer-readable medium, such as a USB drive or other external memory at 406. Further, the configuration data may be transmitted (e.g., directly transmitted) from the processing device to the mobile device via a short-range wireless communication link (e.g., via the communication link 352).

At 408, the control devices of the load control system may be claimed and/or associated with configuration identifiers of the configuration data (e.g., fixtures, groups, zones, areas, and/or locations that may be defined by the configuration data). For example, the mobile device may claim and/or associate the control devices with the configuration identifiers of the configuration data as part of a configuration procedure (e.g., a claiming procedure and/or an association procedure) at 408. For example, the mobile device may begin to transmit (e.g., periodically transmit) a mobile device beacon message via a short-range wireless communication link (e.g., via the communication link 352). The control devices that receive the mobile device beacon message and are within a discovery range of the mobile device may be configured to transmit a respective control device beacon message. The mobile device may receive control device beacon messages from multiple control devices and may choose a control device from which a control device beacon message was received to claim (e.g., the control device from which a control device beacon message was received with the strongest received signal strength indicator). The installer may choose the configuration identifier to which to associate the present control device from the mobile device to initiate claiming of the control device. The installer may move the mobile device around the building in which the load control system is installed to claim and associate each of the control devices. As each of the control devices are claimed, the control device that is being claimed may transmit a unique identifier (e.g., a serial number) to the mobile device, and the mobile device may store the unique identifier as well as information about the association between the configuration identifier and the control device in the configuration data. When the installer is done claiming control devices (e.g., the mobile device has claimed all or a portion of the control devices of the load control system), the configuration procedure may end.

Before being claimed at 408, the control devices may (e.g., continuously) listen for the mobile device beacon message on the short-range wireless communication link (e.g., the communication link 352). After being claimed at 408, the control devices may enter a joining mode. In the joining mode, the control devices may periodically switch between listening for the mobile device beacon message and listening for a request to join a wireless communication network (e.g., the communication link 312). Switching between listening for the mobile device beacon message and listening for the request to join the wireless communication network may allow the control devices to be ready to join the wireless communication network while still allowing the mobile device to connect to one or more of the control devices (e.g., to correct mistakes made while claiming a control device, or to unclaim a control device).

At 410, the configuration data (e.g., as updated during the configuration procedure of 408) may be transferred from the mobile device to the system controller. For example, the configuration data may be transferred from the mobile device to the system controller via the processing device. For example, the mobile device may be configured to transfer the configuration data to the processing device via the cloud server, via a direct wired connection, and/or via a short-range wireless communication link (e.g., as described above at 406). The processing device may then transmit the configuration data (e.g., all or a portion of the configuration database) to the system controller or another commissioner device (e.g., via the communication link 342). The commissioner device may be a device on a wireless communications network that is used to join other devices to the network. For example, the commissioner device may be a system controller, a lighting control device, a control-source device, etc. In addition, the mobile device may be configured to transmit the configuration data to the system controller via the cloud server (e.g., without transmitting the configuration data to the processing device). Further, the mobile device may be configured to transmit (e.g., directly transmit) the configuration data to the system controller via a direct wired connection and/or via a short-range wireless communication link.

The configuration data may include device identification data received from control devices, such as lighting fixtures. The system controller or other commissioner device may receive the device identification data of multiple devices. For example, multiple devices may have participated in the claiming procedure performed at 408. For each device that participated in the claiming procedure, the network device may transfer device identification data to the system controller or other commissioner device. The device identification data for each device may be transferred separately (e.g., not at the same time). The system controller or other commissioner device may indicate to a user (e.g., via an application executing on a separate computing device) how many devices have been claimed for being joined to the network and/or how many devices remain to be claimed for being joined to the network. For example, the network device may display a list of each control device in the area (e.g., in textual or graphic form). The color of a lighting fixture may change once the system controller or other commissioner device has received device identification data for that lighting fixture. The system controller or other commissioner device may aggregate the device identification data received from the devices and may generate a single list of lighting fixtures.

The system controller or other commissioner device may be operating in an offline mode (e.g., the commissioner device may be disconnected from the Internet or otherwise unable to access a particular online service used during commissioning). The network device may transfer the device identification data to the system controller or other commissioner device (e.g., directly to the commissioner device) via, for example, an RF signal, a USB transfer, and/or the like. In addition, the network device may transfer the device identification data to the system controller or other commissioner device via a processing device. The network device may be physically connected to the processing device (e.g., via USB). For example, the network device and the processing device may be connected by a cord with USB connectors at either end. The network device may transfer the device identification data to the processing device via the physical connection. The network device may be physically connected to the system controller or other commissioner device via a wired digital communication link (e.g., via an Ethernet link). The processing device may transfer the device identification data to the system controller or other commissioner device via the wired digital communication link. The network device may transfer the device identification data by transferring (e.g., copying) the device identification data to an external drive (e.g., a removable memory). The external drive may be connected to the processing device and the processing device may transfer (e.g., copy) the device identification data from the external drive to local memory. The processing device may store the device identification data in memory. The processing device may then transfer the device identification data to the commissioner device via the wired digital communication link. The commissioner device may also store the device identification data in memory.

At 412, the control devices that were claimed at 408 may be joined to a wireless communication network (e.g., the communication link 312). The system controller may operate as a commissioner device for joining the control devices to the wireless communication network. After the control devices are joined to the wireless communication network, the control devices may communicate with each other via the wireless communication network during normal operation. In addition, the control devices may stop monitoring the network on which the mobile device beacon message was received, and may communicate on the wireless communication network (e.g., exclusively). At 414, the configuration data may be transferred to the control devices. For example, the system controller may transmit a portion of the configuration database that is relevant to a respective control device to that control device.

Figure 5:
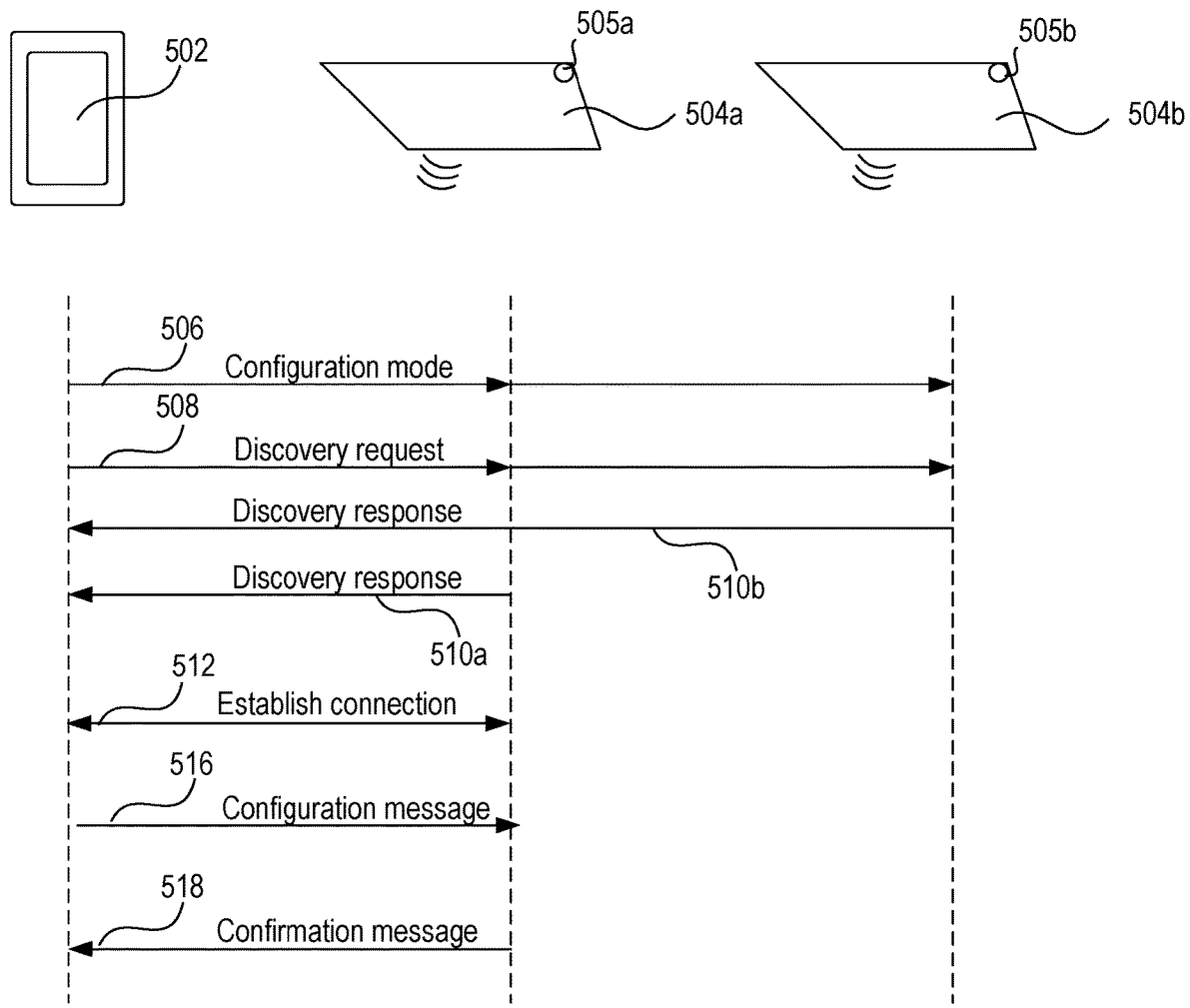
FIG. 5 is a system flow diagram depicting example message flows for discovering control devices for enabling claiming and/or association of control devices.

FIG. 5 is a system flow diagram depicting example message flows for discovering control devices in a load control system. For example, a control device may be discovered for enabling configuration (e.g., claiming, diagnostics, association, etc.) and/or control of the control device. For example, the system flow diagrams depicted in FIG. 5 may depict RF messages communicated between control devices that are performing the procedure 400 shown in FIG. 4. As shown in FIG. 5, a network device (e.g., a mobile device) may communicate with one or more control devices (e.g., lighting control devices) directly. For example, the network device and the control devices via a wireless connection. Alternatively, the network device may communicate with the control devices via a system controller. For example, the network device may communicate with the system controller via a wireless connection, and the system controller may communicate with the control devices via a wired connection. Though lighting control devices are shown in FIG. 5, other control devices may be used.

For example, a control device may be discovered for enabling configuration (e.g., claiming, diagnostics, association, etc.) and/or control of the control device. As shown in FIG. 5, the load control system may include a mobile device 502 and lighting fixtures 504*a*, 504*b*. The lighting fixtures 504*a*, 504*b* may include respective load control devices configured to control respective lighting loads. The lighting control devices in the lighting fixtures 504*a*, 504*b* may be RF-capable devices that include a communication circuit capable of communicating messages via RF signals. The sensors 505*a*, 505*b* may be occupancy sensors, visible light sensors (e.g., cameras), daylight sensors, optical sensors, and/or any other type of sensor.

As shown in FIG. 5, the mobile device 502 may transmit a configuration mode message 506 to the lighting fixtures 504*a*, 504*b*. The configuration mode message 506 may indicate that the lighting control devices of the lighting fixtures 504*a*, 504*b* should enter a configuration mode (e.g., a claiming mode and/or an association mode). The configuration mode message 506 may be transmitted via RF communication signals (e.g., using a short-range wireless communication protocol) and/or optical signals. The configuration mode message 506 may be sent as a multicast message (e.g., a beacon message) that is received by the lighting control devices of the lighting fixtures 504*a*, 504*b*. The lighting fixtures 504*a*, 504*b* may enter the configuration mode without receiving the configuration mode message 506.

After transmitting the configuration mode message 506, the mobile device 502 may perform discovery of the lighting control devices in the lighting fixtures 504*a*, 504*b*. The lighting control devices in the lighting fixtures 504*a*, 504*b* may be discovered by the mobile device sending a discovery request message 508. The discovery request message 508 may be transmitted to identify the lighting control devices are selected to be claimed for joining the network. The discovery request message 508 may include a discovery threshold and the lighting control devices of the lighting fixtures 504*a*, 504*b* may determine that they within a discovery range of the mobile device 502 by determining if the received signal strength indicator (RSSI) of the received discovery request message 508 is greater than or equal to a discovery threshold (e.g., the discovery threshold included in the received discovery request message 508).

The discovery request message 508 may be transmitted in an RF signal, such as an RF beacon message transmitted from the mobile device 502. The lighting control device 504*a* and/or the lighting control device 504*b* may provide a first feedback type that indicates the lighting control device has received and/or the discovery request message 508. The feedback may be provided by flashing a lighting load on and off, increasing and/or decreasing the intensity level of the lighting load, increasing and/or decreasing the color temperature of the lighting load, illuminating the lighting load a predefined color (e.g., orange), illuminating the lighting load a predefined color temperature, and/or providing other visual feedback to the user.

The mobile device 502 may receive discovery response messages 510*a*, 510*b* from the lighting control devices of the lighting fixtures 504*a*, 504*b*. The lighting control devices in the lighting fixtures 504*a*, 504*b* may transmit discovery response messages 510*a*, 510*b* as respective beacon messages for being discovered at the mobile device 502 (e.g., in response to entering the configuration mode). The mobile device 502 may determine the signal strengths at which the different discovery response messages 510*a*, 510*b* are received to determine the lighting control device associated with the strongest beacon message.

Based on the discovery response messages 510*a*, 510*b*, the mobile device 502 may determine which of the lighting control devices in the lighting fixtures 504*a*, 504*b* is selected for being claimed for joining the network. The discovery response messages 510*a*, 510*b* that are associated with the strongest signal strength may be selected for being claimed to join the network.

As shown in FIG. 5, the mobile device 502 may determine that lighting control device of the lighting fixture 504*a* is receiving the discovery request message 508 at the highest signal strength, or that the mobile device 502 is receiving the beacon message signals from the lighting control device of the lighting fixture 504*a* at the highest signal strength. The mobile device 502 may select lighting control device 504*a* for configuration (e.g., claiming and/or association). The mobile device 502 may establish a connection 512 (e.g., a two-way connection) with the lighting control device of the lighting fixture 504*a*. The connection may be a BLE connection. The connection 512 may be established by the mobile device 502 and the lighting control device of the lighting fixture 504*a* exchanging credentials to create a secure connection for enabling secure communications using the credentials. The connection message 512 may indicate to the lighting control device of the lighting fixture 504*a* that the lighting control device is selected for configuration (e.g., claiming and/or association). Alternatively, the mobile device may communicate with the lighting fixture 504 without creating a connection.

The lighting control device 504*a* may provide a second feedback type that indicates the lighting control device 540*a* has been selected to be configured. For example, the lighting control device 504*a* may provide the second feedback type in response to the establishment of the connection 512 between the lighting control device 504*a* and the mobile device 502. The feedback may be provided by flashing a lighting load on and off, increasing and/or decreasing the intensity level of the lighting load, increasing and/or decreasing the color temperature of the lighting load, illuminating the lighting load a predefined color (e.g., blue), illuminating the lighting load a predefined color temperature, and/or providing other visual feedback to the user.

After establishing the connection 512 to lighting control device of the lighting fixture 504*a*, the mobile device 502 may associate the lighting fixture with configuration data. The mobile device may receive a confirmation that the lighting control device of the lighting fixture 504*a* received the connection message 512 and/or a unique identifier (e.g., a configuration identifier) selected for the lighting control device of the lighting fixture 504*a*. The mobile device 502 may associate the lighting control device of the lighting fixture 504*a* with the unique identifier, and may transmit a configuration message 516 to the lighting fixture 504a. The configuration message 516 may indicate that the lighting fixture 504a has been claimed and/or associated with the selected configuration identifier. The configuration message 516 may include, for example, an indication that the lighting control device 504a has been claimed, a unique identifier of the mobile device 502 (e.g., an application running on the mobile device 502), and/or other association information. The configuration message 516 may be used as part of a configuration procedure (e.g., a claiming procedure, an association procedure, a diagnostics procedure, etc.). A control message may also, or alternatively, be sent at 516 that includes control instructions for controlling the lighting control devices of the lighting fixtures. The mobile device 502 may receive a confirmation message 518 from the lighting control device 504a. For example, the confirmation message 518 may confirm that the lighting control device 504a has received the configuration message 516. The connection message 512, the configuration message 516, and/or the confirmation message 518 may be transmitted and/or received via RF communication signals.

The lighting control device 504a may provide a third feedback type that indicates the lighting control device has received the configuration message 516. The feedback may be provided by flashing a lighting load on and off, increasing and/or decreasing the intensity level of the lighting load, increasing and/or decreasing the color temperature of the lighting load, illuminating the lighting load a predefined color (e.g., green), illuminating the lighting load a predefined color temperature, and/or providing other visual feedback to the user.

Figure 6:
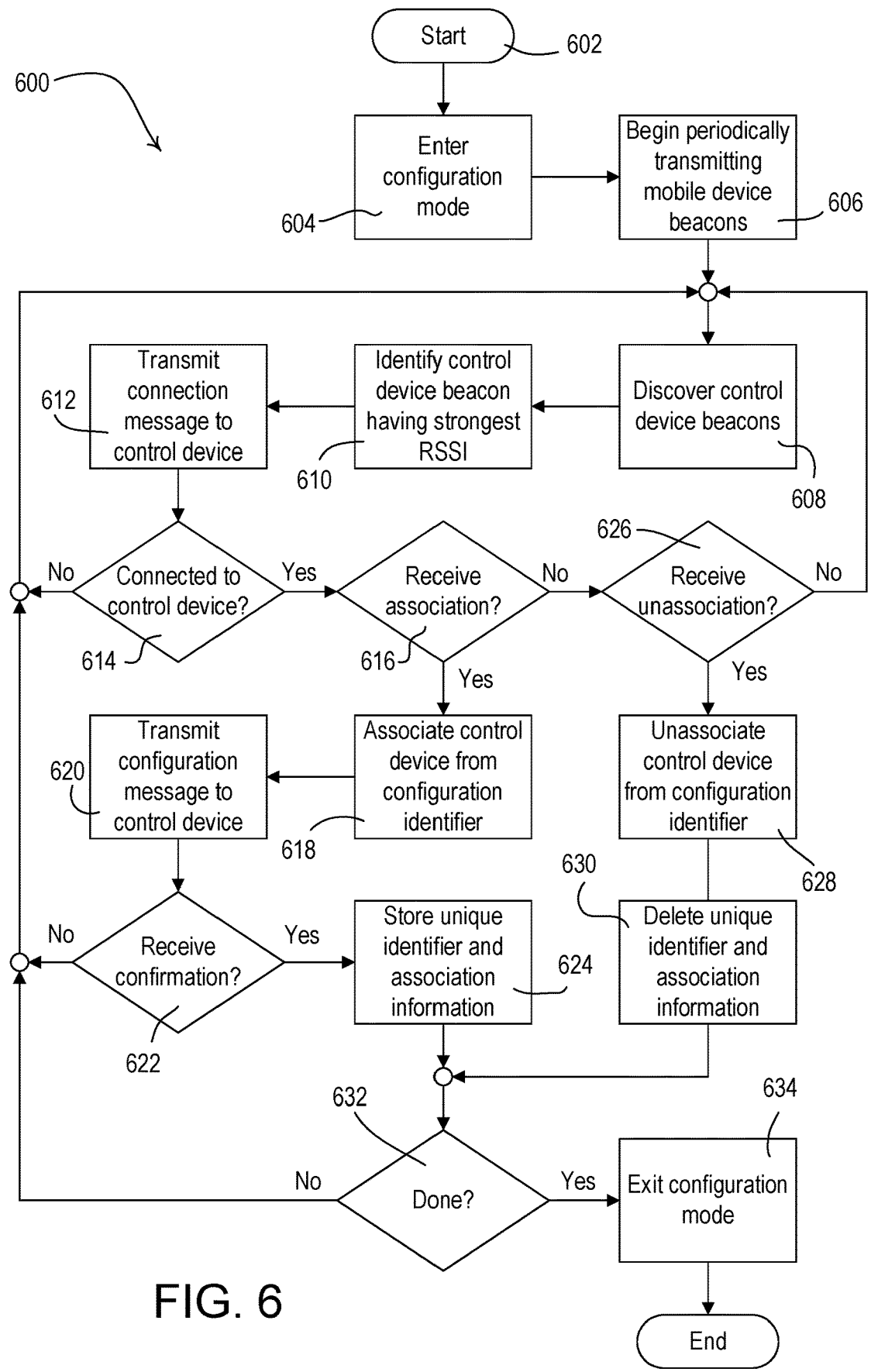
FIG. 6 is a flowchart depicting an example procedure for discovering control devices for enabling claiming and/or association of control devices.

FIG. 6 is a flowchart depicting an example procedure 600 for discovering control devices for enabling claiming and/or association of control devices. The procedure 600 may be executed as part of a configuration procedure (e.g., a claiming procedure and/or an association procedure). The procedure 600 may be implemented by one or more devices. For example, the procedure 600 may be executed by a mobile device (e.g., the mobile device 150, 250, 350) to claim control devices and/or associate control devices with configuration identifiers of configuration data of a load control system (e.g., as performed at 408 of the procedure 400). For example, the procedure 600 may be executed at 602 in response to the actuation of a button (e.g., a virtual or soft button) on a user interface (e.g., the user interface 500) of the mobile device.

At 604, the mobile device may enter a configuration mode (e.g., a claiming mode and/or an association mode). At 606, the mobile device may begin to periodically transmit beacon messages (e.g., mobile device beacon messages). The mobile device may be configured to transmit the mobile device beacon messages via a short-range wireless communication link. The mobile device beacon message may include, for example, a unique identifier that identifies the mobile device (e.g., or an application executed on the mobile device) and/or a discovery threshold. When one of the control devices receives the mobile device beacon message and the received signal strength indicator of the mobile device beacon message is greater than or equal to the discovery threshold included in the mobile device beacon message (e.g., the control device is within a discovery range of the mobile device), the control device may enter a configuration mode (e.g., a claiming mode and/or an association mode) and begin to transmit (e.g., periodically transmit) a beacon message (e.g., a control device beacon message). The mobile device may adjust the discovery threshold that is included in the mobile device beacon message to adjust the discovery range of the mobile device.

At 608, the mobile device may discover (e.g., receive) the control device beacon messages transmitted by the control devices in response to receiving the mobile device beacon message. Each control device beacon message may include the unique identifier of the control device that transmitted the respective beacon message. At 610, the mobile device may identify the control device beacon message that has the strongest received signal strength indicator (RSSI) of the received control device beacon messages. At 612, the mobile device may transmit a connection message to the control device that transmitted the control device beacon message identified at 610 (e.g., the control device beacon message having the strongest RSSI). For example, in response to the control device receiving the connection message from the mobile device, the mobile device and the control device may be configured to establish a connection (e.g., a two-way communication connection). In addition, the connection message may indicate to the control device that the control device has been selected for claiming. If the mobile device is not able to establish the connection at 614, the procedure 600 may loop to allow the mobile device to attempt to connect to the same control device or a different control device.

When the mobile device successfully establishes a connection with the control device at 614, the mobile device may determine if an instruction to associate the control device with one of the configuration identifiers of the configuration data has been received from a user via the user interface of the mobile device (e.g., the user interface 500) at 616. For example, the mobile device may receive a selection of a configuration identifier (e.g., a fixture, group, zone, area, and/or location that may be defined by configuration data) to associate with the control device with which the mobile device is connected. In addition, the mobile device may receive a selection of one or more other control devices (e.g., control-source devices to associate with a control-target device, or vice versa) to associate with the control device with which the mobile device is connected. When the mobile device receives an instruction to associate the control device with one of the configuration identifiers at 616, the mobile device may create an association between the control device and the selected configuration identifier of the configuration data at 618. To associate the control device with other control devices identified in the configuration identifiers, the mobile device may store the configuration identifier of the control device with the associated configuration identifiers in memory. The associated configuration identifiers may be sent to the control device over the connection from the mobile device for being stored at the control device. The associated configuration identifiers may be stored locally at the control device, such that the control device may send messages to and/or receive messages from the associated devices for enabling load control.

The mobile device may transmit a configuration message (e.g., a claiming message, an association message, a diagnostics message, etc.) to the control device to which the mobile device is connected at 620. The configuration message may indicate that the control device has been claimed and/or associated with the selected configuration identifier of the configuration data. In response to receiving the configuration message, the control device may transmit a confirmation message (e.g., a claim confirmation message) to the mobile device. The claim confirmation message may include a unique identifier (e.g., a serial number) of the control device from which the claim confirmation message is transmitted. Before sending the claiming message, the mobile device may check whether the control device has already been claimed. If the control device has already been claimed, the mobile device may prevent the transmission of an additional claiming message and proceed to 622.

If the mobile device does not receive a claim confirmation message from the control device at 622, the procedure 600 may loop to allow the mobile device to attempt to connect to the same control device or a different control device. The claim confirmation message may include a unique identifier (e.g., a serial number) of the control device. When the mobile device receives the claim confirmation message from the control device to which the mobile device is connected at 622, the mobile device may store the unique identifier of the control device and association information (e.g., the configuration identifier to which the control device as associated) in memory at 624. The unique identifiers that are stored during the claiming procedure may be the devices that may be joined to the network (e.g., individually or in a batch) during a joining procedure. The association information may be stored to identify the control devices associated with the control devices that are claimed for joining the network.

If the mobile device does not receive an instruction to associate the control device to which the mobile device is connected with one of the configuration identifiers at 616, but receives an instruction to unassociate the control device with an associated configuration identifier at 626, the mobile device may unassociate the control device with the associated configuration identifier at 628 and delete the unique identifier of the control device and association information from memory at 630. The mobile device may send a message to the control device(s) to remove the association from memory at the control device(s).

If the mobile device is not done claiming and/or associating control devices with configuration identifiers of the configuration data at 632, the procedure 600 may loop to allow the mobile device to attempt to connect to a different control device or the same control device (e.g., if the control device was just unclaimed and/or unassociated at 626). When the mobile device is done claiming and/or associating control devices at 632 (e.g., the user actuates a button on the user interface of the mobile device to end the configuration procedure), the mobile device may exit the configuration mode at 634, and the procedure 600 may end. In addition, the mobile device may stop periodically transmitting the mobile device beacon messages at 634.

Different types of feedback may be provided by the control devices to indicate different information to the user. For example, a lighting control device may provide a feedback type to indicate that the lighting control device has been discovered and/or selected for configuration and/or control (e.g., control devices transmitting beacon messages received by the mobile device above the discovery threshold). The lighting control devices selected for configuration and/or control may flash (e.g., with varying frequencies), increase/decrease the intensity level of the lighting load, increase/decrease the color temperature of the lighting load, illuminate the lighting load a predefined color or color temperature, and/or providing another visual feedback via the lighting load to the user.

The selected lighting control devices having the beacon message that is received at the mobile device with the strongest signal strength may provide a different feedback type. For example, the lighting control device that transmitted the control device the beacon message having strongest signal strength received by the mobile device may flash at a different rate than other control devices selected for configuration and/or control, increase/decrease the intensity level of the lighting load at a different rate than other control devices selected for configuration and/or control, increase/decrease the color temperature of the lighting load at a different rate than other control devices selected for configuration and/or control, illuminate the lighting load a different color or color temperature than other control devices selected for configuration and/or control, and/or provide other visual feedback that differentiates the lighting control device to the user.

After the lighting control device has been configured (e.g., assigned to an area and/or zone), the lighting control device may provide a different feedback type. For example, the lighting control devices that have been assigned to an area or a zone in the lighting control configuration information may flash at a different rate than the unassigned devices selected for configuration and/or control, increase/decrease the intensity level of the lighting load at a different rate than the unassigned devices selected for configuration and/or control, increase/decrease the color temperature of the lighting load at a different rate than the unassigned devices selected for configuration and/or control, illuminate the lighting load a different color or color temperature than the unassigned devices selected for configuration and/or control, and/or provide other visual feedback that differentiates the assigned lighting control devices to the user.

The feedback types may be preprogrammed at the lighting control devices and/or provided in a message to the lighting control devices. For example, the feedback types may be provided in the configuration message that a lighting control device has been selected for configuration and/or control and/or in another message to the lighting control devices from a device in the load control system.

Figure 7:
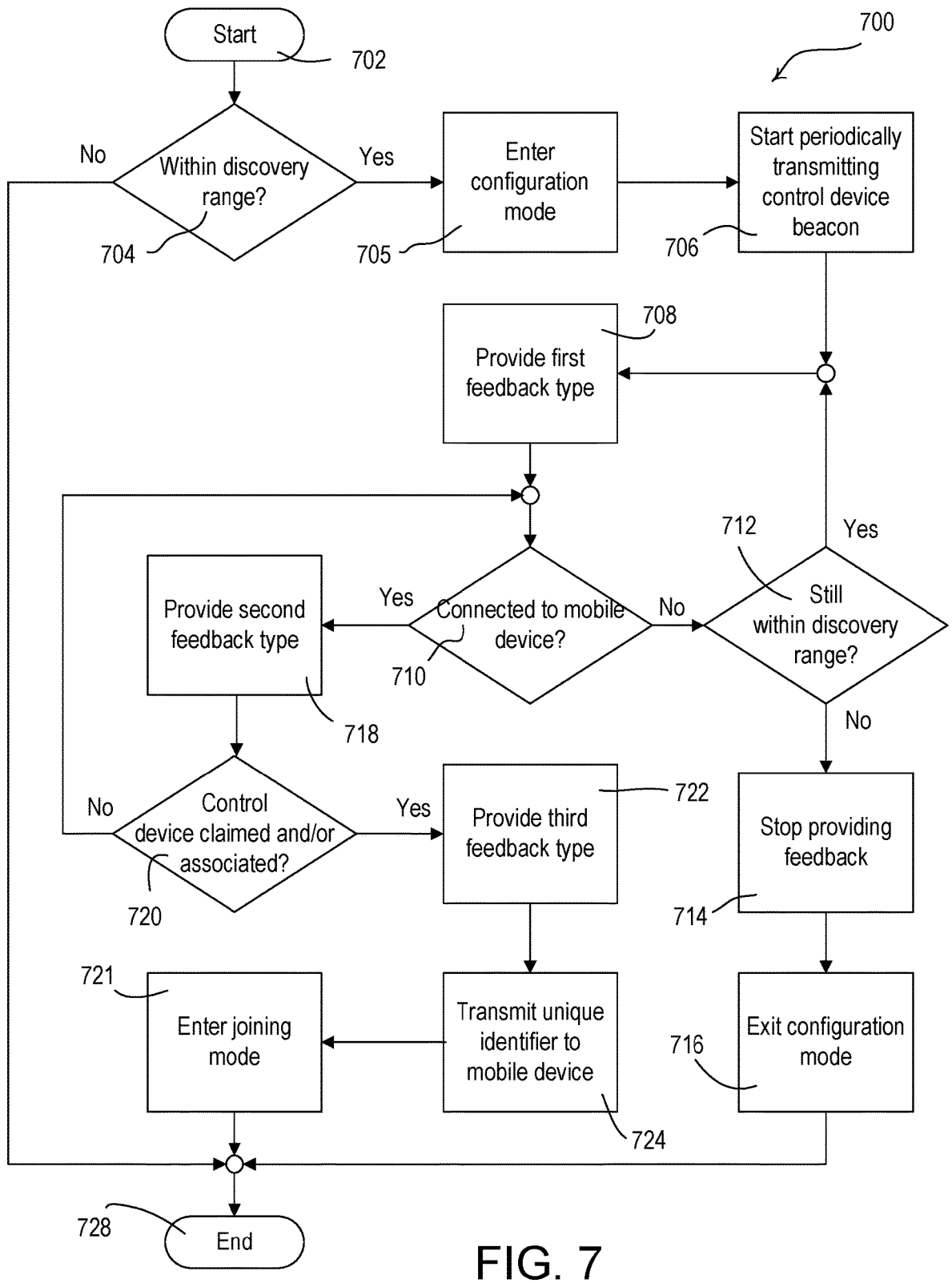
FIG. 7 is another flowchart depicting an example procedure for discovering control devices and providing feedback for enabling configuration and/or control using beacon messages.

FIG. 7 is a flowchart illustrating an example procedure 700 for configuring control devices of a load control system (e.g., the load control system 100 and/or the load control system 200 shown in FIG. 2A) for claiming and/or associating the control devices. The procedure 700 may be executed as part of a configuration procedure (e.g., a claiming procedure and/or an association procedure). The procedure 700 may be implemented by a control device (e.g., a lighting control device). However, other control devices may similarly perform one or more portions of the procedure 700. During the procedure 700, the lighting control device may provide different types of feedback. The procedure 700 may be executed when the lighting control device is not already in a configuration mode (e.g., the lighting control device did not enter a configuration mode and start periodically transmitting control device beacon messages at power up).

The procedure 700 may reduce RF traffic (e.g., RF transmissions) in an area. The RF traffic in an area (e.g., in a building in which the lighting control device is installed) may be generated by the control devices of the load control system as well as other devices in the area, such as other beaconing devices, wireless network access points, etc. The method 700 may be implemented, for example, when a network device, a mobile device, a system controller, and/or other control devices identify the number of control devices in the load control system is above a device count threshold (e.g., greater than 25, 50, 100, etc.). For example, if the number of control devices in the load control system is above the threshold, there may be a relatively high amount of RF traffic (e.g., interference) if the control devices transmit beacon messages simultaneously. Additionally, or alternatively, the procedure 700 may be implemented when network congestion is detected as exceeding a threshold at a device (e.g., a lighting control device, a system controller, a network device, a mobile device, etc.). The network congestion may exceed a threshold when the probability of a message reception has dropped below a reception probability threshold (e.g., the message may need to be retransmitted a number of times greater than a retransmission threshold, for example). The procedure 700 may reduce the amount of RF traffic present in the area in which the load control system is located, for example by reducing the number of control devices transmitting beacon messages at any given time, which may result in a lower incidence of collisions between transmissions and/or dropped messages. The identification of the likelihood of high RF traffic and/or network congestion may be provided manually by a user (e.g., using a user interface of the mobile device) and/or automatically by one or more of the control devices of the load control system (e.g., the system controller).

As shown in FIG. 7, the procedure 700 may begin at 702, for example, when the lighting control device receives a beacon message (e.g., a mobile device beacon message) from a network device, such as a mobile device (e.g., the mobile device 150, 250, 350). The mobile device beacon message may be transmitted in response to a configuration mode (e.g., a claiming mode and/or an association mode) being entered at the mobile device (e.g., in response to a selection of a button on an application at the mobile device). The mobile device beacon message may be transmitted periodically while the mobile device is in the configuration mode. The mobile device beacon message may include a beacon message identifier of the mobile device. For example, the beacon message identifier may be unique identifier that identifies the mobile device (e.g., or an application executed on the mobile device) and/or a non-unique identifier, such as an identifier of a group, area, building, load control system, and/or manufacturer of the mobile device and/or the control devices of the load control system. The beacon message identifier may be an identifier of an application running on the mobile device. The mobile device beacon message may be transmitted via RF communication signals (e.g., using a short-range wireless communication protocol). The mobile device may determine a received signal strength indicator (e.g., RSSI) of the received network device beacon message (e.g., the signal strength at which the network device beacon message is received). The received signal strength indicator of the mobile device beacon message may be compared to a discovery threshold (e.g., a discovery threshold). The discovery threshold may be received in the mobile device beacon message and/or preconfigured at the lighting control device. The discovery threshold may be configured by a user of the mobile device, preconfigured on the mobile device and/or the lighting control device, and/or configured by a network (e.g., received from the system controller).

At 704, a determination may be made as to whether the lighting control device is within a discovery range of the mobile device. For example, the lighting control device may determine that the lighting control device is within the discovery range of the mobile device by determining if the received signal strength indicator (RSSI) of the received mobile device beacon message is greater than or equal to a discovery threshold (e.g., the discovery threshold included in the received mobile device beacon message). If the lighting control device determines that the lighting control device is within the discovery range of the mobile device at 704, the lighting control device may enter a configuration mode (e.g., a claiming mode and/or an association mode) at 705. In addition, the lighting control device may enter (e.g., only enter) the configuration mode if the beacon message identifier of the received mobile device beacon message is a particular (e.g., predetermined) beacon message identifier. The configuration mode may be a mode in which the mobile device may store associations of the unique identifiers of the lighting control devices and configuration identifiers of the configuration data (e.g., locally and/or at the system controller). The stored associations may enable identification of associated control devices for performing load control or otherwise responding to messages from associated devices during normal operation. For example, entering the configuration mode may be triggered in response to the mobile device beacon message received by the lighting control device. If the lighting control device determines that the lighting control device is not within the discovery range of the mobile device at 704, the procedure 700 may end at 728.

The mobile device beacon message may operate as a triggering event for triggering a lighting control device to transmit a beacon message (e.g., a control device beacon message). At 706, the lighting control device may start to periodically transmit the control device beacon message. The control device beacon message may include a beacon message identifier of the lighting control device and/or a device type. For example, the beacon message identifier of the control device may be a unique identifier that identifies the lighting control device and/or a non-unique identifier, such as an identifier of a group, area, building, load control system, and/or manufacturer of the mobile device and/or the control devices of the load control system 100. The control device beacon message may be communicated in response to receiving a mobile device beacon message having a received signal strength indicator (RSSI) greater than the discovery threshold and/or the beacon message identifier of the received mobile device beacon message is a particular (e.g., predetermined) beacon message identifier.

The lighting control device may provide a first feedback type, at 708, that indicates the lighting control device has entered the configuration mode. The first feedback type may be provided by flashing a lighting load on and off, increasing and/or decreasing the intensity level of the lighting load, increasing and/or decreasing the color temperature of the lighting load, illuminating the lighting load a predefined color (e.g., orange), illuminating the lighting load a predefined color temperature, and/or providing other visual feedback to the user. The lighting control device may stop providing the first feedback type when the lighting control device falls outside of the discovery range of the mobile device (e.g., after a timeout period from when the lighting control device falls outside of the wireless range of the mobile device). The lighting control device may resume providing the first feedback type if the lighting control device comes within the discovery range of the mobile device again (e.g., after a timeout period from when the lighting control device falls outside of the discovery range).

A determination may be made, at 710, as to whether the lighting control device is connected to the mobile device or not. For example, the lighting control device may determine if the control device beacon message transmitted by the lighting control device has been received at the mobile device with the strongest received signal strength indicator (RSSI) of the lighting control devices that are in the configuration mode (e.g., those lighting control devices that have not yet been claimed). For example, a message may be received by the lighting control device that indicates the control device beacon message has been received by the mobile device with the strongest RSSI of the control devices in the configuration mode. For example, the message may be a connection message initiating the establishment of a connection (e.g., a two-way communication connection) between the mobile device and the lighting control device.

If the lighting control device did not receive a connection message (e.g., the beacon message control signal of the lighting control device has not been received with the strongest received signal strength indicator) at 710, the lighting control device may determine if the lighting control device is still within the discovery range of the mobile device (e.g., still receiving the mobile device beacon messages) at 712. If the lighting control device is still within the discovery range of the mobile device at 712, the lighting control device may continue to provide the first feedback type again at 708. If the lighting control device is no longer within the discovery range at 712, the lighting control device may stop providing feedback (e.g., the first feedback type) at 714, exit the configuration mode at 716, and the procedure 700 may end at 728. In addition, the control device may stop periodically transmitting the control device beacon messages at 714.

When the lighting control device is connected to the mobile device (e.g., in response to the control device beacon message of the lighting control device being received with the strongest received signal strength indicator of the lighting control devices in the configuration mode) at 712, the lighting control device may provide a second feedback type at 718. The second feedback type may differentiate the lighting control device from the other lighting control devices providing the first feedback type. For example, the second feedback type may be provided by flashing a lighting load on and off, increasing and/or decreasing the intensity level of the lighting load, increasing and/or decreasing the color temperature of the lighting load, illuminating the lighting load at a predefined color (e.g., blue), illuminating the lighting load at a predefined color temperature, and/or providing other visual feedback to the user that is different from the first feedback type.

In an example, the lighting control devices that are in the configuration mode may illuminate each corresponding lighting load the color orange to indicate the lighting control devices are in the configuration mode, and the lighting control device that transmitted the control device beacon message received by the mobile device with the strongest received signal strength indicator may illuminate a corresponding lighting load the color blue. The blue lighting load may indicate to the user the lighting control device that is selected for claiming and/or association. The blue lighting load may indicate to the user the lighting control device of the discovered the lighting control devices that is most likely the closest in proximity to the mobile device. The orange lighting loads may indicate to the user those lighting loads that are within the discovery range of the mobile device and/or are in the configuration mode. In addition, the orange lighting loads may indicate to the user those lighting control devices and/or lighting loads that are operating properly.

A lighting control device (e.g., a single lighting control device) in the discovered group of devices may provide the second feedback type at a given time. As the user walks around with the mobile device, a control device beacon message of another lighting control device may be received with a stronger received signal strength indicator. The mobile device may communicate one or more messages configured to cause the lighting load providing the second feedback type to change. The mobile device may cause a different lighting load to provide the second feedback type by transmitting a message (e.g., a connection message) that has the identifier of the updated lighting control device from which the strongest control device beacon message is being received. The mobile device may break the two-way communication connection with the lighting control device that is currently providing the second feedback type, and that lighting control device may stop providing the second feedback type. The lighting control device may revert back to providing the first feedback type, or stop providing feedback altogether (e.g., if the lighting control device fails to receive a mobile device beacon message from the mobile device within a predefined period of time). Accordingly, if the lighting control device determines that the beacon message control signal of the lighting control device was not received with the strongest received signal strength indicator at 710, the lighting control device may provide the first feedback type again at 708 if the lighting control device is still within the discovery range of the mobile device at 712.

After providing the second feedback type at 718, a determination may be made, at 720, as to whether the lighting control device has been claimed and/or assigned to a configuration identifier of the configuration data. For example, the lighting control device may receive a message (e.g., a claiming message) that indicates the lighting control device has been claimed. In addition, the message may indicate that the lighting control device has been assigned to a configuration identifier. The configuration identifier may be a fixture, group, zone, area, and/or location that may be defined by the configuration data (e.g., lighting control configuration information) generated by the design software. The configuration identifier may represent a fixture, group, and/or zone at a physical location within a building and may be indicated on a floorplan. The message may be transmitted by the mobile device. The message may include the configuration identifier of the fixture, group, and/or zone, such that the lighting control message may be responsive to messages configured to control devices in the fixture, group, and/or zone.

If the lighting control device has not been claimed and/or assigned to a configuration identifier at 720, the lighting control device may continue to provide the second feedback type at 718 if the beacon message control signal of the lighting control device is still received by the mobile device with the strongest received signal strength indicator at 710. However, if the lighting control device determines that the beacon message control signal of the lighting control device is no longer received with the strongest received signal strength indicator at 710, the lighting control device may then provide the first feedback type again at 708 if the lighting control device is still within the discovery range of the mobile device at 712.

When the lighting control device has been claimed and/or assigned to a configuration identifier at 720, the lighting control device may provide a third feedback type at 722. The third feedback type may differentiate the lighting control device from the other control devices in the configuration mode providing the first feedback type and/or the second feedback type. For example, the third feedback type may be provided by flashing a lighting load on and off, increasing and/or decreasing the intensity level of the lighting load, increasing and/or decreasing the color temperature of the lighting load, illuminating the lighting load at a predefined color (e.g., green), illuminating the lighting load at a predefined color temperature, and/or providing other visual feedback to the user that is different from the first feedback type and/or second feedback type.

In an example, the lighting control devices that are within discovery range of the mobile device (e.g., are in the configuration mode) may illuminate each corresponding lighting load the color orange to indicate the lighting control devices that are within discovery range of the mobile device (e.g., are within the discovery range of the mobile device) (e.g., that are not claimed and do not have the control device beacon message signal received strongest by the mobile device). The lighting control device that has the control device beacon message received by the mobile device with the strongest received signal strength indicator (e.g., and is unclaimed) may illuminate a corresponding lighting load the color blue, and the lighting control devices that have been claimed may illuminate a corresponding lighting load the color green. The green lighting load may indicate to the user the lighting control devices that have already been claimed and/or assigned to a configuration identifier. Lighting control devices claimed and assigned to different fixtures, groups, and/or zones may provide different types of feedback (e.g., illuminate lighting loads different colors, flash differently, illuminate lighting loads different color temperatures or dimming levels, etc.).

The third feedback type may also, or alternatively, be provided in response to other configuration information for configuring (e.g., claiming, diagnostics, association, etc.) and/or controlling the lighting control device. For example, the third feedback type may be provided after the lighting control device is configured with scenes, dimming levels, and/or other lighting control information to complete configuration (e.g., claiming, diagnostics, association, etc.) and/or control of the lighting control device. After providing the third feedback type at 722, the lighting control device may transmit a message (e.g., a claim confirmation message) that includes a unique identifier (e.g., a serial number) of the lighting control device at 724. The lighting control device may then enter a joining mode at 726. In the joining mode, the lighting control device may stop transmitting (e.g., periodically transmitting) the control device beacon message continuously via the short-range wireless communication link, and may periodically switch between transmitting the control device beacon message and listening for a request to join a wireless communication network (e.g., as performed at 412 of the procedure 400). The procedure 700 may end at 728.

The first feedback type, second feedback type, and/or third feedback type may be provided by a lighting control device while the lighting control device is in the configuration mode (e.g., receives the mobile device beacon message at or above the discovery threshold). When the mobile device moves away from the lighting control device, such that the received signal strength indicator of the mobile device beacon message is below the discovery threshold, the lighting control device may stop providing feedback.

If a lighting control device is removed from a prior assignment or the claimed status of the lighting control device is removed, the lighting control device may stop providing the third feedback type. The lighting control device may revert back to the first feedback type and/or the second feedback type when the lighting control device is in the configuration mode. The lighting control devices may stop providing feedback when the lighting control are outside of the discovery range of the mobile device (e.g., do not receive the mobile device beacon message at or above the discovery threshold). The lighting control devices may automatically exit the configuration mode and/or stop providing feedback when the lighting control devices fail to receive a mobile device beacon message from the mobile device within a timeout period (e.g., indicating that the mobile device may be out of the discovery range). The lighting control devices may also, or alternatively, exit the configuration mode and/or stop providing feedback when the lighting control device receives a message from the mobile device and determines from the received signal strength indicator of the mobile device beacon message is less than the discovery threshold, and/or an indication in a message that the lighting device is outside of the discovery range (e.g., while the lighting control device is within the wireless range of communications from the mobile device). Though the procedure 700 may be described with reference to lighting control devices, other types of control devices may be similarly implemented.

A load control system (e.g., the load control system 100 shown in FIG. 1) may include a relatively high number of control devices (e.g., more than 50 or more than 100), one or more of which may communicate on a network (e.g., the network 260). For example, as described herein, the control devices may transmit control device beacon messages periodically, which may increase congestion on the network as the number of control devices is increased. In addition to the control device beacon messages, control devices may communicate other types of messages in the network for controlling electrical loads within the load control system. As the number of control devices in the load control system increases, the amount of wireless (e.g., RF) traffic in the network environment may increase proportionally. As the amount of RF traffic in the network environment increases, dropped messages and/or collisions between messages may occur, which may result in increased latency and/or decreased reliability. One or more procedures may be used to reduce the amount of RF traffic in the network environment.

In order to reduce the amount of RF traffic in the network environment, procedures may be implemented to reduce the number of messages transmitted in the network environment. Periodic message transmissions (e.g., control device beacon messages or other periodic messages) may be limited to help reduce network congestion even more than aperiodic messages (e.g., messages transmitted in response to actuations on control devices). The mobile device may transmit (e.g., continuously or periodically transmit) a mobile device beacon message to trigger the transmission of messages from control devices in the network. The mobile device beacon message may include a discovery threshold (e.g., a discovery threshold). If a given control device receives the mobile device beacon at a signal strength (e.g., received signal strength indicator) above the discovery threshold, the control device may transmit one or more messages. For example, the control device may receive the mobile device beacon signal above the discovery threshold and respond by transmitting (e.g., periodically transmitting) control device beacon messages. Though control device beacon messages may be described herein as being transmitted in response to the mobile device beacon message, other types of message transmissions may be similarly controlled as described herein.

If the discovery threshold in the mobile device beacon message is too low, a relatively large number of control devices may transmit respective control device beacon messages, which may result in increased latency and/or decreased reliability. As described herein, the mobile device may receive the control device beacon messages being triggered at the control devices by the mobile device beacon messages. If the mobile device receives a relatively large amount of control device beacon messages from other control devices, collisions may occur and the mobile device may not receive the control device beacon messages from some of the control devices. If the mobile device is not able to receive the control device beacon messages from some of the control devices (e.g., due to collisions), the mobile device may be unable to discover some of the control device even though the control device may be located close to the mobile device. Conversely, if the discovery threshold is too high, too few control devices may transmit control device beacon messages in response to the mobile device beacon message.

The received signal strength of RF communications, such as the mobile device beacon messages, may be variable due to one or more factors and/or environmental conditions, such as the mobile device's physical location and/or orientation (e.g., relative to each control device), the geometry of the area in which the mobile device and/or the control devices are located, physical properties of the mobile device and/or the control devices, wireless interference from other devices in the area, etc. Since the received signal strength of the RF communication may be variable, the number of control devices that receive the mobile device beacon message above the discovery threshold may be variable. Accordingly, the number of control devices that receive the mobile device beacon message above the discovery threshold (e.g., the number of discovered control devices) may be affected by these factors and/or environmental conditions. In an example, a mobile device that has a more powerful transceiver or antenna with greater RF transmission capabilities may discover more control devices above the same discovery threshold than a mobile device that has a less powerful transceiver or antenna with lower RF transmission capabilities. Further, the number of discovered control devices may change as the mobile device moves around the area.

To control the number of control devices that are discovered by the mobile device discovery beacon, the mobile device may adjust (e.g., periodically adjust) the discovery threshold included in the mobile device beacon message. The mobile device may monitor (e.g., periodically) the number of control device beacon messages that are received in response to the mobile device discovery beacon message and adjust the discovery threshold such that the number of discovered control devices at any given time is within a target range. For example, the mobile device may adjust the discovery threshold such that the number of discovered control devices is between a low-side threshold $TH_{LOW}$ and a high-side threshold $TH_{HI}$ (e.g., between 15 and 25 devices). The amount by which the discovery threshold is adjusted may depend on the number of discovered control devices. For example, the mobile device may adjust the discovery threshold by a smaller amount when the number of discovered devices is closer to the target range (e.g., between 1 and 14 or 26 and 40), and adjust the discovery threshold by a greater amount when the number of discovered control devices is farther away from the target range (e.g., less than 1 or more than 40).

Once the number of discovered control devices is within the range defined by the low-side threshold $TH_{LOW}$ and the high-side threshold $TH_{HI}$, the mobile device may select one or more of the control devices for configuration (e.g., claiming, association, etc.) and/or control. After the selected control device has completed configuration and/or control, the control device may continue to transmit its control device beacon. The mobile device may continue to count the control device in the number of discovered control devices, and may maintain the discovery threshold at the same level. Alternatively, the mobile device may determine that the control device has completed configuration and/or control and may remove the control device from the number of discovered control devices. The mobile device may then increase the discovery threshold such that the number of discovered control devices is again within the range defined by the low-side threshold $TH_{LOW}$ and the high-side threshold $TH_{HI}$. In addition, the control device may stop transmitting its control device beacon. If this causes the number of control device beacons received by the mobile device (e.g., the number of discovered control devices) to drop below the low-side threshold $TH_{LOW}$, the mobile device may increase the discovery threshold.

FIG. 8A is a flowchart depicting an example procedure 800 for discovering when a control device in a load control system (e.g., the load control system 100) is within a discovery range. The procedure 800 may be executed as part of a configuration procedure (e.g., a claiming procedure, an association procedure, or other configuration procedure). The procedure 800 may be implemented by a control device (e.g., a lighting control device or another control device) for determining whether the control device is within a discovery range of a mobile device. Though a control device may be provided as an example device for determining if the control device is within the discovery range of the mobile device, the mobile device may similarly perform one or more portions of the procedure 800. For example, the mobile device may determine whether the control devices are within the discovery range.

The procedure 800 may begin at 802. The procedure 800 may be executed periodically. For example, the control device may transmit its control device beacon message at a given rate (e.g., a transmission rate), and the procedure 800 may be executed at approximately the same rate. Thus, the time between successive executions of the procedure 800 may be approximately the same as the transmission period of the control device beacon message. At 804, the control device may receive a mobile device beacon message from the mobile device. The mobile device beacon message may be transmitted in response to the mobile device entering a configuration mode (e.g., a claiming mode, an association mode, or another configuration mode), for example, in response to a selection of a button on an application at the mobile device. The mobile device beacon message may be transmitted periodically while the mobile device is in the configuration mode. The mobile device beacon message may include a beacon message identifier of the mobile device and/or the discovery threshold. The beacon message identifier may be an identifier of an application running on the mobile device. The mobile device beacon message may be transmitted via RF communication signals using a short-range wireless communication protocol. The discovery threshold may define the discovery range.

At 806, the control device may determine whether it is within the discovery range of the mobile device. The control device may compare a received signal strength indicator at which the mobile device beacon message was received to the discovery threshold included in the mobile device beacon message. The control device may determine that it is within the discovery range when its received signal strength indicator is greater than the discovery threshold. If the received signal strength indicator at which the mobile device beacon message is received at the control device is lower than the discovery threshold, the control device may determine that it is outside of the discovery range. The control device may be configured to be within the discovery range or outside of the discovery range when the received signal strength indicator at which the mobile device beacon message was received is equal to the discovery threshold.

If the control device determines that it is within the discovery range at 806, the control device may set an IN_RANGE flag. For example, the control device may set the IN_RANGE flag to a value (e.g., 1, TRUE, or another value indicating that the control device is determined to be in the discovery range) indicating that the control device is within the discovery range at 808. The control device may check the value of the IN_RANGE flag before transmitting a control device beacon message in response to receiving the mobile device beacon message.

The control device may receive multiple mobile device beacon messages at 804 and fluctuate between determining at 806 that it is within the discovery range and outside of the discovery range over a period of time. This may occur more frequently for control devices that are on the edge of the discovery range (e.g., relatively close to the discovery threshold). This fluctuation may be caused by the variability in the RF communications on the network and may result in the mobile device having to update the number of discovered control devices more frequently. To prevent a control device from fluctuating between identifying itself as being within the discovery range and outside of the discovery range over a period of time, the control device may start a timer (e.g., a discovery timer) after determining that the control device is within the discovery range at 806. The discovery timer may define a discovery period that expires when the timer reaches a predefined value (e.g., when the discovery period has ended). The discovery period may be a period of time (e.g., 2 seconds, 4 seconds, 8 seconds, etc.) that begins when the control device receives a mobile device beacon message at a received signal strength magnitude that is greater than the discovery threshold and allows the control device to continue to maintain its status as a discovered device (e.g., by maintaining the status of the IN-RANGE flag) for the discovery period.

If the control device determines that it is outside of the discovery range at 806, the control device may determine whether it was in the discovery range during the discovery period at 810. The control device may determine that it is within the discovery range during the discovery period if the control device has received a mobile device beacon message at a value greater than the discovery threshold within the discovery period. If the control device determines at 810 that it is outside of the discovery range included in the mobile device beacon message at 806 and is not within the discovery period (e.g., discovery timer has not been initiated or has expired), the control device may clear the IN_RANGE flag at 812. For example, the control device may clear the IN-RANGE flag from memory or set the IN_RANGE flag to a value indicating that the control device is outside of the discovery range (e.g., 0, FALSE, or another value indicating the control device is outside the discovery range) at 812. At 814, the control device may determine whether the IN_RANGE flag is set (e.g., whether the value of the IN_RANGE flag indicates that the control device is in the discovery range). If the control device determines that the IN_RANGE flag is set, the control device may transmit a control device beacon message at 816, and the procedure 800 may end at 818. If the IN_RANGE flag is not set, the procedure 800 may end at 818 (e.g., without the control device transmitting the control device beacon message).

A mobile device may send multiple successive mobile device beacon messages within a relatively short period of time. A control device that is on the edge of the discovery range (e.g., based on a discovery threshold included in the mobile device beacon messages) may receive some of the mobile device beacon messages at a received signal strength magnitude (e.g., RSSI) above the discovery threshold and some of the mobile device beacon messages at a received signal strength magnitude below the discovery threshold. Thus, the control device may rapidly alternate between entering a configuration mode and leaving the configuration mode. This may cause the control device to indicate to the user that it is in and out of the discovery range, e.g., by flashing and/or blinking at a given color, which may be visibly disruptive to a user. Because the mobile device may adjust the discovery threshold based on the number of control devices that are in the discovery range (e.g., in the configuration mode), having one or more control devices alternate in such a manner may cause the mobile device to make a relatively high amount of unnecessary adjustments.

Figure 8B:
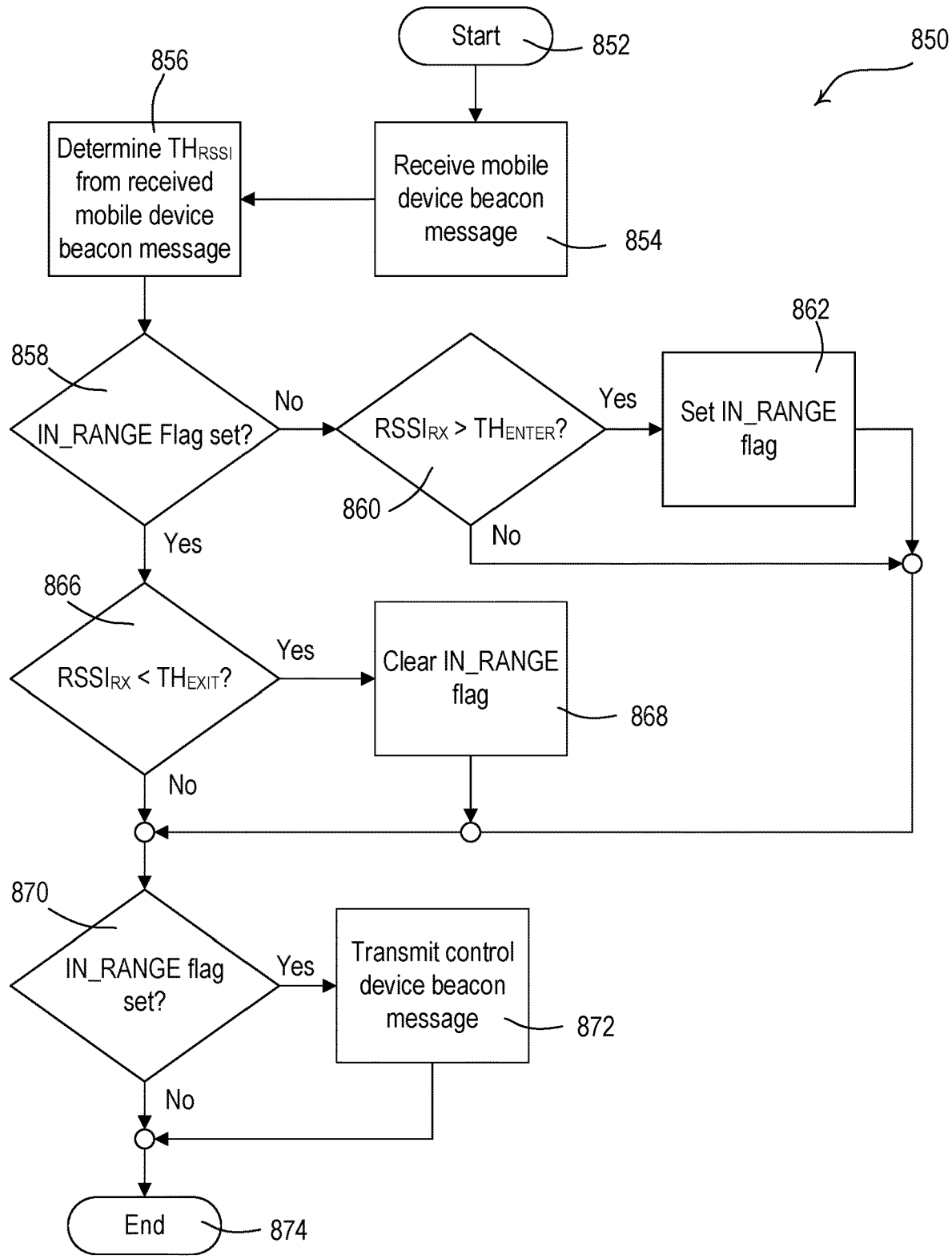
FIG. 8B is another flowchart depicting an example procedure for transmitting a control device beacon message for enabling configuration and/or control of a control device.

These situations may be avoided by implementing hysteresis with the discovery threshold $TH_{RSSI}$, which may make it more likely that a control device in a given state (e.g., in or out of the configuration mode) will remain in that state. The control device may implement hysteresis by using one or more threshold offsets (e.g., as shown in FIG. 8B) and/or a discovery period (e.g., as shown in FIG. 8A). The threshold offsets may be used to determine an updated discovery threshold (e.g., an increased or decreased discovery threshold). The threshold offsets and/or the discovery period may make it more likely that a control device that is in the configuration mode at a given time continues to be in the configuration mode for performing configuration, as the control device may be maintained in the configuration mode for a longer period of time after entering the configuration mode. The threshold offsets may also make it more likely that a control device that is outside of the discovery range for entering the configuration mode continues to be outside of the discovery range.

FIG. 8B is a flowchart depicting an example procedure 850 for discovering that a control device in a load control system (e.g., the load control system 100) is within a discovery range. The procedure 850 may be executed as part of a configuration procedure (e.g., a claiming procedure, an association procedure, or other configuration procedure). The procedure 850 may be implemented by a control device (e.g., a lighting control device or another control device) for determining whether the control device is within a discovery range of a mobile device. Though a control device may be provided as an example device for determining if it is within the discovery range of the mobile device, the mobile device may similarly perform one or more portions of the procedure 850. For example, the mobile device may determine whether the control devices are within the discovery range.

The procedure 850 may begin at 852. The procedure 850 may be executed periodically or in response to another triggering event. For example, the control device may transmit its control device beacon message at a given rate (e.g., a transmission rate), and the procedure 850 may be executed at approximately the same rate. Thus, the time between successive executions of the procedure 850 may be approximately the same as the transmission period of the control device beacon message. The mobile device beacon message may be transmitted in response to the mobile device entering a configuration mode (e.g., a claiming mode, an association mode, or another configuration mode), for example, in response to a selection of a button on an application at the mobile device. The mobile device beacon message may be transmitted periodically while the mobile device is in the configuration mode.

At 854, the control device may receive a mobile device beacon message from the mobile device. The mobile device beacon message may include indications of a beacon message identifier of the mobile device, one or more threshold offsets, and/or a discovery threshold $TH_{RSSI}$. The threshold offsets may be pre-stored in a memory of the control device. The beacon message identifier may be an identifier of an application running on the mobile device. The mobile device beacon message may be transmitted via RF communication signals using a short-range wireless communication protocol. The discovery threshold $TH_{RSSI}$ may define the discovery range.

At 856, the control device may determine the discovery threshold $TH_{RSSI}$ from the received mobile device beacon message. For example, the mobile device beacon message may include an indication of the discovery threshold $TH_{RSSI}$. The discovery threshold $TH_{RSSI}$ may have a value of approximately −60 dBm. At 858, the control device may determine whether an IN_RANGE flag is set. For example, the IN_RANGE flag may be set to a value (e.g., 1, TRUE, or another value indicating that the control device is determined to be in the discovery range) when the control device enters the discovery range (e.g., the control device enters a configuration mode). The control device may clear the IN_RANGE flag from memory or set the IN_RANGE flag to a value indicating that the control device is outside of the discovery range (e.g., 0, FALSE, or another value indicating the control device is outside the discovery range) when the control device leaves the discovery range (e.g., the control device leaves the configuration mode). For example, the control device may clear the IN_RANGE flag from memory or set the IN_RANGE flag to a value indicating that the control device is outside of the discovery range when a discovery period (e.g., 2, 4, or 8 seconds) has passed since the control device last received a mobile device beacon message at a signal strength above a discovery threshold.

If the control device determines at 858 that the IN_RANGE flag is not set (e.g., not previously set), the control device may determine whether it is within the discovery range at 860. The control device may implement hysteresis for entering and exiting the discovery range (e.g., the configuration mode) based on the discovery threshold $TH_{RSSI}$. For example, the discovery range may be based on a first threshold offset $TH_{OFFSET1}$ used for entering the discovery range (e.g., entering the configuration mode) that is different than a second threshold offset $TH_{OFFSET2}$ used for exiting the discovery range (e.g., exiting the configuration mode). The first threshold offset $TH_{OFFSET1}$ and the second threshold offset $TH_{OFFSET2}$ may have the same value or different values. For example, the first threshold offset $TH_{OFFSET1}$ and the second threshold offset $TH_{OFFSET2}$ may each have a value of 5 dBm. As shown in FIG. 8B, the control device may determine whether it is within the discovery range based on the discovery threshold $TH_{RSSI}$, a first threshold offset $TH_{OFFSET1}$, and a received signal strength indicator $RSSI_{RX}$ at which the control device received the mobile device beacon message. The control device may add the first threshold offset $TH_{OFFSET1}$ to the discovery threshold $TH_{RSSI}$ such that the discovery threshold $TH_{RSSI}$ is increased, e.g., to an enter discovery threshold $TH_{ENTER}$. Alternatively, the mobile device beacon message may include the discovery threshold $TH_{RSSI}$ and the enter discovery threshold $TH_{ENTER}$. The first threshold offset $TH_{OFFSET1}$ may cause the discovery threshold $TH_{RSSI}$ (e.g., the enter discovery threshold $TH_{ENTER}$) to be set to a stronger RSSI value than the second threshold offset $TH_{OFFSET2}$ for exiting the discovery range (e.g., exiting the configuration mode). For example, the discovery threshold $TH_{RSSI}$ may be approximately −60 dBm, the first offset $TH_{OFFSET1}$ may be 5 dBm, and the control device may add the two values to reach a value of −55 dBm for the enter discovery threshold $TH_{ENTER}$. The control device may compare the received signal strength indicator $RSSI_{RX}$ to the enter discovery threshold $TH_{ENTER}$ to determine whether the control device is in the discovery range and to determine whether the control device should enter the configuration mode. Using hysteresis may make it more likely that a control device on the edge of the discovery range will determine that it is outside of the discovery range for entering the configuration mode. This may help avoid a situation where the control device rapidly enters and leaves the configuration mode due to fluctuations in the received signals strength magnitude $RSSI_{RX}$ at which successive beacon messages are received.

If the control device determines that the received signal strength indicator $RSSI_{RX}$ is less than the enter discovery threshold $TH_{ENTER}$ (e.g., the control device is not in the discovery range) at 860, the procedure 850 may proceed to 870 (e.g., without setting the IN_RANGE flag). If the control device determines that the received signal strength indicator $RSSI_{RX}$ is greater than or equal to the enter discovery threshold $TH_{ENTER}$ (e.g., the control device is in the discovery range) at 860, the mobile device may set the IN_RANGE flag at 862. For example, the control device may set the IN_RANGE flag to a value (e.g., 1, TRUE, or another value indicating that the control device is determined to be in the discovery range) indicating that the control device is within the discovery range at 862. The control device may check the value of the IN_RANGE flag before transmitting a control device beacon message in response to receiving the mobile device beacon message. The procedure 850 may proceed to 870.

If the control device determines at 858 that the IN_RANGE flag is already set, the control device may determine whether it remains within the discovery range at 866. The control device may implement hysteresis for entering and exiting the discovery range (e.g., the configuration mode) based on the discovery threshold $TH_{RSSI}$. As shown in FIG. 8B, the control device may determine whether it remains within the discovery range based on the discovery threshold $TH_{RSSI}$, the second threshold offset $TH_{OFFSET2}$, and the received signal strength indicator $RSSI_{RX}$ at which the control device received the mobile device beacon message. The control device may subtract the second threshold offset $TH_{OFFSET2}$ from the discovery threshold $TH_{RSSI}$ such that the discovery threshold $TH_{RSSI}$ is decreased, e.g., to an exit discovery threshold $TH_{EXIT}$. Alternatively, the mobile device beacon message may include the discovery threshold $TH_{RSSI}$ and the exit discovery threshold $TH_{EXIT}$. For example, the discovery threshold $TH_{RSSI}$ may be approximately −60 dBm, the second threshold offset $TH_{OFFSET2}$ may be 5 dBm, and the control device may add the two values to reach a value of −65 dBm for the exit discovery threshold $TH_{EXIT}$. Though not shown in FIG. 8B, the control device may subtract the second threshold offset $TH_{OFFSET2}$, which may be less than the first threshold offset $TH_{OFFSET1}$, from the discovery threshold $TH_{RSSI}$ to establish a lower discovery threshold for exiting the configuration mode. The control device may compare the received signal strength indicator $RSSI_{RX}$ to the exit discovery threshold $TH_{EXIT}$ for exiting the configuration mode to determine whether the control device is still in the discovery range (e.g., whether the control device should leave the configuration mode). This may help avoid a situation where the control device rapidly enters and exits the configuration mode due to fluctuations in the received signal strength indicator $RSSI_{RX}$ at which successive beacon messages are received.

If the control device determines that the received signal strength indicator $RSSI_{RX}$ is greater than or equal to the exit discovery threshold $TH_{EXIT}$ (e.g., the control device is still in the discovery range) at 866, the procedure 850 may proceed to 870 (e.g., without clearing the IN_RANGE flag). If the control device determines that the received signal strength indicator $RSSI_{RX}$ is less than the exit discovery threshold $TH_{EXIT}$ (e.g., the control device is out of the discovery range) at 866, the mobile device may clear the IN_RANGE flag at 868. For example, the control device may clear the IN_RANGE flag from memory or set the IN_RANGE flag to a value indicating that the control device is outside of the discovery range (e.g., 0, FALSE, or another value indicating the control device is outside the discovery range) at 868. The control device may also determine whether a discovery period (e.g., 2, 4, or 8 seconds) has passed since the control device last received a mobile device beacon message at a signal strength above a discovery threshold. If the control device determines that the discovery period has passed, the control device may clear the IN_RANGE flag at 868.

The control device may check the value of the IN_RANGE flag before transmitting a control device beacon message in response to receiving the mobile device beacon message. At 870, the control device may determine whether the IN_RANGE flag is set (e.g., whether the value of the IN_RANGE flag indicates that the control device is in the discovery range). If the control device determines that the IN_RANGE flag is set or otherwise indicates that the control device is in the discovery range, the control device may transmit a control device beacon message at 872. The procedure 850 may end at 874. If the IN_RANGE flag is not set or otherwise indicates that the control device is outside the discovery range, the procedure 850 may end at 874. For example, the control device may fail to transmit the control device beacon message when outside of the discovery range.

Figure 9:
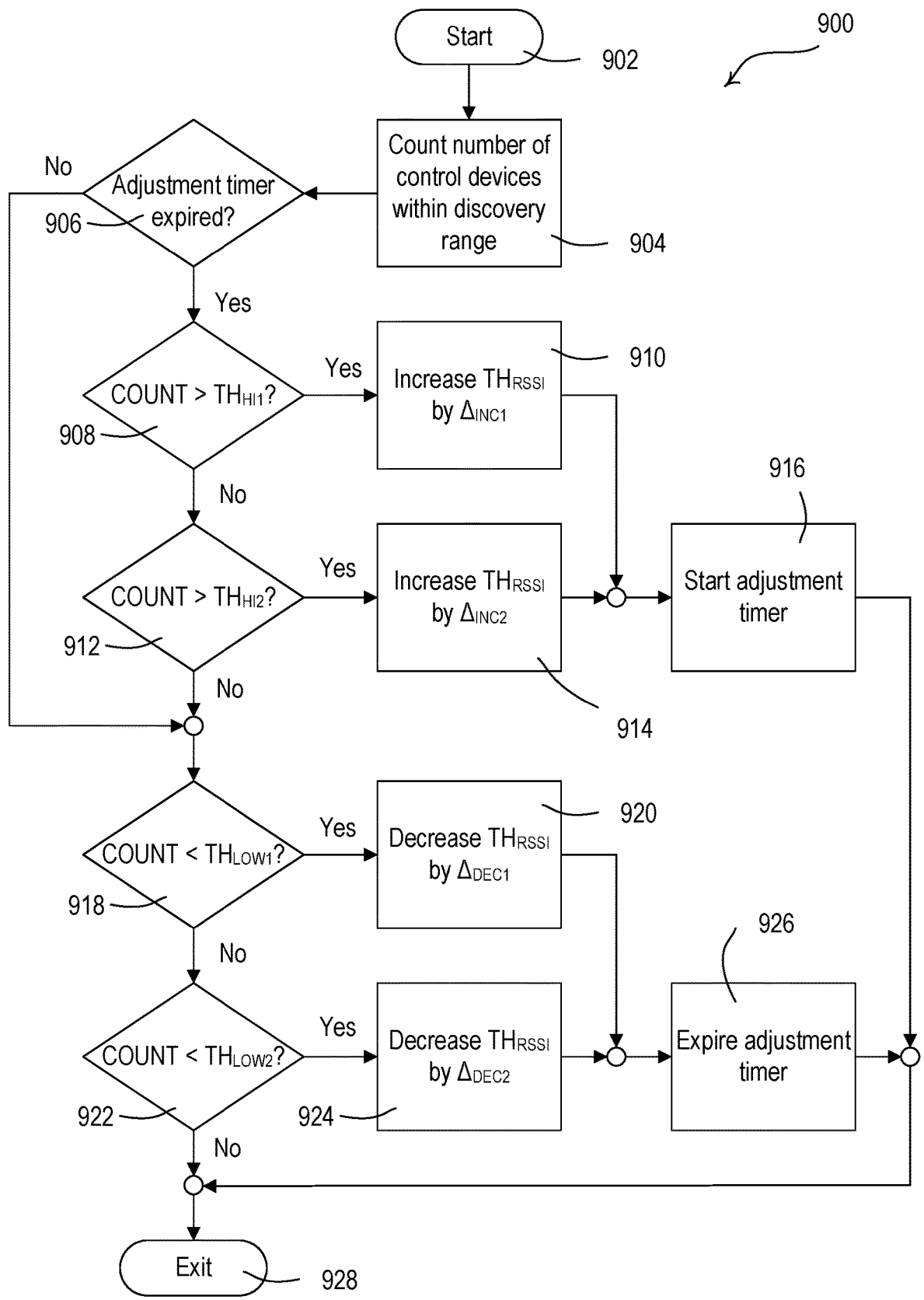
FIG. 9 is a flowchart depicting an example procedure for adjusting a discovery threshold for discovering control devices for enabling configuration and/or control of control devices.

FIG. 9 is a flowchart depicting an example procedure 900 for discovering control devices in a load control system (e.g., the load control system 100). The procedure 900 may be executed as part of a configuration procedure (e.g., a claiming procedure, an association procedure, or another configuration procedure). The procedure 900 may be implemented by a mobile device (e.g., a network device). For example, the procedure 900 may be performed periodically (e.g., every one second, ten seconds, one minute, etc.) by the mobile device to monitor the number of control devices that are transmitting a control device beacon message to allow for adjustment of the number of control devices that are transmitting control device beacon messages on the network. However, other control devices may similarly perform one or more portions of the procedure 900.

The procedure 900 may begin at 902. At 904, the mobile device may count a number of control devices that are within a discovery range of the mobile device (e.g., discovered control devices). The mobile device may transmit a mobile device beacon message and count the number of control devices that transmit control device beacon messages in response to the mobile device beacon message. For example, there may be one or more control devices in an area in which the mobile device is located. The mobile device may transmit a mobile device beacon message that includes a discovery threshold $TH_{RSSI}$. A control device may transmit its control device beacon message if the control device receives the mobile device beacon message at a signal strength value (e.g., having a received signal strength value) greater than the discovery threshold $TH_{RSSI}$ (e.g., as shown in FIG. 8A) and/or greater than the discovery threshold $TH_{RSSI}$ plus the first threshold offset $TH_{OFFSET1}$ (e.g., as shown in FIG. 8B). The mobile device may determine that a control device is within the discovery range if the mobile device receives a control device beacon message from that control device. Thus, the mobile device may count the number of discovered control devices by counting the number of control device beacon messages received by the mobile device within a given time period (e.g., approximately 4 seconds). For example, the mobile device may maintain a record (e.g., a log) of each control device beacon that it receives, along with accompanying information (e.g., an identifier of the control device from which the beacon was received and/or a time at which the beacon was received). The mobile device may count the number of discovered control devices by determining a number of unique control devices from which a beacon was received in the given time period.

As described herein, the control devices may receive the mobile device beacon message at a received signal strength magnitude that is greater than the discovery threshold $TH_{RSSI}$ and continue to transmit control device beacons for at least a discovery period. The control devices may continue to transmit the control device beacon messages for the discovery period even after determining that subsequently received mobile device beacon messages are less than the discovery threshold $TH_{RSSI}$ (e.g., as shown in FIG. 8A) and/or less than the discovery threshold $TH_{RSSI}$ minus the second threshold offset $TH_{OFFSET2}$ (e.g., as shown in FIG. 8B). To prevent too frequent adjustment of the discovery range the mobile device may await an expiration of an adjustment timer after the discovery threshold $TH_{RSSI}$ has been adjusted (e.g., increased) before adjusting (e.g., increasing) the discovery threshold $TH_{RSSI}$ again. The adjustment timer may have a value that is greater than the discovery period for the control devices to allow for control devices that are no longer within the discovery range to cease transmitting control device beacon messages. Using an adjustment timer may prevent the mobile device from adjusting (e.g., increasing) the discovery threshold $TH_{RSSI}$ too often and overcorrecting the discovery threshold $TH_{RSSI}$.

At 906, the mobile device may determine whether the adjustment timer has expired. If the mobile device determines that the adjustment timer has expired at 906, the mobile device may increase or decrease the discovery threshold $TH_{RSSI}$ based on the number of discovered control devices. If the mobile device determines that the adjustment timer has not expired at 906, the mobile device may decrease the discovery threshold $TH_{RSSI}$, but may not increase the discovery threshold $TH_{RSSI}$, based on the number of discovered control devices. For example, the mobile device may await the expiration of the adjustment timer at 906 for performing increases to the discovery threshold $TH_{RSSI}$ at 910, 914. As the discovery threshold $TH_{RSSI}$ is described herein by example as a received signal strength indicator value, an increase to the discovery threshold $TH_{RSSI}$ may reduce the number of control devices within the discovery range (e.g., as less control devices may receive the mobile device beacon message having received signal strength indicator values that exceed the increased discovery threshold $TH_{RSSI}$). As the increased discovery threshold $TH_{RSSI}$ may be used to reduce the number of control devices in the discovery range, the mobile device may await an expiration of the adjustment timer at 906 for adjusting the discovery threshold $TH_{RSSI}$ prior to attempting to reduce the number of control devices in the discovery range. The mobile device may await the period of the adjustment timer before attempting to make further reductions in the number of control devices in the discovery range to prevent decreases in the discovery range from occurring too often and potential overcorrections of the discovery threshold $TH_{RSSI}$.

The mobile device may not await the expiration of the adjustment timer at 906 for decreasing the discovery threshold $TH_{RSSI}$ at 920, 924. The mobile device may decrease the discovery threshold $TH_{RSSI}$ to increase the number of control devices in the discovery range without awaiting the expiration of the adjustment timer. Alternatively, the mobile device may determine whether the adjustment timer has expired before decreasing the discovery threshold $TH_{RSSI}$, and may refrain from decreasing the discovery threshold $TH_{RSSI}$ if the adjustment timer is unexpired.

The mobile device may adjust the discovery threshold $TH_{RSSI}$ by a smaller amount when the number of discovered devices is closer to the target range (e.g., either between 26 and 40 on the high-side or between 5 and 14 on the low-side), and adjust the discovery threshold $TH_{RSSI}$ by a greater amount when the number of discovered control devices is further from the target range (e.g., either more than 40 or less than 5). The amount of the adjustment to the discovery threshold $TH_{RSSI}$ may correspond to a threshold number of discovered control devices relative to the target range. For example, the mobile device may compare the number of discovered control devices to a first high-side threshold value $TH_{HI1}$ (e.g., 40 control devices) at 908. The first high-side threshold value $TH_{HI1}$ may be a high-side threshold value that is further from the target range (e.g., 15 to 25 control devices) than a second high-side threshold value $TH_{HI2}$ (e.g., 25 control devices). Though the first high-side threshold value $TH_{HI1}$ and the second high-side threshold value $TH_{HI2}$ are provided as examples, the mobile device may be configured with additional thresholds that range from a highest high-side threshold value to a lowest high-side threshold value that set the threshold number of discovered control devices for adjusting the discovery threshold $TH_{RSSI}$.

When the mobile device determines at 908 that the number of discovered control devices is greater than the first high-side threshold value $TH_{HI1}$, the mobile device may increase the discovery threshold $TH_{RSSI}$ by a first threshold increment $\Delta_{INC1}$ at 910 in an attempt to reduce the number of control devices within the discovery range. The first threshold increment $\Delta_{INC1}$ may be larger than a second threshold increment $\Delta_{INC2}$ in an attempt to reduce the number of control devices by a larger amount. For example, the first threshold increment $\Delta_{INC1}$ may be, for example, approximately 2 decibel-milliwatts (dBm), which may increase the received signal strength indicator value of the discovery threshold $TH_{RSSI}$ from −4 dBm to −2 dBm. The mobile device may then begin transmitting (e.g., periodically transmitting) mobile device beacon messages (e.g., one or more mobile device beacon messages) with the increased discovery threshold $TH_{RSSI}$.

If the mobile device determines that the number of discovered control devices is less than (or equal to) the first high-side threshold value $TH_{HI1}$ at 908, the mobile device may determine whether the number of discovered control devices is higher than the second high-side threshold value $TH_{HI2}$ at 912. The second high-side threshold value $TH_{HI2}$ may be less than the first high-side threshold value $TH_{HI1}$. If the mobile device determines that the number of discovered control devices is greater than the second high-side threshold value $TH_{HI2}$, the mobile device may increase the discovery threshold $TH_{RSSI}$ by the second threshold increment $\Delta_{INC2}$ at 914. The second threshold increment $\Delta_{INC2}$ may be lower than the first threshold increment $\Delta_{INC1}$, for example because the second high-side threshold value $TH_{HI2}$ is closer to the target range than the first high-side threshold value $TH_{HI1}$. For example, the second threshold increment $\Delta_{INC2}$ may be approximately 1 dBm, which may increase the received signal strength indicator value of the discovery threshold $TH_{RSSI}$ from −2 dBm to −1 dBm. The mobile device may then begin transmitting (e.g., periodically transmitting) mobile device beacon messages (e.g., one or more mobile device beacon messages) with the increased discovery threshold $TH_{RSSI}$.

If the mobile device increases the discovery threshold $TH_{RSSI}$ (e.g., at 910 or at 914), the mobile device may start the adjustment timer at 916. As described herein, the adjustment timer may be initialized to a value greater than the discovery period of the control devices. The adjustment timer may be initialized to a multiple of the discovery period of the control devices. For example, the adjustment timer may be initialized to a value of 8 seconds when the discovery period of the control devices is set to 4 seconds. After the mobile device starts the adjustment timer at 916, the procedure 900 may end at 928.

If the mobile device determines that the number of discovered control devices is less than (e.g., less than or equal to) the second high-side threshold value $TH_{HI2}$ at 912, the mobile device may determine whether to decrease the discovery threshold $TH_{RSSI}$. The mobile device may compare the number of discovered control devices to one or more low-side thresholds $TH_{LOW}$ to determine an amount to decrease the discovery threshold $TH_{RSSI}$. The mobile device may compare the number of discovered control devices to the first low-side threshold value $TH_{LOW1}$ (e.g., 1 control device) at 918. The first low-side threshold value $TH_{LOW1}$ may be the low-side threshold value that is further from the target range than a second low-side threshold value $TH_{LOW2}$ (e.g., 15 control devices). Though the first low-side threshold value $TH_{LOW1}$ and the second low-side threshold value $TH_{LOW2}$ are provided as examples, the mobile device may be configured with additional thresholds that range from a highest low-side threshold value to a lowest low-side threshold value that set the threshold number of discovered control devices for adjusting the discovery threshold $TH_{RSSI}$.

When the mobile device determines at 918 that the number of discovered control devices is less than the first low-side threshold value $TH_{LOW1}$, the mobile device may decrease the discovery threshold $TH_{RSSI}$ by a first threshold decrement $\Delta_{DEC1}$ at 920 in an attempt to increase the number of control devices within the discovery range. The first threshold decrement $\Delta_{DEC1}$ may be larger than a second threshold decrement $\Delta_{DEC2}$ in an attempt to increase the number of discovered control devices by a larger amount. For example, the first threshold decrement $\Delta_{DEC1}$ may be approximately 4 dBm, which may decrease the received signal strength indicator value of the discovery threshold $TH_{RSSI}$ from −2 dBm to −6 dBm. The mobile device may then begin transmitting (e.g., periodically transmitting) mobile device beacon messages (e.g., one or more mobile device beacon messages) with the decreased discovery threshold $TH_{RSSI}$.

If the mobile device determines that the number of discovered control devices is greater than (or equal to) the first low-side threshold value $TH_{LOW1}$ at 918, the mobile device may determine whether the number of discovered control devices is less than the second low-side threshold value $TH_{LOW2}$ at 922. The second low-side threshold value $TH_{LOW2}$ may be greater than the first low-side threshold value $TH_{LOW1}$ (e.g., closer to the target range). If the mobile device determines that the number of discovered control devices is less than the second low-side threshold value $TH_{LOW2}$, the mobile device may decrease the discovery threshold $TH_{RSSI}$ by the second threshold decrement $\Delta_{DEC2}$ at 924. The second threshold decrement $\Delta_{DEC2}$ may be less than the first threshold decrement $\Delta_{DEC1}$, for example because the second low-side threshold value $TH_{LOW2}$ is closer to the target range than the first low-side threshold value $TH_{LOW1}$. For example, the second threshold decrement $\Delta_{DEC2}$ may be approximately 2 dBm, which may decrease the received signal strength indicator value of the discovery threshold $TH_{RSSI}$ from −2 dBm to −4 dBm. The mobile device may then begin transmitting (e.g., periodically transmitting) mobile device beacon messages (e.g., one or more mobile device beacon messages) with the increased discovery threshold $TH_{RSSI}$.

If the mobile device decreases the discovery threshold $TH_{RSSI}$ (e.g., at 920 or at 924), the mobile device may expire the adjustment timer (e.g., stop and clear the adjustment timer as if it had expired) at 926. As described herein, by expiring the adjustment timer after decreasing the discovery threshold $TH_{RSSI}$, the mobile device may be able to immediately increase the discovery threshold $TH_{RSSI}$ (e.g., at 910 or at 914) the next time that the mobile device executes the procedure 900 (e.g., in case in case a slight decrease in the discovery threshold $TH_{RSSI}$ causes a dramatic increase in the number of discovered control devices). After the mobile device expires the adjustment timer at 926, the procedure 900 may end at 928.

Though examples are provided for the threshold values for the number of discovered control devices and the values for increasing or decreasing the discovery threshold, other values may be implemented. For example, the mobile device may adjust the discovery threshold by a greater amount (e.g. a percentage higher) when the count of the control devices in the discovery range is less than the target range compared to when the count of the control devices is greater than the target range. In an example, the discovery threshold may be increased by multiples of 2 dBm when the count of the control devices in the discovery range is less than the target range, while the discovery threshold may be decreased by multiples of 1 dBm when the count of the control devices in the discovery range is greater than the target range. This may assist in allowing a greater number of control devices to be capable of transmitting control device beacons on the network in an attempt to ensure at least a minimum level of communications on the network.

Figure 10:
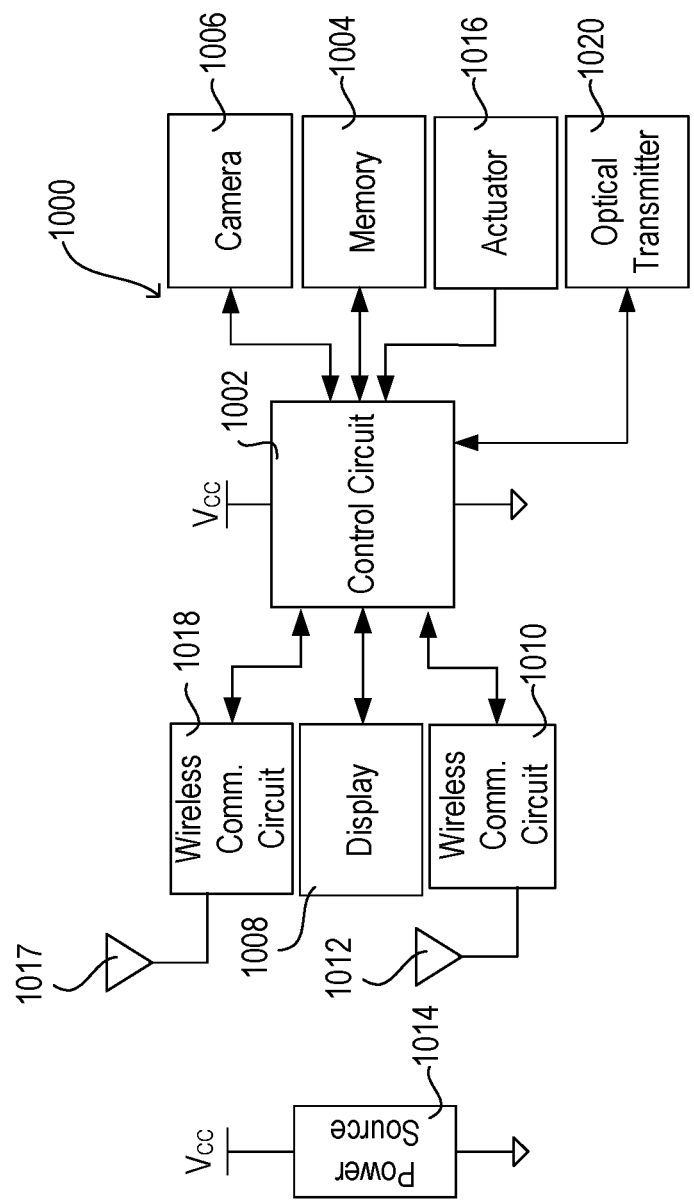
FIG. 10 is a block diagram illustrating an example network device as described herein.

FIG. 10 is a block diagram illustrating an example network device 1000 (e.g., a mobile device and/or a processing device) as described herein. The network device 1000 may include a control circuit 1002 for controlling the functionality of the network device 1000. The control circuit 1002 may include one or more general purpose processors, special purpose processors, conventional processors, digital signal processors (DSPs), microprocessors, integrated circuits, a programmable logic device (PLD), application specific integrated circuits (ASICs), and/or the like. The control circuit 1002 may perform signal coding, data processing, power control, image processing, input/output processing, and/or any other functionality that enables the network device 1000 to perform as described herein.

The control circuit 1002 may store information in and/or retrieve information from the memory 1004. The memory 1004 may include a non-removable memory and/or a removable memory. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory.

The network device 1000 may include a camera 1006 that may be in communication with the control circuit 1002. The camera may include a digital camera or other optical device capable of generating images or videos (e.g., image sequences) for being captured at the network device 1000 using visible light. The camera may include a light capable of flashing, modulating, or turning on/off in response to signals received from the control circuit.

The network device 1000 may include a wireless communication circuit 1010 for wirelessly transmitting and/or receiving information. For example, the wireless communications circuit 1010 may include an RF transceiver for transmitting and receiving RF communication signals via an antenna 1012, or other communications module capable of performing wireless communications. Wireless communications circuit 1010 may be in communication with the control circuit 1002 for communicating information to and/or from the control circuit 1002. For example, the wireless communication circuit 1010 may send information from the control circuit 1002 via network communication signals. The wireless communication circuit 1010 may send information to the control circuit 1002 that are received via network communication signals.

The network device 1000 may include a wireless communication circuit 1018 for wirelessly transmitting and/or receiving information. For example, the wireless communications circuit 1018 may include an RF transceiver for transmitting and receiving RF communication signals via an antenna 1017, or other communications module capable of performing wireless communications. Wireless communications circuit 1018 may be in communication with the control circuit 1002 for communicating information to and/or from the control circuit 1002. For example, the wireless communication circuit 1018 may send information from the control circuit 1002 via network communication signals. The wireless communication circuit 1018 may send information to the control circuit 1002 that are received via network communication signals. The wireless communication circuit 1018 may communicate via the same or a different network and/or protocol as the wireless communication circuit 1010. For example, the wireless communication circuit 1018 may communicate via a short-range RF protocol (e.g., NFC, BLE, or another short-range RF protocol) and the wireless communication circuit 1010 may communicate via another RF network or protocol (e.g., a proprietary protocol, WIFI, cellular, etc.).

The control circuit 1002 may also be in communication with a display 1008. The display 1008 may provide information to a user in the form of a graphical and/or textual display. The control circuit 1002 may signal the display 1008, or portions thereof, to modulate and/or turn the display on and/or off to communicate information from the display 1008. The communication between the display 1008 and the control circuit 1002 may be a two-way communication, as the display 1008 may include a touch screen module capable of receiving information from a user and providing such information to the control circuit 1002.

The network device 1000 may include an actuator 1016. The control circuit 1002 may be responsive to the actuator 1016 for receiving a user input. For example, the control circuit 1002 may be operable to receive a button press from a user on the network device 1000 for making a selection or performing other functionality on the network device 1000.

The network device 1000 may include an optical transmitter 1020. The optical transmitter 1020 may be used to transmit an optical signal to one or more control devices (e.g., lighting control devices) as part of a claiming and/or joining procedure.

One or more of the modules within the network device 1000 may be powered by a power source 1014. The power source 1014 may include an AC power supply or DC power supply, for example. The power source 1014 may generate a DC supply voltage $V_{CC}$ for powering the modules within the network device 1000.

Figure 11:
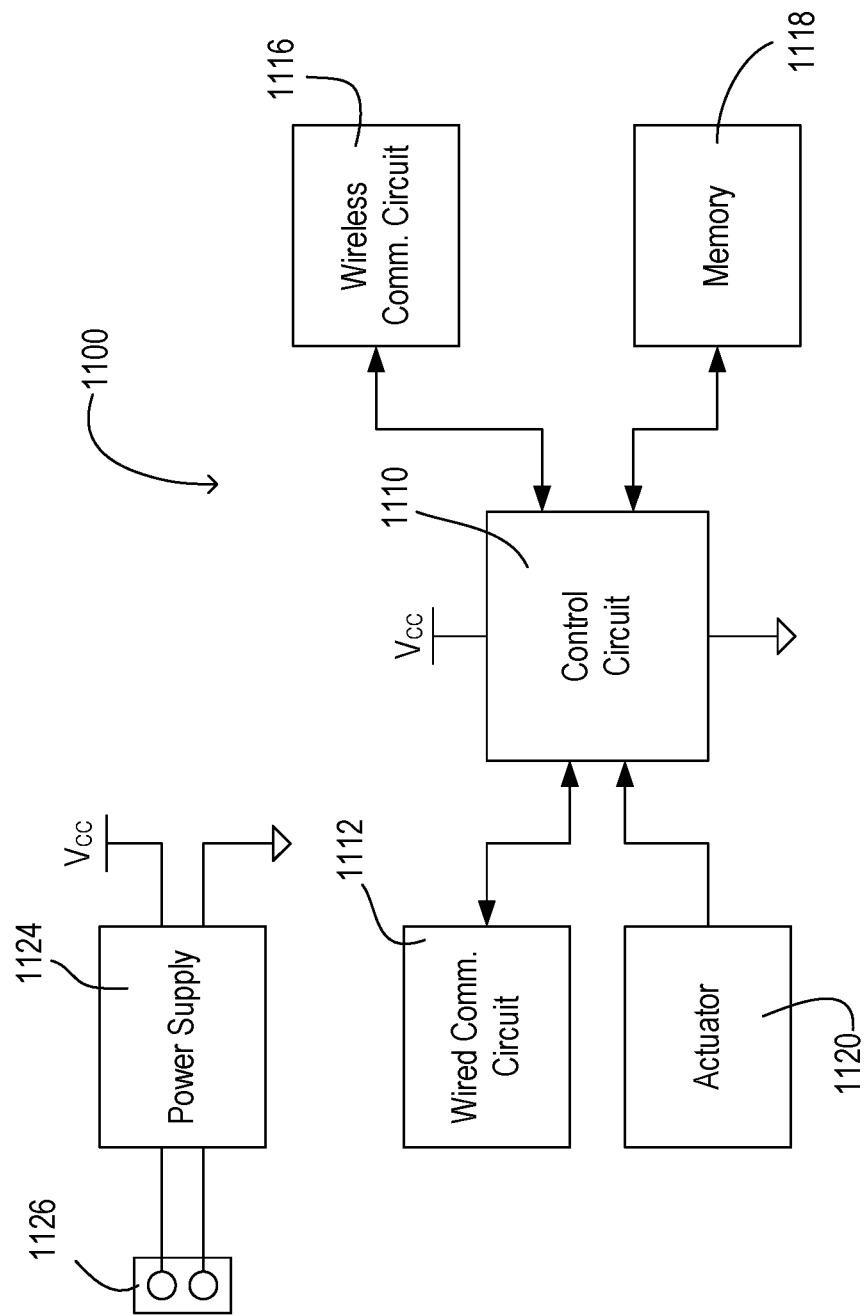
FIG. 11 is a block diagram of an example system controller.

FIG. 11 is a block diagram of an example system controller 1100. The system controller 1100 may comprise a control circuit 1110, which may include one or more of a processor (e.g., a microprocessor), a microcontroller, a programmable logic device (PLD), a field programmable gate array (FPGA), an application specific integrated circuit (ASIC), or any suitable processing device. The control circuit 1110 may perform signal coding, data processing, image processing, power control, input/output processing, and/or any other functionality that enables the system controller 1100 to perform as described herein. The system controller 1100 may comprise a wired communication circuit 1112 that may be coupled to, for example, an Ethernet jack. The wired communication circuit 1112 may be adapted to be connected to a wired digital communication link (e.g., an Ethernet communication link) for allowing the control circuit 1110 to communicate with network communication devices on a network. The wired communication circuit 1112 may be configured to be wirelessly connected to the network, e.g., using WI-FI technology to transmit and/or receive network communication signals.

The system controller 1110 may comprise a wireless communication circuit 1116, for example, including an RF transceiver coupled to an antenna for transmitting and/or receiving RF communication signals. The wireless communication circuit 1116 may communicate using a different network or protocol than the wired communication circuit 1112, such as a proprietary protocol (e.g., the ClearConnect® protocol), for example. The control circuit 1110 may be coupled to the wireless communication circuit 1116 for transmitting messages via the RF communication signals, for example, to control the load control devices in response to messages received via the wired communication circuit 1112. The control circuit 1110 may be configured to receive messages, for example, from the load control devices and/or other control-source devices.

The control circuit 1110 may be responsive to an actuator 1120 for receiving a user input. For example, the control circuit 1110 may be operable to associate the system controller 1100 with one or more devices of a load control system in response to actuations of the actuator 1120. The system controller 1100 may comprise additional actuators to which the control circuit 1110 may be responsive.

The control circuit 1110 may store information in and/or retrieve information from the memory 1118. The memory 1118 may include a non-removable memory and/or a removable memory for storing computer-readable media. The non-removable memory may include random-access memory (RAM), read-only memory (ROM), a hard disk, and/or any other type of non-removable memory storage. The removable memory may include a subscriber identity module (SIM) card, a memory stick, a memory card (e.g., a digital camera memory card), and/or any other type of removable memory. The control circuit 1110 may access the memory 1118 for executable instructions and/or other information that may be used by the system controller 1100. The control circuit 1110 may store the device identifiers of the devices to which the system controller 1100 is associated in the memory 1118. The control circuit 1110 may access instructions in the memory 1118 for transmitting instructions and/or performing other functions described herein.

The system controller 1100 may comprise a power supply 1124 for generating a DC supply voltage $V_{CC}$ for powering the control circuit 1110, the wired communication circuit 1112, the wireless communication circuit 1116, the memory 1118, and/or other circuitry of the system controller 1100. The power supply 1124 may be coupled to a power supply connector 1126 (e.g., a USB port) for receiving a supply voltage (e.g., a DC voltage) and/or for drawing current from an external power source.

Figure 12:
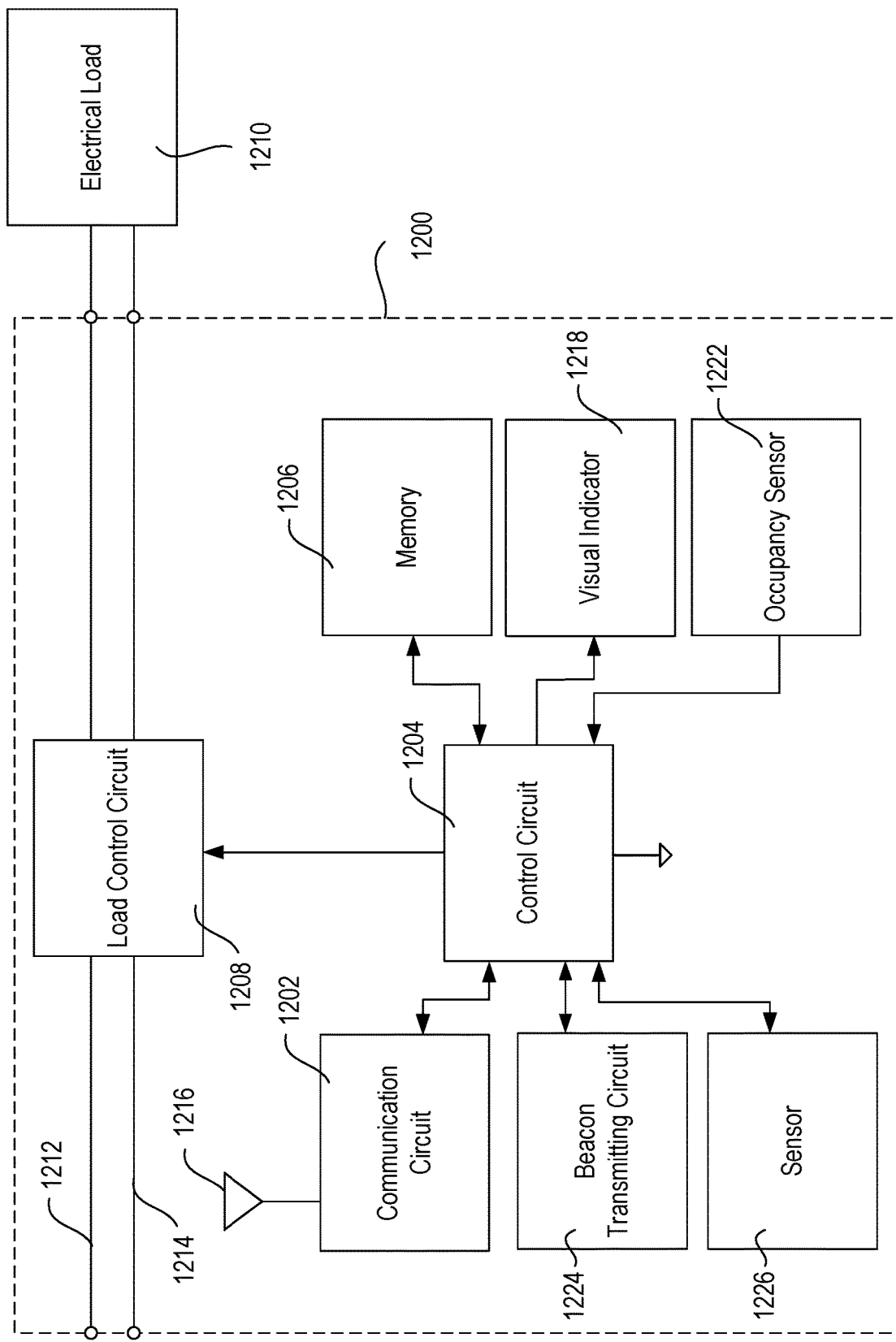
FIG. 12 is a block diagram illustrating an example load control device.

FIG. 12 is a block diagram illustrating an example load control device 1200. The load control device 1200 may be a control-target device, such as a lighting control device, for example. The load control device 1200 may be a dimmer switch, an electronic switch, an electronic ballast for lamps, an LED driver for LED light sources, or other load control device. The load control device 1200 may include a communication circuit 1202. The communication circuit 1202 may include an RF receiver, an RF transceiver, or other communication module capable of performing wired and/or wireless communications. The wireless communications may be performed via an antenna 1216.

The communication circuit 1202 may be in communication with a control circuit 1204. The control circuit 1204 may include one or more general purpose processors, special purpose processors, conventional processors, digital signal processors (DSPs), microprocessors, integrated circuits, a programmable logic device (PLD), application specific integrated circuits (ASICs), or the like. The control circuit 1204 may perform signal coding, data processing, power control, input/output processing, or any other functionality that enables the load control device 1200 to perform as described herein.

The control circuit 1204 may store information in and/or retrieve information from a memory 1206. For example, the memory 1206 may maintain a device database of associated device identifiers and/or executable instructions for performing as described herein. The memory 1206 may include a non-removable memory and/or a removable memory. The load control circuit 1208 may receive instructions from the control circuit 1204 and may control the electrical load 1210 based on the received instructions. The load control circuit 1208 may receive power via the hot connection 1212 and the neutral connection 1214 and may provide an amount of power to the electrical load 1210. The electrical load 1210 may include a lighting load or any other type of electrical load.

The control circuit 1204 may receive information from the occupancy sensor 1222. The information received from the occupancy sensor may include an indication of an occupancy condition or a vacancy condition. The occupancy sensor 1222 may include an infrared (IR) sensor, visible light sensor, or other sensor capable of detecting movement. The occupancy sensor may send an indication to the control circuit 1204 in response to detection of movement (e.g., a major motion event or a minor motion event).

The control circuit 1204 may communicate with beacon transmitting circuit 1224 (e.g., a short-range communication circuit) to transmit beacon messages. The beacon transmitting circuit 1224 may communicate beacon messages via RF communication signals, for example. The beacon transmitting circuit 1224 may be a one-way communication circuit or a two-way communication circuit capable of receiving information on the same network and/or protocol on which the beacon messages are transmitted. The information received at the beacon transmitting circuit 1224 may be provided to the control circuit 1204.

The control circuit 1204 may receive information from a visible light sensor 1226 (e.g., a camera). The visible light sensor 1226 may be used to receive an optical signal, for example from a network device, as part of a claiming and/or joining procedure.

The control circuit 1204 may illuminate a visual indicator 1218 to provide feedback to a user. For example, the control circuit 1204 may blink or strobe the visual indicator 1218 to indicate an occupancy condition identified by the occupancy sensor 1222, that a configuration mode has been entered, or provide other feedback from the load control device 1200. The control circuit 1204 may be operable to illuminate the visual indicator 1218 different colors. The visual indicator 1218 may be illuminated by, for example, one or more light-emitting diodes (LEDs). The load control device 1200 may comprise more than one visual indicator.

Figure 13:
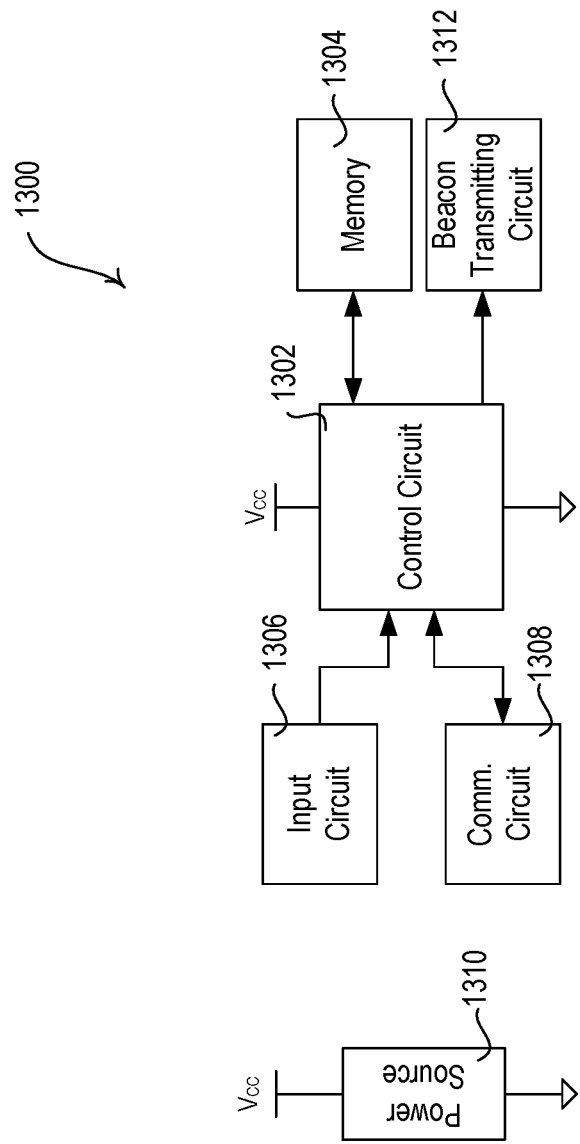
FIG. 13 is a block diagram illustrating an example control-source device.

FIG. 13 is a block diagram illustrating an example control-source device 1300 as described herein. The control-source device 1300 may be a remote-control device, an occupancy sensor, visible light sensor, and/or another control-source device. The control-source device 1300 may include a control circuit 1302 for controlling the functionality of the control-source device 1300. The control circuit 1302 may include one or more general purpose processors, special purpose processors, conventional processors, digital signal processors (DSPs), microprocessors, integrated circuits, a programmable logic device (PLD), application specific integrated circuits (ASICs), or the like. The control circuit 1302 may perform signal coding, data processing, power control, input/output processing, or any other functionality that enables the control-source device 1300 to perform as described herein.

The control circuit 1302 may store information in and/or retrieve information from the memory 1304. The memory 1304 may include a non-removable memory and/or a removable memory, as described herein.

The control-source device 1300 may include a communications circuit 1308 for transmitting and/or receiving information. The communications circuit 1308 may transmit and/or receive information via wired and/or wireless communications. The communications circuit 1308 may include a transmitter, an RF transceiver, or other circuit capable of performing wired and/or wireless communications. The communications circuit 1308 may be in communication with control circuit 1302 for transmitting and/or receiving information.

The control circuit 1302 may also be in communication with an input circuit 1306. The input circuit 1306 may include an actuator (e.g., one or more buttons) or a sensor circuit (e.g., an occupancy sensor circuit, camera or other visible light sensing circuit, etc.) for receiving input that may be sent to a device for controlling an electrical load. For example, the control-source device may receive input from the input circuit 1306 to put the control circuit 1302 in a configuration mode and/or communicate association messages from the control-source device. The control circuit 1302 may receive information from the input circuit 1306 (e.g. an indication that a button has been actuated or sensed information). Each of the modules within the control-source device 1300 may be powered by a power source 1310.

Although features and elements are described above in particular combinations, a feature or element can be used alone or in any combination with the other features and elements. The procedures described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random-access memory (RAM), removable disks, and optical media such as CD-ROM disks, and digital versatile disks (DVDs).

What is claimed is:

1. A load control system comprising:
a mobile device configured to transmit a first mobile device beacon message that includes a first discovery threshold; and
a plurality of control devices, wherein each control device of the plurality of control devices is configured to:
receive the first mobile device beacon message;
determine that the control device is within a discovery range of the mobile device based on a received signal strength magnitude at which the first mobile device beacon message was received and the first discovery threshold; and
in response to the control device being within the discovery range, transmit a control device beacon message;
wherein the mobile device is further configured to:
receive the control device beacon messages transmitted by the plurality of control devices in response to the first mobile device beacon message;
determine a number of discovered control devices based on the received control device beacon messages;
compare the number of discovered control devices to a target range, wherein the target range is defined by a first target number of discovered control devices and a second target number of discovered control devices from which the control device beacon messages are to be received from the plurality of control devices in response to the first mobile device beacon message;
determine that the number of discovered control devices is greater than the first target number of the target range or less than the second target number of the target range;
adjust the first discovery threshold to a second discovery threshold based on the number of discovered control devices being determined to be greater than or less than the target range, wherein the first discovery threshold is configured to be decreased to the second discovery threshold in response to the determination that the number of discovered control devices is less than the second target number of the target range, and wherein the first discovery threshold is configured to be increased to the second discovery threshold in response to the determination that the number of discovered control devices is greater than the first target number of the target range; and
transmit a second mobile device beacon message that includes the second discovery threshold.

2. The load control system of claim 1, wherein the mobile device is further configured to:
adjust the first discovery threshold by a greater amount the further the number of discovered control devices is from the target range.

3. The load control system of claim 1, wherein the mobile device is further configured to:
increase the first discovery threshold by a first threshold increment to the second discovery threshold in response to the determination that the number of discovered control devices is greater than the first target number of the target range.

4. The load control system of claim 3, wherein the mobile device is further configured to:
determine that the number of discovered control devices is greater than a third target number of discovered control devices, wherein the third target number of discovered control devices is less than the first target number of discovered control devices; and
increase the first discovery threshold by a second threshold increment that is less than the first threshold increment to the second discovery threshold in response to the determination that the number of discovered control devices is greater than the third target number of discovered control devices.

5. The load control system of claim 1, wherein the mobile device is further configured to:
initialize an adjustment timer to an adjustment value to delay an additional increase of the first discovery threshold until expiration of the adjustment timer; and
maintain the first discovery threshold prior to an expiration of the adjustment timer.

6. The load control system of claim 1, wherein the mobile device is further configured to:
decrease the first discovery threshold by a first threshold decrement to the second discovery threshold in response to the determination that the number of discovered control devices is less than the second target number of the target range.

7. The load control system of claim 6, wherein the mobile device is further configured to:
determine that the number of discovered control devices is less than a third target number of discovered control devices, wherein the third target number of discovered control devices is greater than the first target number of discovered control devices; and
decrease the first discovery threshold by a second threshold decrement that is less than the first threshold decrement to the second discovery threshold in response to the determination that the number of discovered control devices is less than the third target number of discovered control devices.

8. The load control system of claim 1, wherein each control device of the plurality of control devices is further configured to determine that the control device is within the discovery range based on an enter discovery threshold value and an exit discovery threshold value.

9. The load control system of claim 8, wherein each control device of the plurality of control devices is configured to determine the enter discovery threshold value and the exit discovery threshold value based on the received discovery threshold and one or more threshold offsets.

10. The load control system of claim 9, wherein each control device of the plurality of control devices being configured to determine that it is within the discovery range comprises each control device of the plurality of control devices being configured to:
determine whether the control device is within a configuration mode;
calculate the enter discovery threshold and the exit discovery threshold based on the received discovery threshold and one of the one or more threshold offsets; and
compare the received signal strength magnitude at which the first mobile device beacon message was received to the enter discovery threshold.

11. The load control system of claim 9, wherein the first mobile device beacon message includes the one or more threshold offsets.

12. The load control system of claim 9, wherein the one or more threshold offsets are pre-stored in a respective memory of each control device of the plurality of control devices.

13. The load control system of claim 1, wherein the first mobile device beacon message includes an enter discovery threshold that is greater than the received discovery threshold and the second mobile device beacon message includes an exit discovery threshold that is less than the second discovery threshold, and wherein each control device of the plurality of control devices is further configured to:
determine that the control device has entered the discovery range of the mobile device based on the received signal strength magnitude at which the first mobile device beacon message was received and the enter discovery threshold;
receive the second mobile device beacon message; and
determine that the control device has exited the discovery range of the mobile device based on a received signal strength magnitude at which the second mobile device beacon message was received and the exit discovery threshold.

14. A mobile device comprising:
a processor configured to:
transmit a first mobile device beacon message that includes a first discovery threshold to one or more control devices;
receive one or more control device beacon messages transmitted by the control devices in response to the first mobile device beacon message;
determine a number of discovered control devices based on the received control device beacon messages;
compare the number of discovered control devices to a target range, wherein the target range is defined by a first target number of discovered control devices and a second target number of discovered control devices from which the control device beacon messages are to be received from the plurality of control devices in response to the first mobile device beacon message;
determine that the number of discovered control devices is greater than the first target number of the target range or less than the second target number of the target range;
adjust the first discovery threshold to a second discovery threshold based on the number of discovered control devices being determined to be greater than or less than the target range, wherein the first discovery threshold is configured to be decreased to the second discovery threshold in response to the determination that the number of discovered control devices is less than the second target number of the target range, and wherein the first discovery threshold is configured to be increased to the second discovery threshold in response to the determination that the number of discovered control devices is greater than the first target number of the target range; and transmit a second mobile device beacon message that includes the second discovery threshold.

15. The mobile device of claim 14, wherein the processor is further configured to:

adjust the first discovery threshold by a greater amount the further the number of discovered control devices is from the target range.

16. The mobile device of claim 14, wherein the processor is further configured to:

increase the first discovery threshold by a first threshold increment to the second discovery threshold in response to the determination that the number of discovered control devices is greater than the first target number of the target range.

17. The mobile device of claim 16, wherein the processor is further configured to:

determine that the number of discovered control devices is greater than a third target number of discovered control devices, wherein the third target number of discovered control devices is less than the first target number of discovered control devices; and increase the first discovery threshold by a second threshold increment that is less than the first threshold increment to the second discovery threshold in response to the determination that the number of discovered control devices is greater than the third target number of discovered control devices.

18. The mobile device of claim 14, wherein the processor is further configured to:

initialize an adjustment timer to an adjustment value to delay an additional increase of the first discovery threshold until expiration of the adjustment timer; and maintain the first discovery threshold prior to an expiration of the adjustment timer.

19. The mobile device of claim 14, wherein the processor is further configured to:

decrease the first discovery threshold by a first threshold decrement to the second discovery threshold in response to the determination that the number of discovered control devices is less than the second target number of the target range.

20. The mobile device of claim 19, wherein the processor is further configured to:

determine that the number of discovered control devices is less than a third target number of discovered control devices, wherein the third target number of discovered control devices is greater than the first target number of discovered control devices; and decrease the first discovery threshold by a second threshold decrement that is less than the first threshold decrement to the second discovery threshold in response to the determination that the number of discovered control devices is less than the third target number of discovered control devices.

21. A method comprising:

transmitting a first mobile device beacon message that includes a first discovery threshold to one or more control devices;

receiving one or more control device beacon messages transmitted by the control devices in response to the first mobile device beacon message;

determining a number of discovered control devices based on the received control device beacon messages;

comparing the number of discovered control devices to a target range, wherein the target range is defined by a first target number of discovered control devices and a second target number of discovered control devices from which the control device beacon messages are to be received from the plurality of control devices in response to the first mobile device beacon message;

determining that the number of discovered control devices is greater than the first target number of the target range or less than the second target number of the target range;

adjusting the first discovery threshold to a second discovery threshold based on the number of discovered control devices being determined to be greater than or less than the target range, wherein the first discovery threshold is configured to be decreased to the second discovery threshold in response to the determination that the number of discovered control devices is less than the second target number of the target range, and wherein the first discovery threshold is configured to be increased to the second discovery threshold in response to the determination that the number of discovered control devices is greater than the first target number of the target range; and transmitting a second mobile device beacon message that includes the second discovery threshold.

22. The method of claim 21, further comprising:

adjusting the first discovery threshold by a greater amount the further the number of discovered control devices is from the target range.

23. The method of claim 21, further comprising:

increasing the first discovery threshold by a first threshold increment to the second discovery threshold in response to determining that the number of discovered control devices is greater than the first target number of the target range.

24. The method of claim 23, further comprising:

determining that the number of discovered control devices is less than a third target number of discovered control devices, wherein the third target number of discovered control devices is greater than the first target number of discovered control devices; and increasing the first discovery threshold by a second threshold increment that is less than the first threshold increment to the second discovery threshold in response to the determination that the number of discovered control devices is greater than the third target number of discovered control devices.

25. The method of claim 21, further comprising:

initializing an adjustment timer to an adjustment value to delay an additional increase of the first discovery threshold until expiration of the adjustment timer; and maintaining the first discovery threshold prior to an expiration of the adjustment timer.

26. The method of claim 21, further comprising:

decreasing the first discovery threshold by a first threshold decrement to the second discovery threshold in response to the determination that the number of discovered control devices is less than the second target number of the target range.

27. The method of claim 26, further comprising:

determining that the number of discovered control devices is less than a third target number of discovered control devices, wherein the third target number of discovered control devices is greater than the first target number of discovered control devices; and decreasing the first discovery threshold by a second threshold decrement that is less than the first threshold decrement to the second discovery threshold in response to the determination that the number of discovered control devices is less than the third target number of discovered control devices.

28. The method of claim 21, wherein the first mobile device beacon message includes an enter discovery threshold that is greater than the first discovery threshold and the second mobile device beacon message includes an exit discovery threshold that is less than the second discovery threshold, wherein the enter discovery threshold is configured to be used by a control device to determine that the control device has entered a discovery range of the mobile device, and wherein the exit discovery threshold is configured to be used by the control device to determine that the control device has exited a discovery range of the mobile device.

29. At least one non-transitory computer-readable storage medium comprising executable instructions that are configured to, when executed by at least one control circuit, cause the control circuit to:
   transmit a first mobile device beacon message that includes a first discovery threshold to one or more control devices;
   receive one or more control device beacon messages transmitted by the control devices in response to the first mobile device beacon message;
   determine a number of discovered control devices based on the received control device beacon messages;
   compare the number of discovered control devices to a target range, wherein the target range is defined by a first target number of discovered control devices and a second target number of discovered control devices from which the control device beacon messages are to be received from the plurality of control devices in response to the first mobile device beacon message;
   determine that the number of discovered control devices is greater than the first target number of the target range or less than the second target number of the target range;
   adjust the first discovery threshold to a second discovery threshold based on the number of discovered control devices being determined to be greater than or less than the target range, wherein the first discovery threshold is configured to be decreased to the second discovery threshold in response to the determination that the number of discovered control devices is less than the second target number of the target range, and wherein the first discovery threshold is configured to be increased to the second discovery threshold in response to the determination that the number of discovered control devices is greater than the first target number of the target range; and
   transmit a second mobile device beacon message that includes the second discovery threshold.

30. The at least one non-transitory computer-readable storage medium of claim 29, wherein the instructions are further configured to cause the at least one control circuit to: adjust the first discovery threshold by a greater amount the further the number of discovered control devices is from the target range.

31. The at least one non-transitory computer-readable storage medium of claim 29, wherein the instructions are further configured to cause the at least one control circuit to:
   increase the first discovery threshold by a first threshold increment to the second discovery threshold in response to the determination that the number of discovered control devices is greater than the first target number of the target range.

32. The at least one non-transitory computer-readable storage medium of claim 31, wherein the instructions are further configured to cause the at least one control circuit to:
   determine that the number of discovered control devices is greater than a third target number of discovered control devices, wherein the third target number of discovered control devices is less than the first target number of discovered control devices; and
   increase the first discovery threshold by a second threshold increment that is less than the first threshold increment to the second discovery threshold in response to the determination that the number of discovered control devices is greater than the third target number of discovered control devices.

33. The at least one non-transitory computer-readable storage medium of claim 29, wherein the instructions are further configured to cause the at least one control circuit to:
   initialize an adjustment timer to an adjustment value to delay an additional increase of the first discovery threshold until expiration of the adjustment timer; and
   maintain the first discovery threshold prior to an expiration of the adjustment timer.

34. The at least one non-transitory computer-readable storage medium of claim 29, wherein the instructions are further configured to cause the at least one control circuit to:
   decrease the first discovery threshold by a first threshold decrement to the second discovery threshold in response to the determination that the number of discovered control devices is less than the second target number of the target range.

35. The at least one non-transitory computer-readable storage medium of claim 34, wherein the instructions are further configured to cause the at least one control circuit to:
   determine that the number of discovered control devices is less than a third target number of discovered control devices, wherein the third target number of discovered control devices is greater than the first target number of discovered control devices; and
   decrease the first discovery threshold by a second threshold decrement that is less than the first threshold decrement to the second discovery threshold in response to the determination that the number of discovered control devices is less than the third target number of discovered control devices.

* * * * *